(12) United States Patent
McGregor et al.

(10) Patent No.: US 7,855,372 B2
(45) Date of Patent: Dec. 21, 2010

(54) NON-STREAMING HIGH-EFFICIENCY PERFORATED SEMICONDUCTOR NEUTRON DETECTORS, METHODS OF MAKING SAME AND MEASURING WAND AND DETECTOR MODULES UTILIZING SAME

(75) Inventors: Douglas S. McGregor, Riley, KS (US); John K. Shultis, Manhattan, KS (US); Blake B. Rice, Manhattan, KS (US); Walter J. McNeil, Winnfield, KS (US); Clell J. Solomon, Wichita, KS (US); Eric L. Patterson, Manhattan, KS (US); Steven L. Bellinger, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 125 days.

(21) Appl. No.: 12/293,131

(22) PCT Filed: Mar. 16, 2007

(86) PCT No.: PCT/US2007/064167

§ 371 (c)(1),
(2), (4) Date: Dec. 18, 2008

(87) PCT Pub. No.: WO2007/109535

PCT Pub. Date: Sep. 27, 2007

(65) Prior Publication Data

US 2009/0302231 A1 Dec. 10, 2009

Related U.S. Application Data

(60) Provisional application No. 60/782,965, filed on Mar. 16, 2006.

(51) Int. Cl.
*G01T 3/00* (2006.01)
(52) U.S. Cl. .............................. 250/390.01; 250/370.05
(58) Field of Classification Search ............ 250/370.05, 250/390.01, 390.03, 390.11, 484.3
See application file for complete search history.

(56) References Cited

U.S. PATENT DOCUMENTS

| | | | |
|---|---|---|---|
| 3,581,091 A | 5/1971 | Meijer | |
| 4,103,165 A | 7/1978 | Brown et al. | |
| 4,426,352 A | 1/1984 | Bybee et al. | |
| 5,629,523 A | 5/1997 | Ngo et al. | |
| RE35,908 E | 9/1998 | Kitagushi et al. | |
| 5,880,471 A | 3/1999 | Schelten et al. | |

(Continued)

OTHER PUBLICATIONS

McGregor, Douglas S., et al., Semi-Insulating Bulk GaAs Thermal Neutron Imaging Arrays, IEEE Trans. Nuci. Sci., NS-43, 1996, p. 1357-1364.

(Continued)

*Primary Examiner*—David P Porta
*Assistant Examiner*—Mark R Gaworecki
(74) *Attorney, Agent, or Firm*—Brooks Kushman P.C.

(57) ABSTRACT

Non-streaming high-efficiency perforated semiconductor neutron detectors, method of making same and measuring wands and detector modules utilizing same are disclosed. The detectors have improved mechanical structure, flattened angular detector responses, and reduced leakage current. A plurality of such detectors can be assembled into imaging arrays, and can be used for neutron radiography, remote neutron sensing, cold neutron imaging, SNM monitoring, and various other applications.

31 Claims, 35 Drawing Sheets

U.S. PATENT DOCUMENTS

| | | | |
|---|---|---|---|
| 5,940,460 | A | 8/1999 | Seidel et al. |
| 5,982,838 | A | 11/1999 | Vourvopoulos |
| 6,479,826 | B1 | 11/2002 | Klann et al. |
| 6,545,281 | B1 | 4/2003 | McGregor et al. |
| 7,005,982 | B1 | 2/2006 | Frank |
| 7,164,138 | B2 | 1/2007 | McGregor |
| 2005/0023479 | A1* | 2/2005 | Grodzins ............... 250/390.11 |
| 2005/0258372 | A1 | 11/2005 | McGregor et al. |

OTHER PUBLICATIONS

Mireshghi, A., et al., High Efficiency Neutron Sensitive Amorphous Silicon Pixel Detectors, IEEE Trans. Nucl. Sci., NS-41, 1994, p. 915-921.

McGregor, Douglas S., et al., Thin-Film-Coated Bulk GaAs Detectors for Thermal and Fast Neutron Measurements, Nuclear Instruments and Methods, A466, 2001, pp. 126-141.

McGregor, Douglas S., et al., Design Considerations for Thin Film Coated Semiconductor Thermal Neutron Detectors, Part I: Basics Regarding Alpha Particle Emitting Neutron Reactive Films, Nuclear Instruments and Methods, A500, 2003, pp. 272-308.

McGregor, Douglas S., et al., New Surface Morphology for Low Stress Thin-Film-Coated Thermal Neutron Detectors, IEEE Trans. Nuclear Science, 49, 2002, pp. 1999-2004.

International Preliminary Report and Written Opinion dated Apr. 25, 2008 for the corresponding PCT application Serial No. US2007/064167 filed Mar. 16, 2007.

International Search Report dated Apr. 25, 2008 for the corresponding PCT application Serial No. US2007/064167 filed Mar. 16, 2007.

Dulloo, A.R.; Radiation Response Testing Of Silicon Carbide Semiconductor Neutron Detectors For Monitoring Thermal Neutron Flux; Westinghouse STC, Pittsburgh, Pennsylvania; Nov. 18, 1997.

Rose, A., Sputtered Boron Films on Silicon Surface Barrier Detectors, Nucl. Instr. and Meth., 52, 1967, p. 166.

Feigl, B., et al., Der Gd-Neutronenzeahler, Nucl. Instr. and Meth., 61, 1968, p. 349.

Foulon, et al., Neurton Detectors Made From Chemically Vapour Deposited Semiconductors, Proc. MRS, 487, 1998, p. 591.

Knoll, G.F., Radiation Detection and Measurement, 3rd Ed., Wiley, New York, 2000.

Garber, D.I., et al., BNL 325: Neutron Cross Sections, 3rd Ed., vol. 2, Curves, Brookhaven National Laboratory, Upton, 1976.

McLane, V., et al., Neutron Cross Sections, vol. 2, Academic Press, San Diego, CA, 1988.

Shultis, J.K., et al., Calculation of Ion Energy-Deposition Spectra in Silicon, Lithium-Fluoride, Boron and Boron Carbide, Report 299, Engineering Experiment Station, Kansas State University, Manhattan, KS, 2004, http:ww2.mne.ksu.edu/~jks/ papers/EESrpt299.pdf (referenced on Sep. 20, 2005.

* cited by examiner

NON-STREAMING HIGH-EFFICIENCY PERFORATED SEMICONDUCTOR NEUTRON DETECTORS, METHODS OF MAKING SAME AND MEASURING WAND AND DETECTOR MODULES UTILIZING SAME

CROSS-REFERENCE TO RELATED APPLICATIONS

This application claims the benefit of U.S. provisional application entitled "Non-Streaming Perforated Semiconductor Neutron Detector and Dosimeter and Method of Making the Same," filed Mar. 16, 2006 and having Application U.S. Ser. No. 60/782,965.

STATEMENT REGARDING FEDERALLY SPONSORED RESEARCH OR DEVELOPMENT

This invention was made with Government support under DTRA contract DTRA-01-03-C-0051, National Science Foundation IMR-MIP Grant No. 0412208, and U.S. Department of Energy NEER Grant DE-FG07-041D14599. The United States Government has certain rights in this invention.

BACKGROUND OF THE INVENTION

1. Field of the Invention

This invention generally relates to semiconductor radiation detectors and methods of making same and, in particular, to semiconductor detectors designed to detect neutrons of various energy ranges, methods of making same and measuring wands and detector modules utilizing such detectors.

2. Background Art

The following references are referenced herein:
1. D. S. McGregor, J. T. Lindsay, C. C. Brannon and R. W. Olsen, "Semi-insulating Bulk GaAs Thermal Neutron Imaging Arrays," IEEE Trans. Nucl. Sci., NS-43 (1996) p. 1357.
2. A. Rose, "Sputtered Boron Films on Silicon Surface Barrier Detectors," Nucl. Instr. and Meth., 52 (1967) p. 166.
3. B. Feigl and H. Rauch, "Der Gd-Neutronenzahler," Nucl. Instr. and Meth., 61 (1968) p. 349.
4. A. Mireshghi, G. Cho, J. S. Drewery, W. S. Hong, T. Jing, H. Lee, S. N. Kaplan and V. Perez-Mendez, "High Efficiency Neutron Sensitive Amorphous Silicon Pixel Detectors," IEEE Trans. Nucl. Sci., NS-41 (1994) p. 915.
5. F. Foulon, P. Bergonzo, A. Brambilla, C. Jany, B. Guizard and R. D. Marshall, "Neutron Detectors Made from Chemically Vapour Deposited Semiconductors," Proc. MRS, 487 (1998) p. 591.
6. A. R. Dulloo, F. H. Ruddy, and J. G. Seidel, "Radiation Response Testing of Silicon Carbide Semiconductor Neutron Detectors for Monitoring Thermal Neutron Flux," Report 97-9TK1-NUSIC-R1, Westinghouse STC, Pittsburgh, Pa. (Nov. 18, 1997).
7. G. F. Knoll, Radiation Detection and Measurement, 3rd Ed. (Wiley, New York, 2000).
8. D. I. Garber and R. R. Kinsey, BNL 325: Neutron Cross Sections, 3rd Ed., Vol. 2, Curves (Brookhaven National Laboratory, Upton, 1976).
9. V. McLane, C. L. Dunford and P. F. Rose, Neutron Cross Sections, Vol. 2 (Academic Press, San Diego, 1988).
10. D. S. McGregor, R. T. Klann, H. K. Gersch, and Y-H. Yang, "Thin-Film-Coated Bulk GaAs Detectors for Thermal and Fast Neutron Measurements," Nuclear Instruments and Methods, A466 (2001) pp. 126-141.
11. D. S. McGregor, M. D. Hammig, H. K. Gersch, Y-H Yang, and R. T. Klann, "Design Considerations for Thin Film Coated Semiconductor Thermal Neutron Detectors, Part I: Basics Regarding Alpha Particle Emitting Neutron Reactive Films," Nuclear Instruments and Methods, A500 (2003) pp. 272-308.
12. J. K. Shultis and D. S. McGregor, "Calculation of Ion Energy-Deposition Spectra in Silicon, Lithium-Fluoride, Boron, and Boron Carbide," Report 299, Engineering Experiment Station, Kansas State University, Manhattan, Kans., 2004, http://ww2.mne.ksu.edu/~jks/papers/EESrpt299.pdf (referenced on Sep. 20, 2005).
13. J. K. Shultis and D. S. McGregor, "Efficiencies of Coated and Perforated Semiconductor Neutron Detectors," IEEE Trans. Nuclear Science, NS-53 (2006) pp. 1659-1665.
14. D. S. McGregor, R. T. Klann, H. K. Gersch, E. Ariesanti, J. D. Sanders, and B. VanDerElzen, "New Surface Morphology for Low Stress Thin-Film-Coated Thermal Neutron Detectors," IEEE Trans. Nuclear Science, 49 (2002) pg. 1999-2004.

Semiconductor detectors coated with neutron reactive materials offer an alternative approach to scintillator-based neutron imaging devices for neutron radiography (normally scintillating screens coupled to photographic film or to other photorecording devices). Neutron reactive film-coated devices investigated in previous works include Si, SiC, GaAs, and diamond detectors, all of which have advantages and disadvantages [1-6].

The converter films attached to semiconductor devices most often used for neutron detection utilize either the $^6$Li(n,$\alpha$)$^3$H reaction or the $^{10}$B(n,$\alpha$)$^7$Li reaction. Due to low chemical reactivity, the most common materials used are pure $^{10}$B and $^6$LiF. Neutron reactive films based on the $^{157}$Gd (n,$\gamma$)$^{158}$Gd reaction show a higher neutron absorption efficiency than $^{10}$B(n,$\alpha$)$^7$Li and $^6$Li(n,$\alpha$)$^3$H-based films, however the combined emission of low energy gamma rays and conversion electrons from $^{157}$Gd(n,$\gamma$)$^{158}$Gd reactions make neutron-induced events difficult to discriminate from background gamma-ray events. As a result, Gd-based films are less attractive for devices where background gamma ray contamination is a problem. Alternatively, the particle energies emitted from the $^6$Li(n,$\alpha$)$^3$H and the $^{10}$B(n,$\alpha$)$^7$Li reactions are relatively large and produce signals easily discernable from background gamma ray noise.

Expected Efficiency of Conventional $^{10}$B and $^6$Li Coated Planar Detectors

The $^{10}$B(m,$\alpha$)$^7$Li reaction leads to the following reaction products [7]:

$$^{10}B + {}^1_0n \longrightarrow \begin{cases} {}^7Li(\text{at } 1.015 \text{ MeV}) + \alpha(\text{at } 1.777 \text{ MeV}), & 2.792 \text{ MeV(to ground state)} \\ {}^7Li*(\text{at } 0.840 \text{ MeV}) + \alpha(\text{at } 1.470 \text{ MeV}), & 2.310 \text{ MeV(1st excited state)} \end{cases} \quad \text{Reaction Q-Value}$$

which are released in opposite directions when thermal neutrons (0.0259 eV) are absorbed by $^{10}$B. After absorption, 94% of the reactions leave the $^7$Li ion in its first excited state, which rapidly de-excites to the ground state ($\sim 10^{-13}$ seconds) by releasing a 480 keV gamma ray. The remaining 6% of the reactions result in the $^7$Li ion dropping directly to its ground state. The microscopic thermal neutron absorption cross section is 3840 barns. Additionally, the microscopic thermal neutron absorption cross section decreases with increasing neutron energy, with a dependence proportional to the inverse of the neutron velocity (1/v) over much of the energy range [8,9].

The $^6$Li(n,$\alpha$)$^3$H reaction leads to the following products:

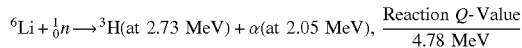

which again are oppositely directed if the neutron energy is sufficiently small. The microscopic thermal neutron (0.0259 eV) absorption cross section is 940 barns. The thermal neutron absorption cross section also demonstrates a 1/v dependence, except at a salient resonance above 100 keV, in which the absorption cross section surpasses that of $^{10}$B for energies between approximately 150 keV to 300 keV [8,9]. Additional resonances characteristic to either isotope cause the absorption cross section to surpass one or the other as the neutron energy increases. Due to its higher absorption cross section, the $^{10}$B(n, $\alpha$)$^7$Li reaction leads to a generally higher reaction probability than the $^6$Li(n,$\alpha$)$^3$H reaction for neutron energies below 100 keV. However, the higher energy reaction products emitted from the $^6$Li(n,$\alpha$)$^3$H reaction lead to greater ease of detection than the particles emitted from the $^{10}$B(n,$\alpha$)$^7$Li reaction.

The term "effective range" (denoted L) is the distance through which a particle may travel within the neutron reactive film before its energy decreases below the set minimum detectable threshold, or rather, before its energy decreases below the electronic lower level discriminator (LLD) setting. The term does not take into account additional energy losses from contact "dead regions". The neutron reaction products released do not have equal masses, and therefore do not have equal energies or effective ranges. Neutrons may interact anywhere within the reactive film, and the reaction products lose energy as they move through the neutron reactive film. Reaction product self-absorption reduces the energy transferred to the semiconductor detector, and ultimately limits the maximum film thickness that can be deposited over the semiconductor device. The measured voltage signal is directly proportional to the number of electron-hole pairs excited within the semiconductor. Reaction products that deposit most or all of their energy in the detector will produce much larger voltage signals than those reaction products that lose most of their energy before reaching the detector.

The energy absorbed in the detector is simply the original particle energy minus the combined energy lost in the boron film and the detector contact during transit. At any reaction location within the reactive film, a reduced energy will be retained by either particle that should enter the detector, being the maximum possible if the trajectory is orthogonal to the device contact. Hence, if the interaction occurs in the $^{10}$B film at a distance of 0.5 microns away from the detector, the maximum energy retained by the $^7$Li ion when it enters the detector will be 430 keV, and the maximum energy retained by the alpha particle will be 1150 keV [10,11]. For the same interaction distance of 0.5 microns from the detector, the energy retained by the particle when it reaches the detector decreases as the angle increases from orthogonal (>0°). Given a predetermined minimum detection threshold (or LLD setting), the effective range (L) for either particle can be determined. For instance, an LLD setting of 300 keV yields LLD as 0.810 microns and La as 2.648 microns [10,11]. Similar conditions exist for $^6$LiF and $^6$Li films.

A commonly used geometry involves the use of a planar semiconductor detector over which a neutron reactive film has been deposited (see FIG. 1). Assuming that the neutron beam is perpendicular to the detector front contact, the sensitivity contribution for a reaction product species can be found by integrating the product of the neutron interaction probability and the fractional solid angle, defined by the reaction product effective ranges subtending the device interface [1,1], which yields:

$$S_p(D_F) = 0.5 F_p \left\{ \left(1 + \frac{1}{\Sigma_F L}\right)(1 - e^{-\Sigma_F D_F}) - \frac{D_F}{L} \right\} \text{ for } D \leq L, \quad (1A)$$

and $$S_p(D_F) = 0.5 F_p e^{-\Sigma_F(D_F - L)} \left\{ \left(1 + \frac{1}{\Sigma_F L}\right)(1 - e^{-\Sigma_F L}) - 1 \right\} \text{ for } D_F > L, \quad (1B)$$

where $\Sigma_F$ is the macroscopic neutron absorption cross section, $D_F$ is the film thickness, and $F_p$ is the branching ratio of the reaction product emissions. The total sensitivity accordingly can be found by adding all of the reaction product sensitivities $$S(D_F)|_{Total} = \sum_{p=1}^{N} S_p(D_F), \quad (2)$$

where N is the number of different reaction product emissions. In the case of $^{10}$B-based films, N equals 4. Notice from equation 1B that the value of SP reduces as $D_F$ becomes larger than the value of L. As a result of this, there will be an optimum neutron reactive film thickness for front-irradiated detectors [1,1]. Since the minimum particle detection threshold determines the effective range (L), the optimum film thickness is also a function of the LLD setting. With the LLD set at 300 keV, the maximum achievable thermal neutron detection efficiency is 3.95%. The thermal neutron detection efficiency can be increased to 4.8% by lowering the LLD setting, but only at the expense of accepting more system noise and gamma-ray background interference [1,10,11]. Similar cases exist for $^6$LiF and pure $^6$Li films. Using an LLD setting of 300 keV, obverse detector irradiation yields maximum thermal neutron detection efficiencies of 4.3% for $^6$LiF-coated devices and 11.6% for pure $^6$Li-coated devices [1,1].

Perforated $^{10}$B and $^6$Li Coated Detectors Using Either Circular Holes or Straight Channels Irradiated with a Neutron Beam Perpendicular to the Detector To increase the detection efficiency of a semiconductor neutron detector, a lattice of circular holes, as depicted in FIG. 2, or straight channels, as depicted in FIG. 3, can be etched into the semiconductor material and subsequently filled with $^{10}$B, $^6$LiF or some other neutron reactive film. The circular hole design was analyzed for $^{10}$B and $^6$LiF materials, along with numerous overcoat or cap layer thicknesses. It was found that interactions in the perforations backfilled with neutron reactive material dominated the detector efficiency and that tremendous efficiency increases could be realized [12,13]. FIGS. 4 and 5 show the expected efficiencies for $^6$LiF-coated and backfilled devices for obverse irradiation as a function of overlayer or 'cap' thickness and cell pitch or dimension. The perforation depths in FIGS. 4 and 5 are 300 microns. Shown in FIG. 4 are efficiency curves for $^6$LiF backfilled detectors with hole diameter equal to 60% of the pitch between the holes. For instance, a pitch or cell dimension of 50 microns would have hole diameters of 30 microns. Shown in FIG. 5 are efficiency curves for $^6$LiF backfilled detectors with channel widths equal to 50% of the pitch between the holes. For instance, a pitch or cell dimension of 50 microns would have channel widths of 25 microns. Both FIGS. 4 and 5 show the dependence of neutron detection efficiency as a function of the $^6$LiF layer thickness added on top of the detector. From these results it is seen that efficiencies exceeding 30% can be attained and that an overlayer or a cap layer thickness of 20 microns yields near optimum results [1,3]. However, the calculations in the literature [12,13] do not take into account the adverse effect that angular trajectories from neutrons have on the efficiency as they intersect the detector. To remedy this adverse effect is one of the main objects of at least one embodiment of the invention herein.

Problems of Streaming and Non-Uniform Neutron Detection Response

In the design of perforated detectors as described in U.S. Pat. No. 6,545,281 B1 and U.S. Pat. No. 7,164,138 B2 there exists an inherent problem. The problem is a result of the repeated lattice structure substrate material composed of circular holes filled with neutron sensitive material as shown in FIG. 2 (referred to as 'rods'), or straight channel or channels filled with neutron sensitive materials, as depicted in FIG. 3, between which are 'fins' of semiconductor material. FIG. 6 shows a top view of a perforated semiconductor substrate 1 with channels 9 separated by fins 11 of semiconductor material. It is to be understood that the same reference numerals are used throughout the drawing figures to designate the same or similar structures unless otherwise indicated. For example, reference numeral "1" refers to a semiconductor substrate throughout the drawing figures.

Shown in FIG. 7, a cross sectional view, is the circumstance in which a perforated detector 14 is irradiated with a neutron source 10. The neutron streaming paths 15 in FIG. 7 show trajectories in which neutrons can pass through the device without intersecting the neutron reactive material 3 in the channel perforations 9. The streaming paths occur within specific angle ranges, hence if the detector is turned at these angles with respect to the neutron source, then there will be reductions in the observed efficiency. From prior art, as shown in FIG. 8, two perforated detectors 14 can be faced into each other to increase the neutron detection efficiency. However, this case works provided that the detector is aligned perpendicular to the neutron 4 paths. It is far more common that neutrons intersect the detectors at non-perpendicular angles.

Shown in FIG. 9, a cross sectional view, is the circumstance in which two perforated detectors 14 are facing each other, stacked, with a neutron reactive material 3 in the perforations 9 and between the detectors 14. The neutrons interacting in the neutron reactive material contained within the cylindrical holes or straight channels 9 will cause the neutron reactive material to eject energetic charged particle reaction products that afterwards can enter and interact within the adjacent semiconductor material 11. These charged particle emissions are then detected in the semiconductor material which constitutes the detection of a neutron. However, as shown in FIG. 9, neutrons from the source 10 can "stream" 15 through regions in the detectors which will reduce the detection probability. Hence, there are again particular angles at which neutrons can arrive at the detector which will reduce detection, resulting in an undesirable circumstance.

FIG. 10 shows the normalized angular probability of an interaction occurring in two perforated straight channel structures, both filled with $^{10}$B, facing each other in a sandwich as depicted in FIG. 9. FIG. 10 shows the results for different channel depths, where the depth of the channels is designated as 'L' in FIG. 10. The channel width is 6 microns and the semiconductor fin thickness is also 6 microns. The cap layer atop the detector is 1 micron. It becomes apparent that the absorption probability is a strong function of the angle of incidence, showing a clear depression at angles between 5 to 15 degrees. If the boron-filled channels are allowed to overlap such that the channels are 6 micron wide and the semiconductor fins are 4 microns wide, the problem still remains, as shown in FIG. 11.

Angular Efficiencies of Neutron Detectors with Circular Hole or Straight Channel Perforations The efficiency of a perforated neutron detector is a strong function of the incident neutron's direction. If one considers the axis of a perforated detector to be the polar axis of neutron incidence then it has been shown that as the angle of incidence increases from 0 to 90 degrees the detector efficiency falls off as a function of the cosine of the polar angle. This is an effect of the detector's solid angle, as seen by the source, being reduced to virtually nothing [1,1]. As a result, regardless of the design, the efficiency of the detector will drop as the polar angle of incidence increases.

Fluctuations in the efficiency resulting from changes in the azimuthal angle can be almost eliminated by appropriately designing the absorption region of the detector. Initial designs of perforated detectors considered perforations of cylindrical holes and channels into a silicon substrate. Both $^{10}$B and $^6$LiF were initially considered for the neutron sensitive material. The coordinate system used to describe the neutron efficiency and streaming effects in circular hole (or rod) perforated detectors is shown in FIG. 12 and the coordinate system used to describe the neutron efficiency and streaming effects in straight channel perforated detectors is shown in FIG. 13.

Perforated rod type detectors were modeled using a combination of the MCNP transport code and a specialized ion-transport code. Results of these simulations are presented in FIGS. 14-17 for varying material and perforation depths. One notices that at incident neutron azimuthal angles of multiples of 45 degrees that the detection efficiency drops dramatically, more so for even multiples of 45 degrees. This drop in efficiency is a result of neutrons streaming through regions of the detector and seeing less or no absorber material. FIG. 18 illustrates the concern. At azimuthal angles of 45 degrees the neutron has a small slot in between the rods that it may stream through without interacting. At 90 degrees the slot is much greater explaining the much greater drop in detection efficiency. Though the characteristics of the angular efficiencies are less than desirable, it should be pointed out that normal incidence efficiencies are predicted up to 18% for both $^{10}$B and $^6$LiF.

The drops in detection efficiency can be mitigated to some extent by using channels instead of rods. Channel perforated detectors were modeled using specialized transport codes written specifically for this application. FIGS. 19 and 20 represent plotted output from these codes and demonstrate the lessening of the azimuthal fluctuations. One notices in these cases that the efficiency changes much less with the azimuthal angle of incidence of the neutrons, and the reason is demonstrated in FIG. 13. The only streaming paths present occur at multiples of 90 degrees thereby flattening out the azimuthal response for all other angles. The adverse effect of efficiency non-uniformity as a function of neutron incidence angle is addressed by at least one embodiment of the invention herein.

Problems with Fragility

The thin fins of semiconductor material separating the linear channels in designs of prior art discussed in U.S. Pat. No. 7,164,138 B2 have proven to be fragile. The semiconductor material of the fins ranges from only a few microns wide to tens of microns wide, which have been found to be mechanically fragile. As a result, during the fabrication processes to manufacture the device, a large percentage of the fins crack and render that section of the detector insensitive. The adverse effect of fin fragility is addressed by at least one embodiment of the invention.

Problems with Fabrication

As previously described, prior art methods for designing and fabricating perforated diodes describe a basic concept for improving thermal neutron detection efficiency over simple planar-coated diodes. The idea, as described in U.S. Pat. No. 6,545,281 B1 and U.S. Pat. No. 7,164,138 B2, involves increasing the probability of capturing reaction products from thermal neutron interactions in neutron reactive films, primarily based upon Li and B based elements and compounds that contain some amount of $^6$Li and/or $^{10}$B isotopes. As previously described and illustrated herein, in these devices, circular holes or straight parallel channels are etched into a semiconductor diode structure which are subsequently back-filled with Li or B based materials. These designs work and are effective. However, the relatively simple constructions as described by the prior art are not optimized. Further, the construction techniques described in prior art are relatively difficult to make and result in relatively inferior performing detectors with relatively low reliability.

FIG. 21 is a side cross sectional view of a prior art detector at its basic level as described in U.S. Pat. No. 6,545,281 B1 and U.S. Pat. No. 7,164,138 B2. The basic device or detector 14 includes a semiconductor substrate 1 which has a back side conductive contact 2 applied to the semiconductor substrate 1. A junction is built at the top of the semiconductor substrate 1 by the introduction of impurity dopants into the substrate to form a rectifying junction 21 or by forming a metal-semiconductor Schottky junction. In either case, the entire top surface of the semiconductor substrate 1 forms the rectifying junction 21. Afterwards, the top of the semiconductor substance 1 has perforations 9 etched vertically down which are either circular holes or straight channels, as described by the prior art. The etched perforations 9 are cut through the rectifying junction, as shown in FIG. 21. Metal contacts 2 are then applied uniformly over the bottom surface of the substrate and over the top surface of the junction 21. Lastly, a neutron reactive material 3, such as a B or LiF is coated over the device 14 to fill the perforations 9.

It has been learned that etching through the rectifying junction damages it and reduces performance. FIG. 22 shows the difference between the reverse current of a pn junction diode before the perforations are etched and after the perforations were etched. It is clearly shown that the leakage increased by more than a factor of 1000. The adverse effect of high leakage currents caused from etching perforations through the rectifying junction is addressed by at least one embodiment of the invention.

As previously described, $^6$LiF is a prospective neutron reactive material for coated neutron detectors. Neutrons interacting in the $^6$Li material are absorbed and immediately cause the Li atom to fission into a $^4$He ion and a triton (3H) with energies of 2.05 MeV and 2.73 MeV, respectively.

$^6$LiF is a semi-stable material the can be produced easily with the following reaction process steps. First, enriched Li metal is placed into purified and de-ionized (DI) water, which reacts for form LiOH. The LiOH solution is saturated with slivers of Li metal until the reaction visibly stops. Afterwards, a dilute solution of HF and DI water is titrated or dripped into the LiOH solution to reaction and form LiF and water. Hydrogen gas is given off as a by product. The process is continued until the pH of the solution is between 6.8 and 7.2. The solution of LiF and water is allowed to stand until the LiF falls to the bottom of the container. The water on top is poured out into filter paper to catch any residual LiF still suspended in the water. The slurry of LiF paste is then poured into a petri dish and dried in a oven at 50° C. for 12 hours to form a dried powder in the petri dish. The LiF is then ready for use as a filling material for the detector perforations.

As also previously described, $^{10}$B is also a prospective neutron reactive material for coated neutron detectors and can be purchased from commercial vendors. Neutrons interacting in the $^{10}$B material are absorbed and immediately cause the B atom to fission into a $^4$He ion and a $^7$Li ion with energies (94% branching) of 1.47 MeV and 0.84 MeV, or (6% branching) of 1.78 MeV and 1.05 MeV, respectively.

Prior attempts to fill detector perforations with either LiF or B have thus far included physical vapor deposition with thermal and e-beam evaporation (FIG. 32), powder filling with ultra-sonics (FIG. 33), thermal melting (FIG. 34), and plasma sputtering. These methods are described in U.S. Pat. No. 6,545,281 B1 and U.S. Pat. No. 7,164,138 B2. All of these methods have shortcomings and are not optimal in filling of the perforations in semiconductor diode detector structures.

Physical vapor deposition as suggested in the prior art of U.S. Pat. No. 6,545,281 B1 and U.S. Pat. No. 7,164,138 B2 was successfully used to fill the so described perforated diodes. This technique requires that either the B or LiF source material be placed in a thermally tolerant holder, such as a graphite crucible or a tungsten filament "boat." The holder is filled with material and is then placed in a vacuum chamber. The perforated structures are then placed inside the vacuum chamber with the perforations of the structures facing directly at the material-filled holder. A vacuum is pulled on the deposition system such that the mean free path of a free particle ranges above 50 cm, preferably greater than 1 meter. The LiF-filled or B-filled holder is heated to high temperatures such that the source material melts and evaporates. This is usually achieved by directing an energetic electron beam into the LiF-filled or B-filled crucible, or by passing a high current through the LiF-filled or B-filled filament. The evaporated LiF molecules or B atoms stream in straight paths from the holder, some of which strike the perforated diode structure. The LiF or B material can enter into the holes and partially fill them. Further, the LiF or B material attaches to the surface around the holes.

This method has problems, for it only works for very shallow holes. Deeper holes become plugged up. FIG. 32 shows a cross section of a shallow LiF-filled hole that has been partially filled by thermal evaporation. The hole is becoming blocked or plugged from LiF closing the hole off at the entrance. As a result, the hole can neither be completely filled, nor can deep holes be filled using this technique. This result has been observed for physical vapor deposition of B in perforations [1,4]. Sputtering, another vacuum deposition method, has the same above-noted problems as physical vapor deposition.

Powder filling as suggested in prior art U.S. Pat. No. 6,545,281 B1 and U.S. Pat. No. 7,164,138 B2 has also been used. As described therein, either B or LiF powder is spread over a perforated surface and spread powder is either ultrasonically shaken into the holes or is physically pressed into the holes. Ultrasonic vibration does assist with the B powder filling, however it does not work well for LiF powder filling. Although the method does work to partially fill the holes with B powder and for LiF powder as shown in FIG. 33, the void space left behind in the holes can amount to over 30% unused space. Furthermore, the techniques are labor intensive and unsuitable for mass production.

Thermal melting as suggested in prior art U.S. Pat. No. 6,545,281 B1 and U.S. Pat. No. 7,164,138 B2 has been used for LiF, as shown in FIG. 34. In such a case, the LiF powder is spread over the semiconductor perforated structure. Thermal infra-red lamps are used to melt the LiF into the holes. While this method completely fills the holes, it also ruins the diode properties. Both Li and B are dopant impurities in Si, and thermal melting causes the Li or B to ruin the rectifying junctions. Further, the melting point of B exceeds 1200° C. in vacuum, making the method impractical for serious processing in semiconductor diodes.

The following U.S. patents are also related to the present invention: RE35,908 E; 5,629,523 A; 5,880,471 A; 5,940,460 A; and 6,479,826 B1.

SUMMARY OF THE PRIOR ART

Boron-10 ($^{10}$B) and Lithium-6 Fluoride (6LiF) coated semiconductor detectors have undergone investigation as potentially useful thermal and epithermal neutron detectors. The device technology has been proven to be radiation hard and capable of withstanding intense radiation fields. The design consists of a semiconductor diode coated with either $^{10}$B or $^{6}$LiF. Neutrons interact in the films, producing detectable reaction products from either the $^{10}$B(n,α)$^{7}$Li or $^{6}$LiF(n,α)$^{3}$H reactions. The devices are relatively insensitive to gamma rays, thereby providing a good neutron to gamma ray rejection ratio. At a lower level discriminator setting equivalent to 300 keV, common thin-film-coated devices have a maximum theoretical thermal neutron (0.0259 eV) detection efficiency of only 3.95% for $^{10}$B-coated devices and only 4.3% for $^{6}$LiF-coated devices.

A recent design that incorporates the use of perforations backfilled with neutron reactive material can increase this efficiency by a factor of 10. One variation of the device utilizes a semiconductor wafer with a matrix of evenly spaced circular holes filled with neutron reactive material such as $^{10}$B or $^{6}$LiF. The holes are etched into both the front and the back of the device such that the penetrations from one side slide in between the penetrations from the other side. Another design uses an array of straight etched channels all backfilled with neutron reactive materials material such as $^{10}$B or $^{6}$LiF. The overall effect allows for the semiconductor wafer to be completely permeated with neutron reactive material, along with the traditional coatings on the front and back planar surfaces. Two effects allow for an overall improvement in efficiency, those being (1) a significant increase of reactive material contacting the semiconductor material, and (2) an increased probability of a reaction product entering the semiconductor detector.

However, the circular hole and straight channel designs have problems that cause the devices to perform poorly at particular angles to neutron sources in which neutrons can "stream" through the device at lower detection efficiencies. Further, the basic straight channel design leaves behind weak and easily broken fins of semiconductor material that separate the straight channels, hence the device is fragile. Perforated structures built as described in previous works have severe leakage currents due to poor insulation between the perforations and the reverse biased diode junctions. Finally, a method to fill the perforations, although demonstrated in previous works, has been elusive.

SUMMARY OF THE INVENTION

An object of the present invention is to provide non-streaming high-efficiency perforated semiconductor neutron detectors, methods of making same and measuring wands and detector modules utilizing same, wherein in at least one embodiment of the invention sinuous channels such as chevron, sinusoidal, or circular channels are provided to correct the angular streaming problem while mechanically strengthening the semiconductor fins dividing the channels. Also, in at least one embodiment of the invention, a process is provided that reduces leakages currents while allowing for a straight-forward method to backfill the perforations with neutron reactive materials such as $^{10}$B or $^{6}$LiF.

In carrying out the above object and other objects of the present invention, an apparatus is provided for efficiently detecting neutrons. The apparatus includes a particle-detecting first substrate having top and back surfaces and an array of sinuous fins spaced apart by a corresponding array of sinuous channels at the top surface. The apparatus further includes neutron-responsive material disposed in the array of sinuous channels. The material is responsive to neutrons absorbed thereby for releasing ionizing radiation reaction products wherein the sinuous shape of the fins and channels strengthens the fins and reduces neutron streaming effects whereby the apparatus has a relatively flat and uniform detection efficiency response.

The sinuous fins and channels may be chevron-shaped, sinusoidal-shaped, or circularly-shaped.

The top and back conductive contacts may be coupled to the first substrate at the top and back surfaces, respectively.

The contacts may include steering contacts and a collecting contact.

The fins may have conductive doped regions at the top surface spaced away from the channels. The walls which define the channels may be coated with an insulating layer to reduce leakage current.

The top conductive contacts may be Schottky barrier, diffused dopant or metal ohmic contacts.

The first substrate may have a doped region at the back surface to increase coupling of the back conductive contact to the substrate.

The neutron responsive material may include at least one of B or B compounds, Li or Li compounds, Gd or Gd compounds, U or Uranium compounds, Th or Th compounds, and Cd or Cd compounds.

A neutron-responsive layer may be disposed on the neutron-responsive material disposed in the array of sinuous channels.

The substrate may be composed primarily of a semiconductor material.

The semiconductor material may be silicon, silicon carbide, gallium arsenide, gallium nitride, indium phosphide, cadmium telluride, cadmium-zinc-telluride, gallium phosphide, mercuric iodide, or lead iodide.

The apparatus may further include a particle-detecting second substrate having neutron-responsive material disposed in cavities of the second substrate and stacked on the first substrate.

The neutron-responsive material may also be disposed as layers between the substrates.

Further in carrying out the above object and other objects of the present invention, a method for filling perforations which extend into a particle-detecting semiconductor substrate from a top portion of the substrate towards a back portion of the substrate with a neutron-responsive material to form a neutron detector is provided. The method includes evaporating the neutron-responsive material to obtain vaporized neutron-responsive material. The method still further includes establishing a temperature gradient across the substrate so that the top portion of the substrate is relatively warmer than the relatively cooler back portion of the substrate. The method further includes transporting the vaporized neutron-responsive material to the substrate so that the vaporized neutron-responsive material initially condenses at the relatively cool bottom portion of the substrate rather than the relatively warm top portion of the substrate. The perforations of the substrate are filled from the bottom portion of the substrate up to the top portion of the substrate.

The step of transporting may be performed with a carrier gas. The method may further include preventing the carrier gas from flowing completely through the substrate such that the method is a static method.

The method may further include allowing the carrier gas to flow completely through the substrate such that the method is a dynamic method.

Still further in carrying out the above object and other objects of the present invention, a measuring wand is provided. The wand includes an elongated housing and an apparatus for efficiently detecting neutrons mounted within the housing. The apparatus includes a particle-detecting substrate having top and back surfaces. The apparatus further includes an array of sinuous fins spaced apart by a corresponding array of sinuous channels at the top surface. Neutron-responsive material is disposed in the array of sinuous channels. The material is responsive to neutrons absorbed thereby for releasing ionizing radiation reaction products. The sinuous shape of the fins and channels strengthens the fins and reduces neutron streaming effects. The apparatus has a relatively flat and uniform detection efficiency response.

The wand may have a source of electrical power disposed within the housing for powering the wand.

The wand may have a gamma ray detector mounted within the housing in line with the apparatus to measure or subtract gamma ray background.

The wand may have a readout display mounted on the housing to provide a visual indication of measured radiation.

The wand may have manual operable controls mounted on the housing to operate the wand.

Yet, still further in carrying out the above object and other objects of the present invention, a detector module for remote neutron sensing is provided. The module includes first apparatus for efficiently detecting neutrons. The apparatus includes a particle-detecting substrate having top and back surfaces and includes an array of sinuous fins spaced apart by a corresponding array of sinuous channels at the top surface. The apparatus further includes neutron-responsive material disposed in the array of sinuous channels, the material being responsive to neutrons absorbed thereby for releasing ionizing radiation reaction products wherein the sinuous shape of the fins and channels strengthens the fins and reduces neutron streaming effects whereby the apparatus has a relatively flat and uniform detection efficiency response. The module also includes means coupled to the first apparatus for determining a radiation unit of measure detected by the first apparatus.

The module may further include a source of electrical power for powering the module.

The module may further include a gamma ray detector to measure or subtract gamma ray background.

The module may further include a readout display to provide a visual indication of measured radiation.

The module may further include manual operable controls to operate the module.

The module may further include second apparatus for detecting fast neutrons and at least one of a moderator and shielding to assist the second apparatus in distinguishing between fast and thermal neutrons.

The means for determining may also be coupled to the second apparatus and the gamma ray detector for determining a dose of fast and thermal neutrons and gamma rays.

The module may further include a transmitter coupled to the first apparatus to transmit data based on the detected neutrons.

The module may further include a transmitter coupled to the means for determining for transmitting data based on the dose.

The module may further include means for determining spacial location of the module.

The module may further include a transmitter to transmit data based on detected neutrons and at least one of spectral energy information and detected gamma rays.

The new detectors operate at room temperature, are compact, rugged, and reliable in design. The compact neutron detectors can be used in a number of different scenarios in which tiny high-efficiency devices are needed, such as with personal dosimetry, overseas cargo monitoring, SNM or stockpile monitoring, neutron beam line monitoring, and reactor instrumentation, as well as commercial uses such as neutron radiography.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 23d is a view similar to the views of FIGS. 23b and 23c and yet still further illustrating the method of producing a non-streaming chevron channeled perforated neutron detector wherein the chevron-shaped channels are filled with neutron reactive material; the detector uses insulation in the channels and recessed doping around the channels to reduce leakage current; the detector is covered with the final layer of neutron reactive material;

FIG. 23e are schematic perspective views which show an embodiment of the invention in which two basic chevron trench detectors are folded together (i.e., open then closed) to face each other so that the substrates are stacked;

FIG. 26d are schematic perspective views which show an embodiment of the invention in which two low leakage current sinusoidal trench detectors are folded together (i.e., open then closed) to face each other so that the substrates are stacked;

FIG. 41a is an enlarged view of a portion of the view of FIG. 41 and depicting a neutron interacting in a perforation which is located between drift diode electrodes and filled with neutron reactive material;

DETAILED DESCRIPTION OF THE PREFERRED EMBODIMENT(S)

Non-Streaming Perforated Detector Designs to Produce Relatively Uniform Response for Improved Detection Efficiency As previously mentioned, prior art perforated detectors where the neutrons have straight streaming paths do not offer desired angular efficiencies. Therefore, more complicated geometries are desired. Also, the fragility of prior art detectors having straight channels results in reduced detector yield.

Figure 23:
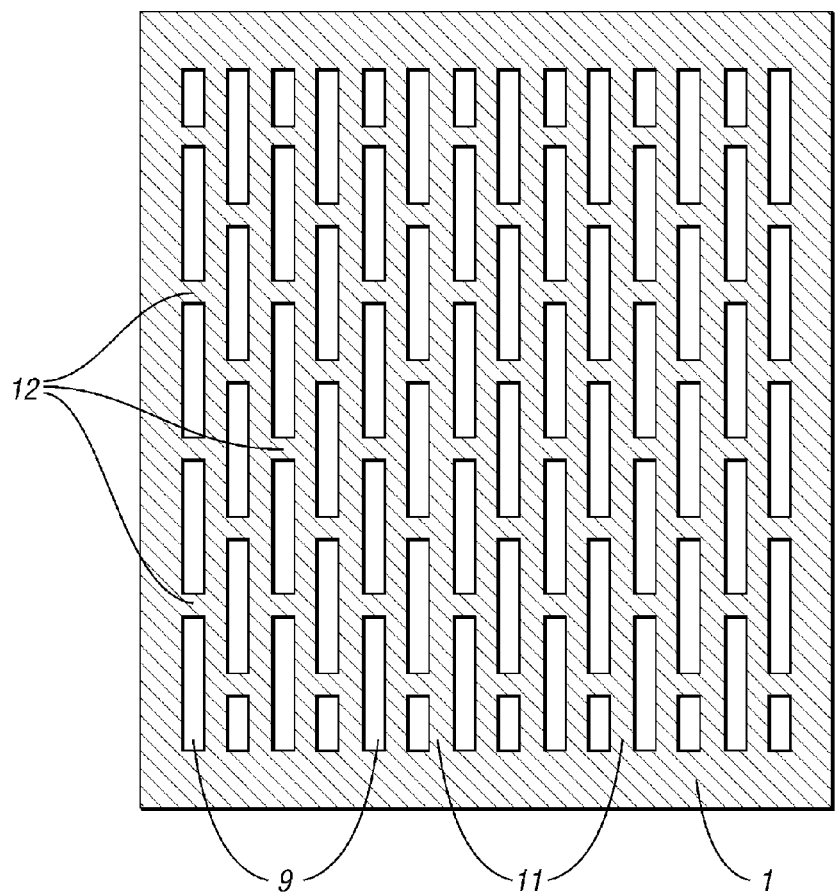
FIG. 23 is a top plan view of a detector constructed in accordance with an embodiment of the present invention and having reinforcing links 12 which make the resulting structure mechanically strong.
Figure 23A:
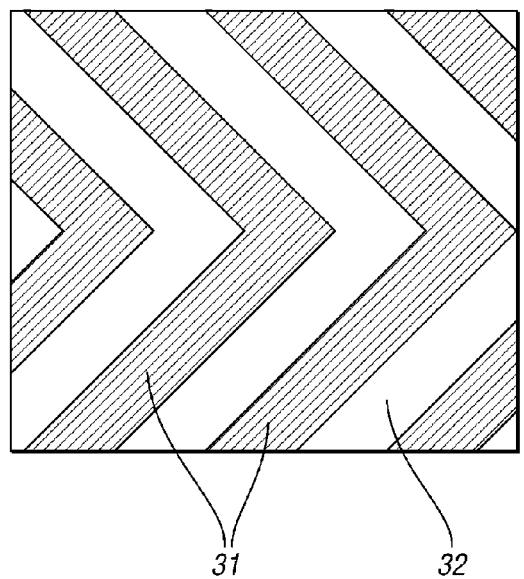
FIG. 23a is a top plan view of a portion of a detector constructed in accordance with another embodiment of the present invention and having a chevron channel design pattern which makes the resulting structure mechanically strong and provides a relatively flat polar and azimuthal angular response to neutrons.
Figure 23B:
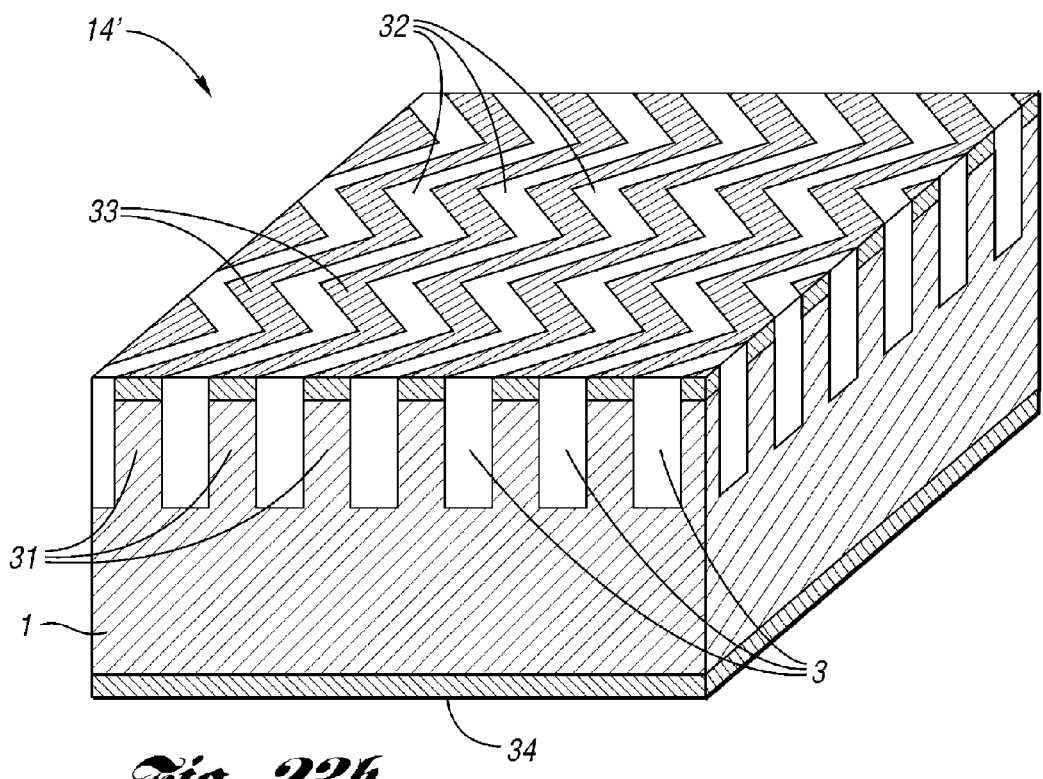
FIG. 23b is a perspective view of the detector of FIG. 23a and which illustrates one method of producing the non-streaming chevron channeled perforated neutron detector wherein the chevron-shaped channels are filled with neutron reactive material.
Figure 23C:
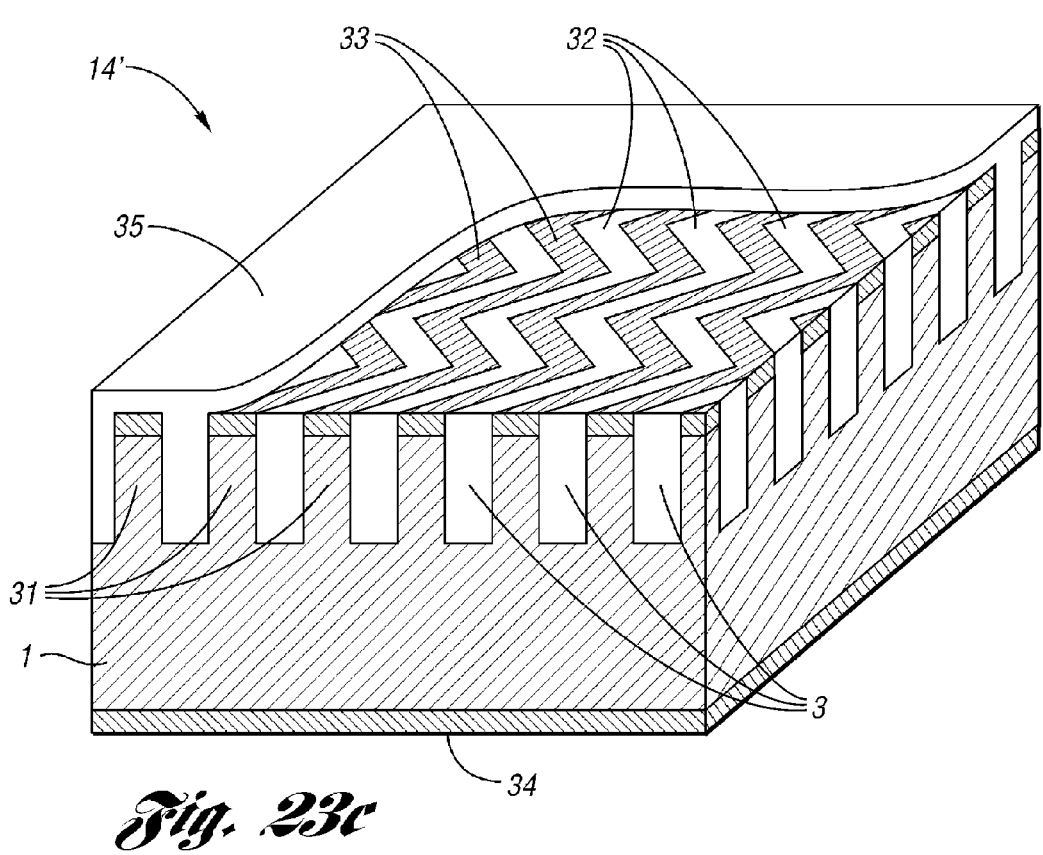
FIG. 23c is a view similar to the view of FIG. 23b and further illustrating the method of producing a non-streaming chevron channeled perforated neutron detector wherein the chevron-shaped channels are filled with neutron reactive material; the detector is covered with a final layer of neutron reactive material.
Figure 23B:
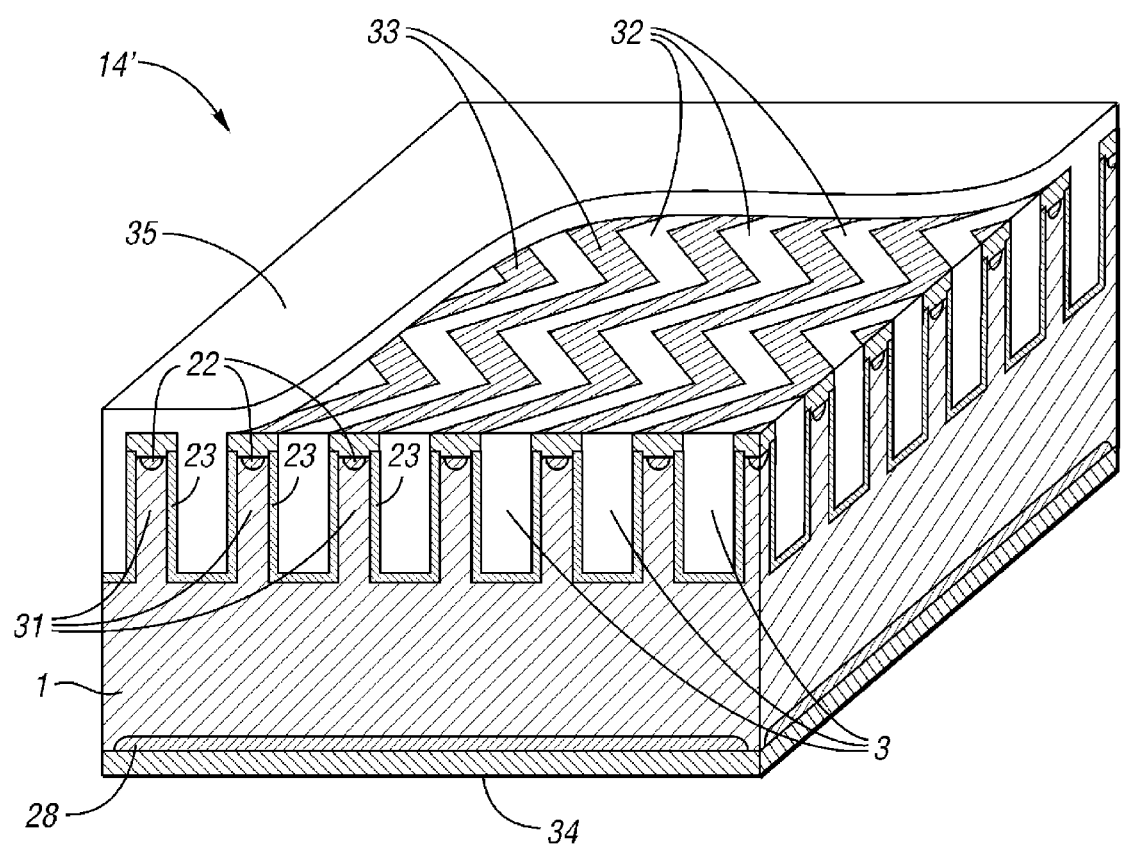
Figure 23C:
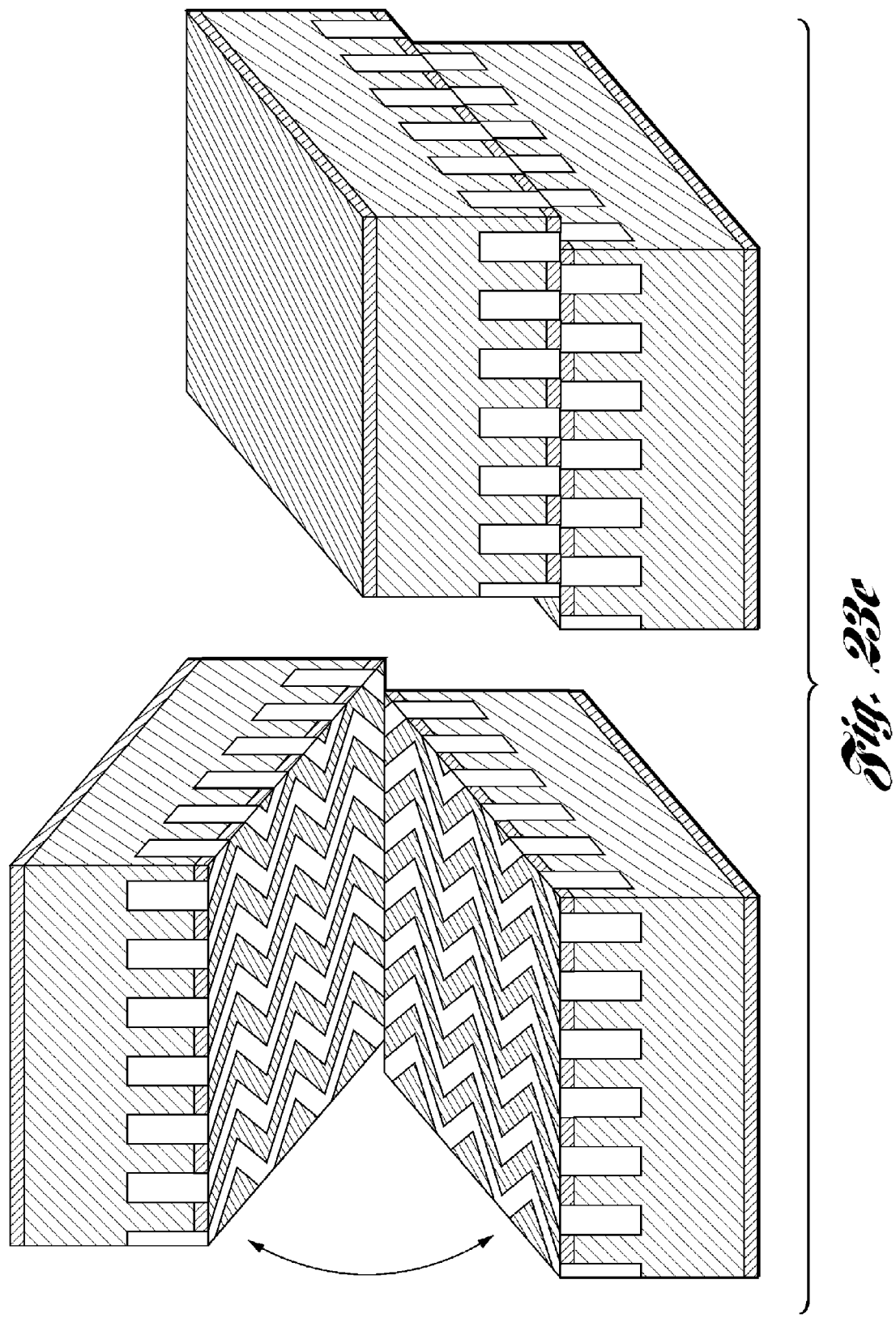

Referring now to FIG. 23, to improve the strength of such channels, reinforcing links 12 were added into the design of FIGS. 3, 6, 7, 8, 9 and 21 wherein the same or similar components have the same reference number. When taking this to an extreme, the end result is an array of chevron-shaped perforations covering the semiconductor to both improve the neutron detection efficiency response and mechanically strengthen the structure. The first alternative geometry considered was a chevron (zig-zagged channel) pattern as shown in FIGS. 23a, 23b, 23c and 23d.

Figure 24:
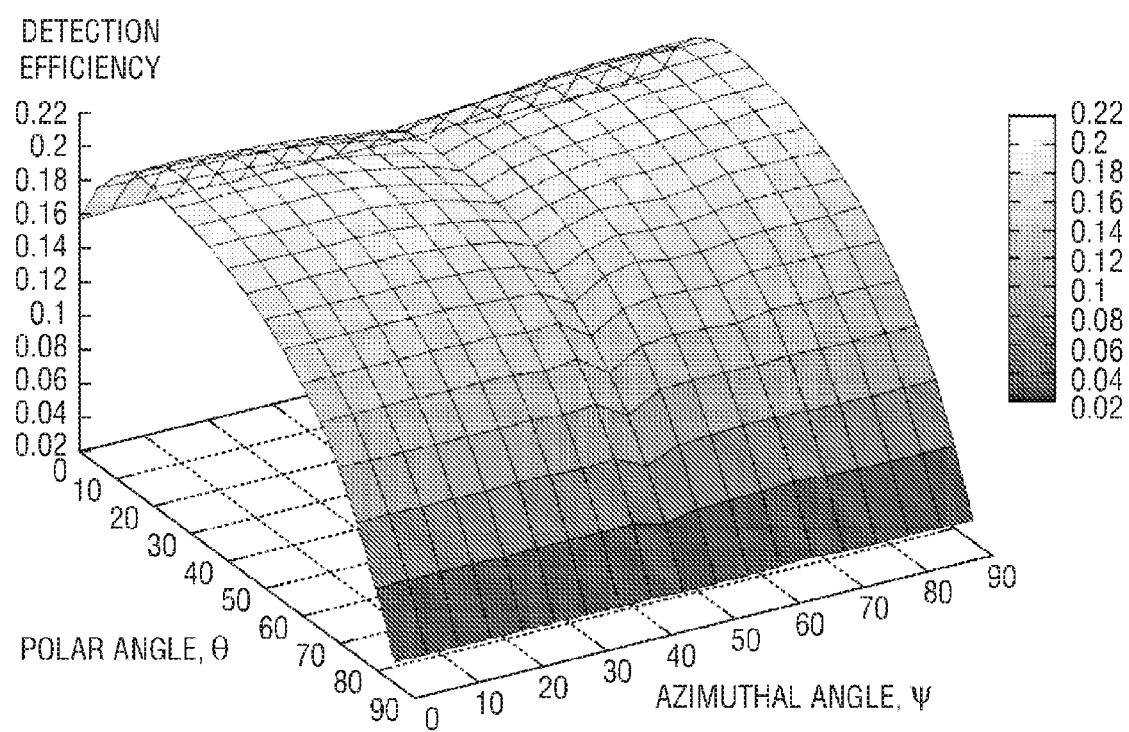
FIG. 24 is a 3-D graph which illustrates detection efficiency response of a chevron channel device having chevron channels filled with $^{10}$B; the device is simulated as having 4 micron wide and 30 micron deep chevron channels.
Figure 25:
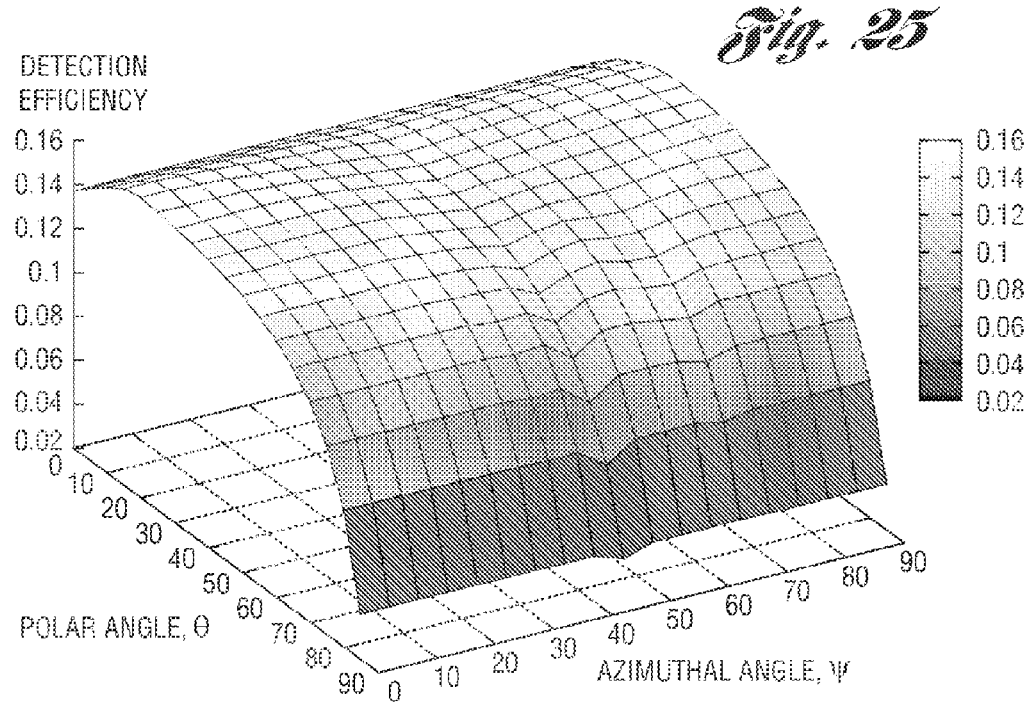
FIG. 25 is a 3-D graph which illustrates detection efficiency response of a chevron channel device having chevron channels filled with $^6$LiF; the device is simulated as having 30 micron wide and 100 micron deep chevron channels.

The response results were generated with a specialized neutron and ion transport code. FIGS. 24 and 25 present the results for $^{10}$B and $^6$LiF, respectively. The efficiency for the chevron-type detector 14' is relatively free of azimuthal dependence. The exception is at 45 degrees where neutrons can stream for short paths, but not all the way through the detector 14', without encountering absorbing material. While this is a vast improvement over the prior art channel detectors, it still is not the desired flat response.

Referring again to FIG. 23, there is shown an embodiment of the invention in which the semiconductor fins 11 separating the straight channel perforations 9 are reinforced by orthogonal semiconductor links 12. The semiconductor links 12 mechanically reinforce the semiconductor fins 11, which is an improvement over the weaker design of prior art which did not incorporate the links 12. The pattern shown in FIG. 23 is only one of many possible mechanically improved structures designed with the purpose of strengthening the fins 11.

Referring again to FIG. 23a, there is shown an embodiment of the invention which is an array pattern of chevron-shaped perforations 32 and fins 31 to be used for the pattern of a perforated detector. The chevron shape has multiple functions, two of which include mechanically strengthening the semiconductor fins 31 and reducing neutron streaming effects and thereby providing a flatter and more uniform neutron detection efficiency response for the detector.

Referring again to FIG. 23b, there is shown an embodiment of the invention of a perforated detector 14' with chevron channels 32 filled with neutron reactive material 3. Conductive contacts 33 are attached to the top of the chevron-shaped semiconductor fins 31. A back conductive contact 34 is attached to the semiconductor substrate 1. The conductive contacts 33 can be Schottky barrier contacts, diffused dopant contacts, or metal ohmic contacts. The neutron reactive material may be composed of B or B compounds, Li or Li compounds, Gd or Gd compounds, U or Uranium compounds, Th or Th compounds, Cd or Cd compounds, or any neutron reactive material that ejects ionizing radiation upon the absorption of a neutron.

Referring again to FIG. 23c, there is shown an embodiment of the invention of a perforated detector 14' with chevron channels 32 filled with neutron reactive material 3. Conductive contacts 33 are attached to the top of the chevron-shaped semiconductor fins 31. A back conductive contact 34 is attached to the semiconductor substrate 1. A final neutron reactive layer 35 covers the top of the device. The conductive contacts 33 can be Schottky barrier contacts, diffused dopant contacts, or metal ohmic contacts. The neutron reactive material may be composed of B or B compounds, Li or Li compounds, Gd or Gd compounds, U or Uranium compounds, Th or Th compounds, Cd or Cd compounds, or any neutron reactive material that ejects ionizing radiation upon the absorption of a neutron.

Referring again to FIG. 23d, there is shown an embodiment of the invention of a perforated detector 14' with chevron channels 32 filled with neutron reactive material 3. The device in FIG. 23d is an embodiment of the low leakage current design. Conductive contacts 33 are attached to the top of the chevron-shaped semiconductor fins 31. A back conductive contact 34 is attached to the semiconductor substrate 1. A doped region 28 can be used to improve the conductivity of the contact 34 to the semiconductor 1. A final neutron reactive layer 35 covers the top of the device. The conductive contacts 33 can be Schottky barrier contacts, diffused dopant contacts, or metal ohmic contacts. Below the conductive contacts 33 are selectively doped regions 22 spaced from the chevron perforations 32. An insulating layer 23 coats the walls of the chevron perforations 32. The neutron reactive material may be composed of B or B compounds, Li or Li compounds, Gd or Gd compounds, U or Uranium compounds, Th or Th compounds, Cd or Cd compounds, or any neutron reactive material that ejects ionizing radiation upon the absorption of a neutron.

Referring now to FIG. 23e, there is shown an embodiment of the invention (both open and closed) of a perforated detector with chevron channels filled with neutron reactive material in which the devices have been placed one on the other such that the chevrons are not aligned. The chevron trenches of one device align with the chevron fins of the other, thereby preventing streaming from occurring.

Figure 23F:
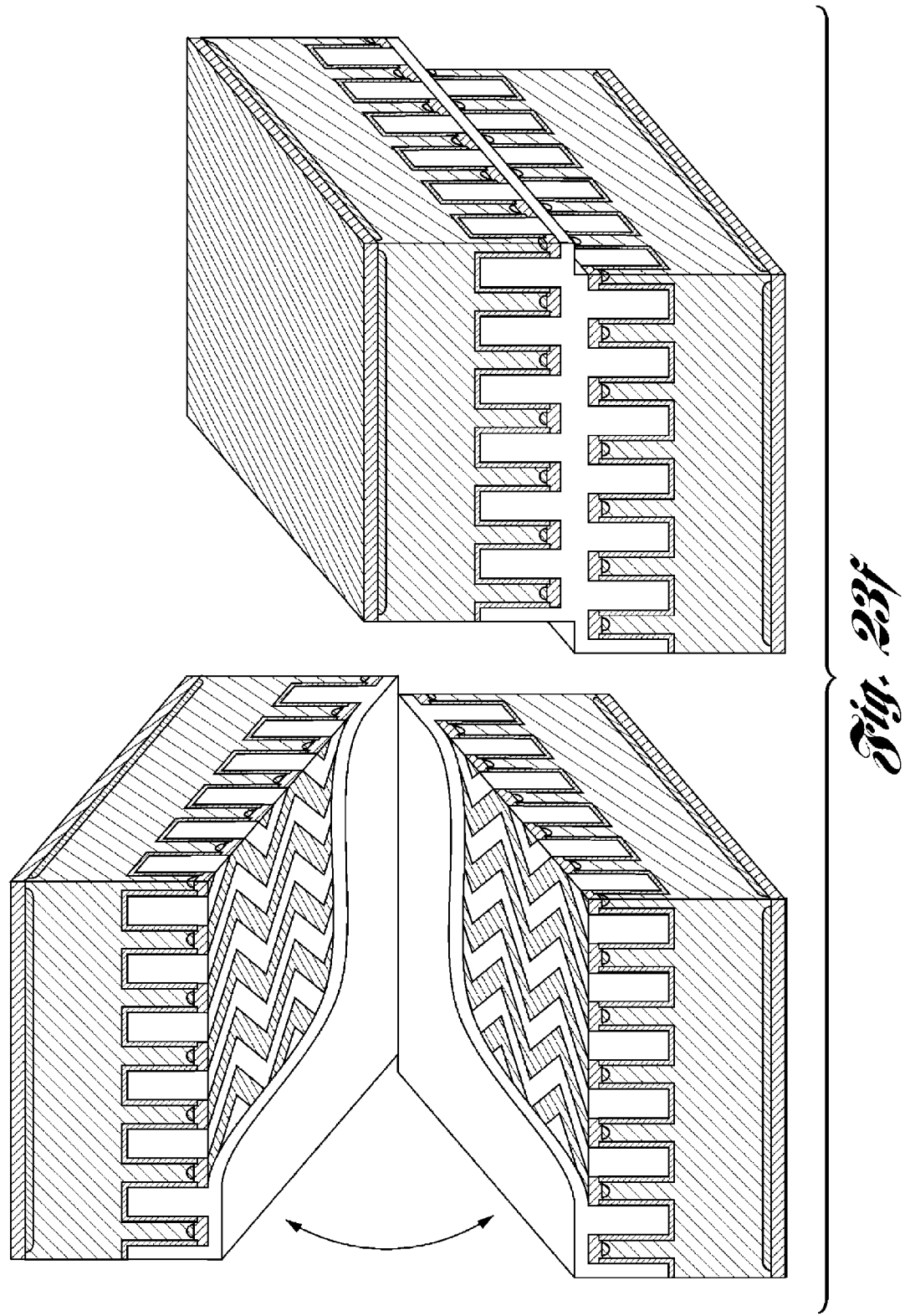
FIG. 23f are schematic perspective views which show an embodiment of the invention in which two low leakage current chevron trench detectors are folded together (i.e., open then closed) to face each other so that the substrates are stacked.

Referring now to FIG. 23f, there is shown an embodiment of the invention (both open and closed) of a perforated low-leakage current detector with chevron channels filled with neutron reactive material in which the devices have been placed one on the other such that the chevrons are not aligned. The chevron trenches of one device align with the chevron fins of the other, thereby preventing streaming from occurring.

The final design considered was a sinusoidal design as depicted in FIGS. 26, 26a, 26b and 26c. The sinusoidal detector 14' illustrated therein has two additional degrees of freedom that the previous designs do not have. The previous designs can vary the width of the absorber and the width of the semiconductor. The sinusoidal design of FIG. 26 (in addition to these two widths) has both a variable amplitude of the wave, A, and a variable period of the wave, w.

Figure 26:
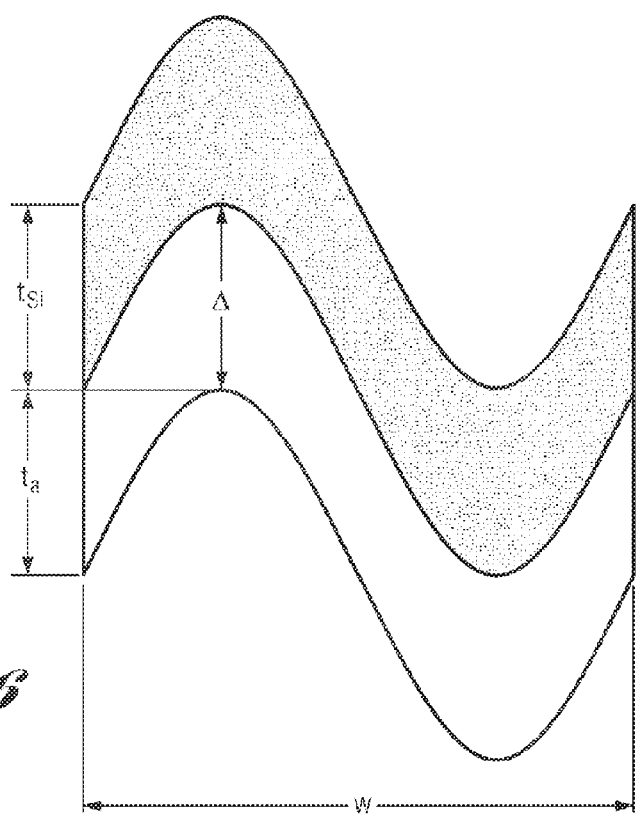
FIG. 26 is a top plan view of a portion of a detector constructed in accordance with yet another embodiment of the present invention and having sinusoidal channel design pattern which makes the resulting structure mechanically strong and provides a relatively uniform polar and azimuthal angular response to neutrons; design dimensions for the sinusoidal perforated detector are shown and described herein.
Figure 26A:
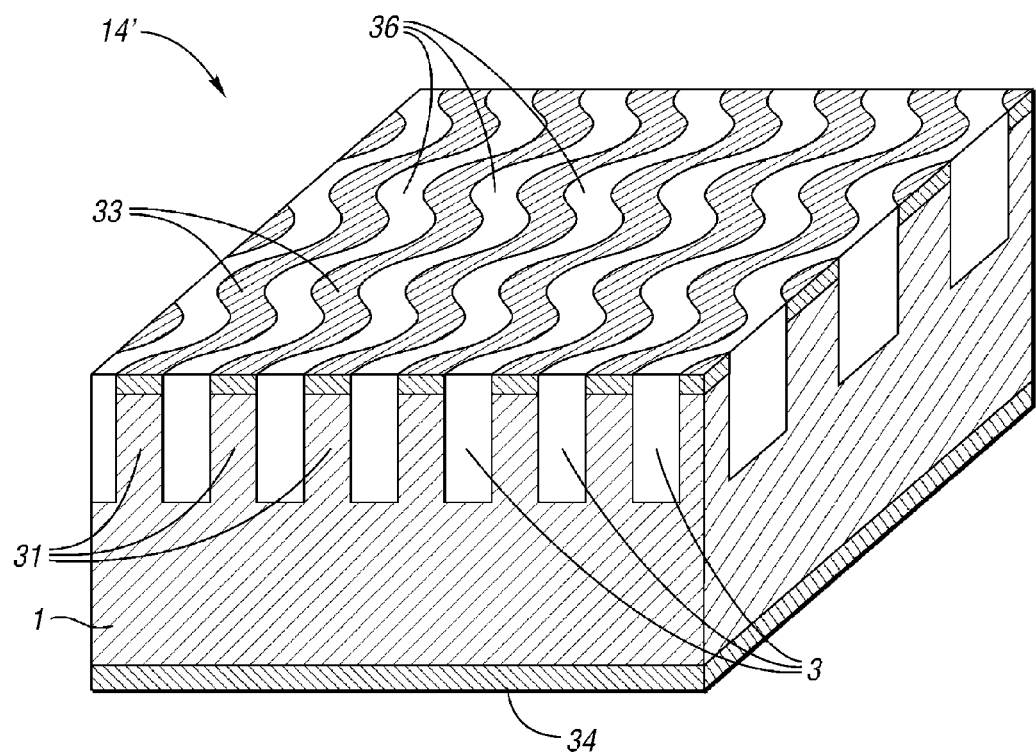
FIG. 26a is a perspective view of the detector of FIG. 26 and which illustrates one method of producing a non-streaming sinusoidal channeled perforated neutron detector wherein the sinusoidal-shaped channels are filled with neutron reactive material.
Figure 26B:
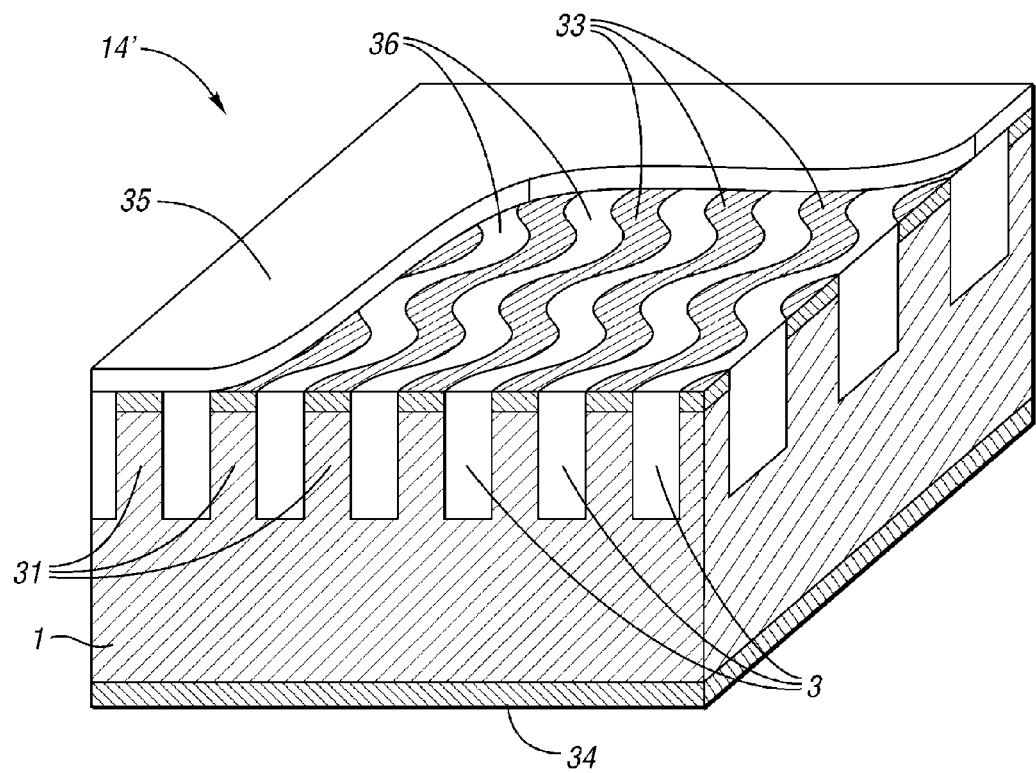
FIG. 26b is a view similar to the view of FIG. 26a and further illustrating the method of producing a non-streaming sinusoidal channeled perforated neutron detector wherein the sinusoidal-shaped channels are filled with neutron reactive material; the detector is covered with a final layer of neutron reactive material.
Figure 26C:
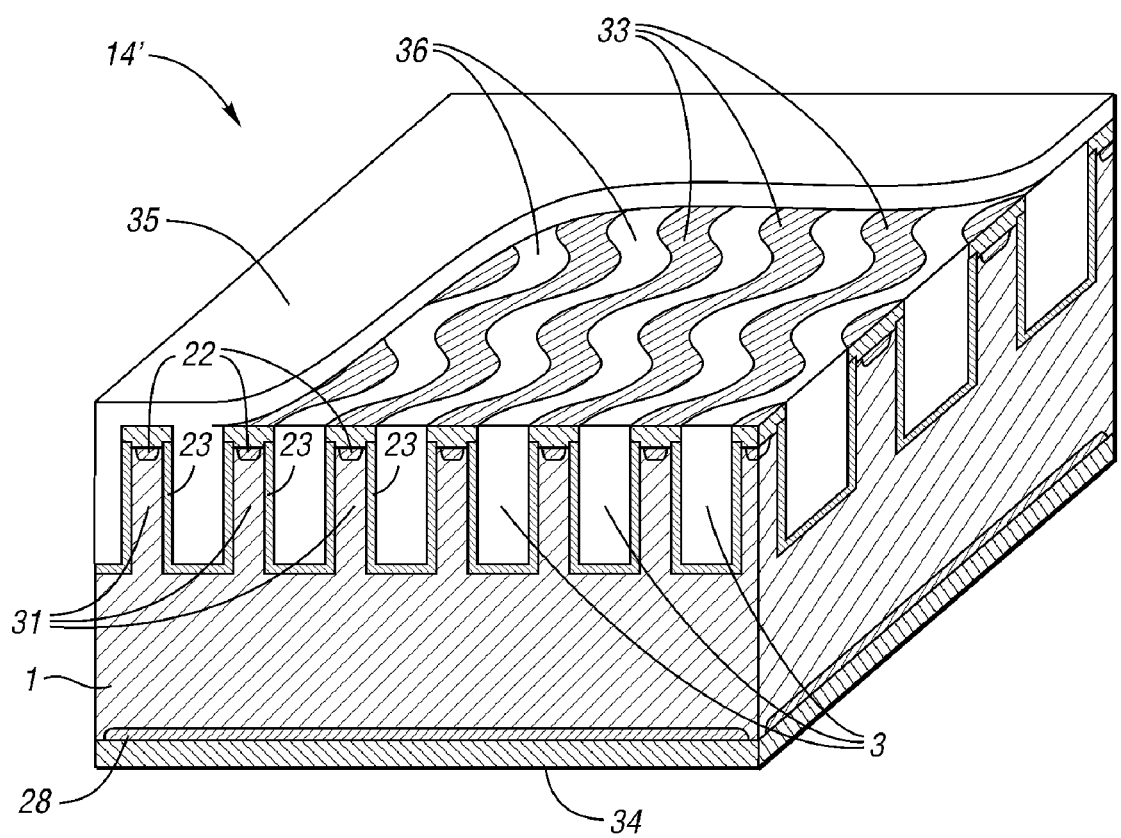
FIG. 26c is a view similar to the views of FIGS. 26a and 26b and yet still further illustrating the method of producing a non-streaming sinusoidal channeled perforated neutron detector wherein the sinusoidal-shaped channels are filled with neutron reactive material; the detector uses insulation in the channels and recessed doping around the channels to reduce leakage current; the detector is covered with the final layer of neutron reactive material.
Figure 26B:
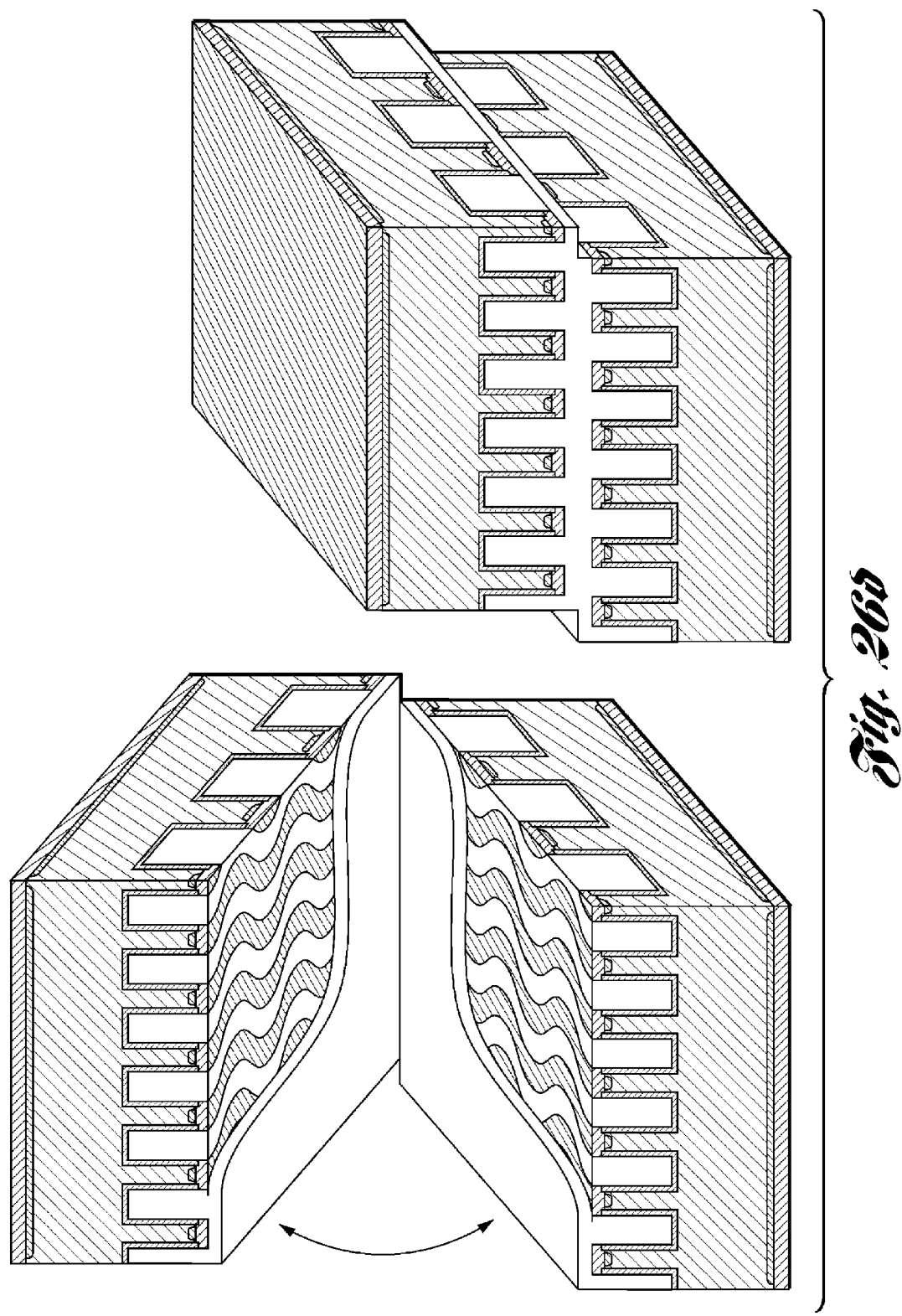
Figure 27:
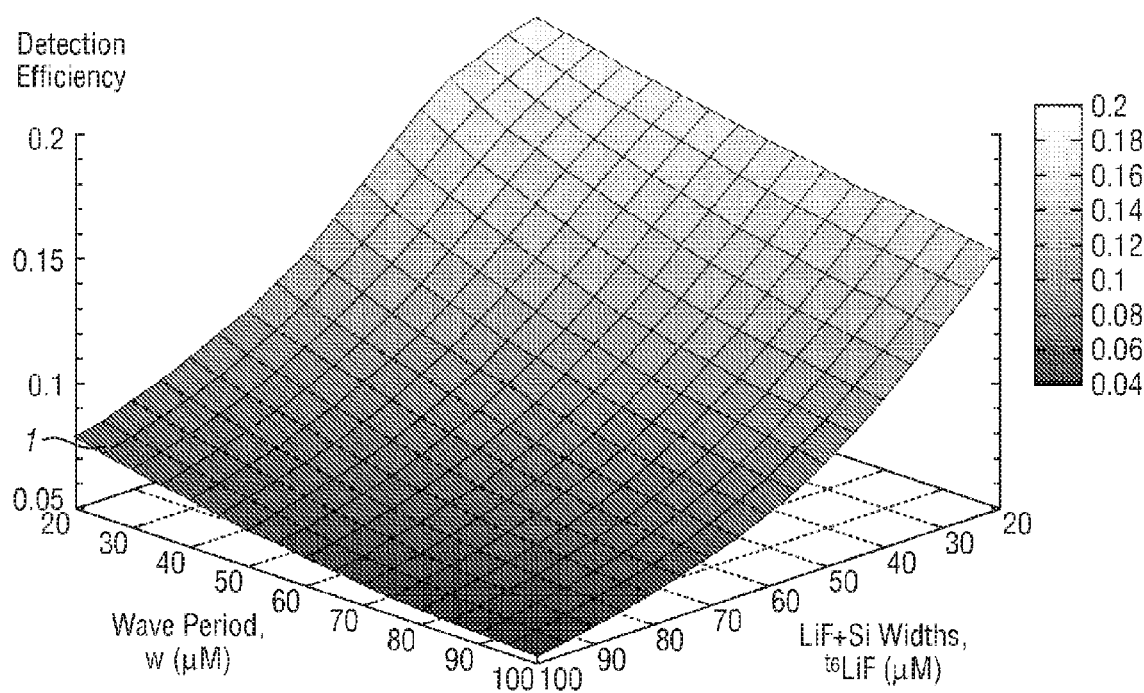
FIG. 27 is a 3-D graph which illustrates optimum sinusoidal dimensions for a sinusoid wave amplitude of 20 microns.
Figure 28:
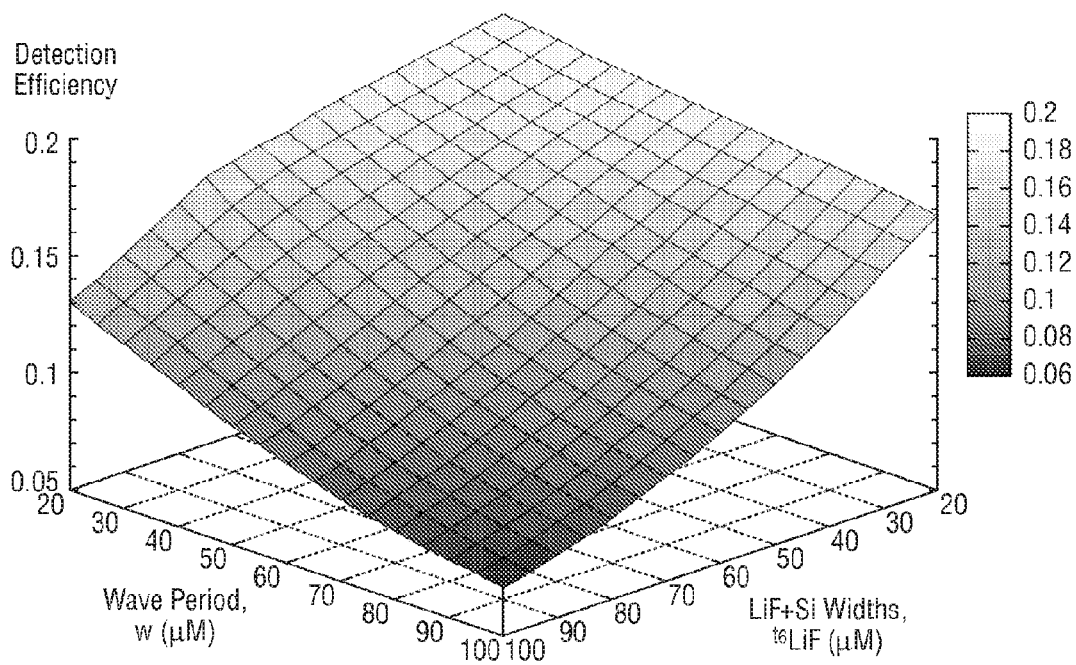
FIG. 28 is a 3-D graph which illustrates optimum sinusoidal dimensions for a sinusoid wave amplitude of 40 microns.
Figure 29:
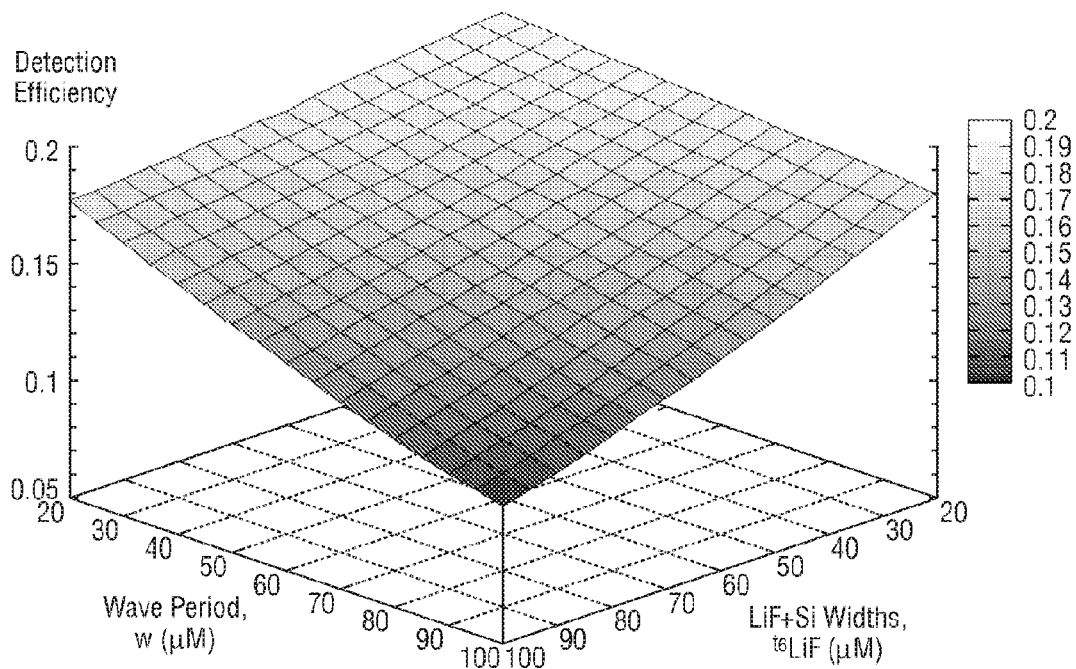
FIG. 29 is a 3-D graph which illustrates optimum sinusoidal dimensions for a sinusoid wave amplitude of 80 microns.

The 3-D graphs of FIGS. 27 through 29 show the detection efficiency for a $^6$LiF-filled perforated sinusoidal groove detector such as the detector 14' of FIGS. 26a-c having a fixed wave amplitude but variable absorber and substrate thicknesses and wave periods. To remove an additional degree of freedom the thickness of absorber is equal to the thickness of substrate.

Referring again to FIG. 26, there is shown an embodiment of the invention which is an array pattern of sinusoidal-shaped perforations and fins to be used for the pattern of a perforated detector. The sinusoidal shape has multiple functions, two of which include mechanically strengthening the semiconductor fins and reducing neutron streaming effects and thereby providing a flatter and more uniform neutron detection efficiency response for the detector.

Referring again to FIG. 26a, there is shown an embodiment of the invention of a perforated detector 14' with sinusoidal channels 36 filled with neutron reactive material 3. Conductive contacts 33 are attached to the top of the sinusoidal-shaped semiconductor fins 31. A back conductive contact 34 is attached to the semiconductor substrate 1. The conductive contacts 33 can be Schottky barrier contacts, diffused dopant contacts, or metal ohmic contacts. The neutron reactive material may be composed of B or B compounds, Li or Li compounds, Gd or Gd compounds, U or Uranium compounds, Th or Th compounds, Cd or Cd compounds, or any neutron reactive material that ejects ionizing radiation upon the absorption of a neutron.

Referring again to FIG. 26b, there is shown an embodiment of the invention of a perforated detector 14' with sinusoidal channels 36 filled with neutron reactive material 3. Conductive contacts 33 are attached to the top of the sinusoidal-shaped semiconductor fins 31. A back conductive contact 34 is attached to the semiconductor substrate 1. A final neutron reactive layer 35 covers the top of the device. The conductive contacts 33 can be Schottky barrier contacts, diffused dopant contacts, or metal ohmic contacts. The neutron reactive material may be composed of B or B compounds, Li or Li compounds, Gd or Gd compounds, U or Uranium compounds, Th or Th compounds, Cd or Cd compounds, or any neutron reactive material that ejects ionizing radiation upon the absorption of a neutron.

Referring again to FIG. 26c, there is shown an embodiment of the invention of a perforated detector 14' with sinusoidal channels 36 filled with neutron reactive material 3. The device in FIG. 26c is an embodiment of the low leakage current design. Conductive contacts 33 are attached to the top of the sinusoidal-shaped semiconductor fins 31. A back conductive contact 34 is attached to the semiconductor substrate 1. A doped region 28 can be used to improve the conductivity of the contact 34 to the semiconductor 1. A final neutron reactive layer 35 covers the top of the device. The conductive contacts 33 can be Schottky barrier contacts, diffused dopant contacts, or metal ohmic contacts. Below the conductive contacts are selectively doped regions 22 recessed from the sinusoidal perforations 32. An insulating layer 23 coats the walls of the sinusoidal perforations 32. The neutron reactive material may be composed of B or B compounds, Li or Li compounds, Gd or Gd compounds, U or Uranium compounds, Th or Th compounds, Cd or Cd compounds, or any neutron reactive material that ejects ionizing radiation upon the absorption of a neutron.

Referring now to FIG. 26d, there is shown an embodiment of the invention of a perforated low-leakage current detector with sinusoidal channels filled with neutron reactive material in which the devices have been placed one on the other such that the sinusoids are not aligned. The sinusoidal trenches of one device align with the sinusoidal fins of the other, thereby preventing streaming from occurring.

Figure 30:
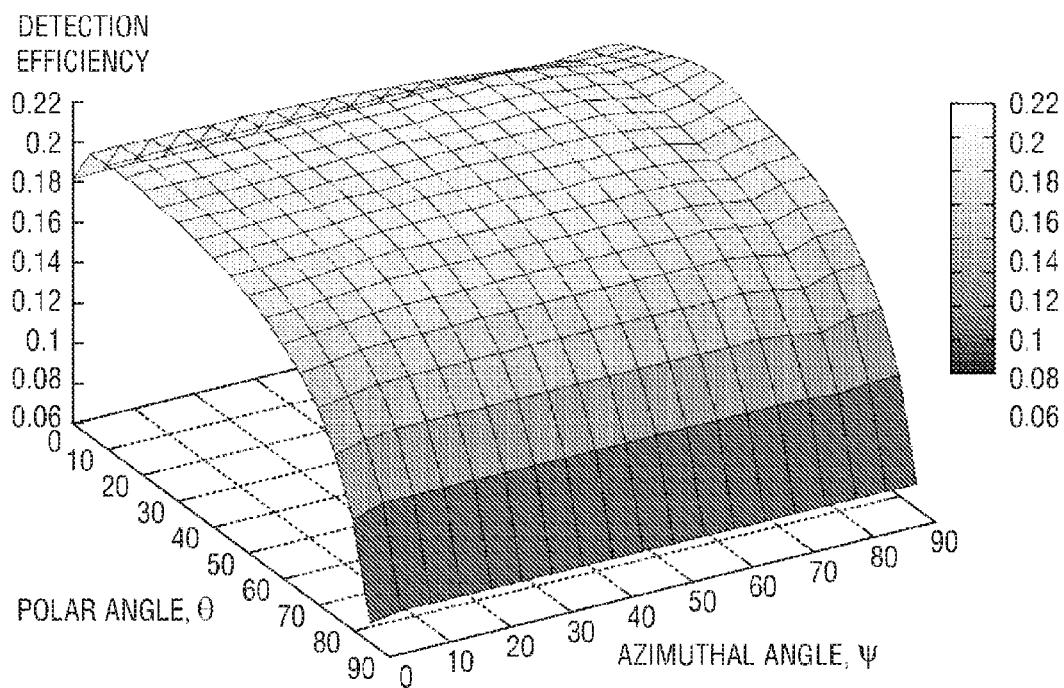
FIG. 30 is a 3-D graph which illustrates detection efficiency response of a sinusoidal channel device having sinusoidal channels filled with $^6$LiF; the device is simulated as having 30 micron wide and 100 micron deep sinusoidal channels; the wave amplitude is 40 microns; the figure shows a flat response to neutrons across the azimuthal angle and up to 60 degrees in the polar angle (i.e., much better than circular hole, straight channel, or even the chevron designs)

The angular response of a $^6$LiF-filled sinusoidal groove detector such as the detector 14' of FIGS. 26a-c is shown by the 3-D graph of FIG. 30. The dimensions were chosen based on the results shown in FIGS. 27 through 29. In all cases it is desirable to have relatively small channel widths and a relatively small period. A 30 micron groove width was chosen for the study along with a 30 micron period and a 40 micron wave amplitude. The response is the flattest across the azimuth of all designs considered with the maximum variation being about 3% compared to a 7% variation for chevron grooves.

Method to Produce Low Leakage Current Detectors

Figure 1:
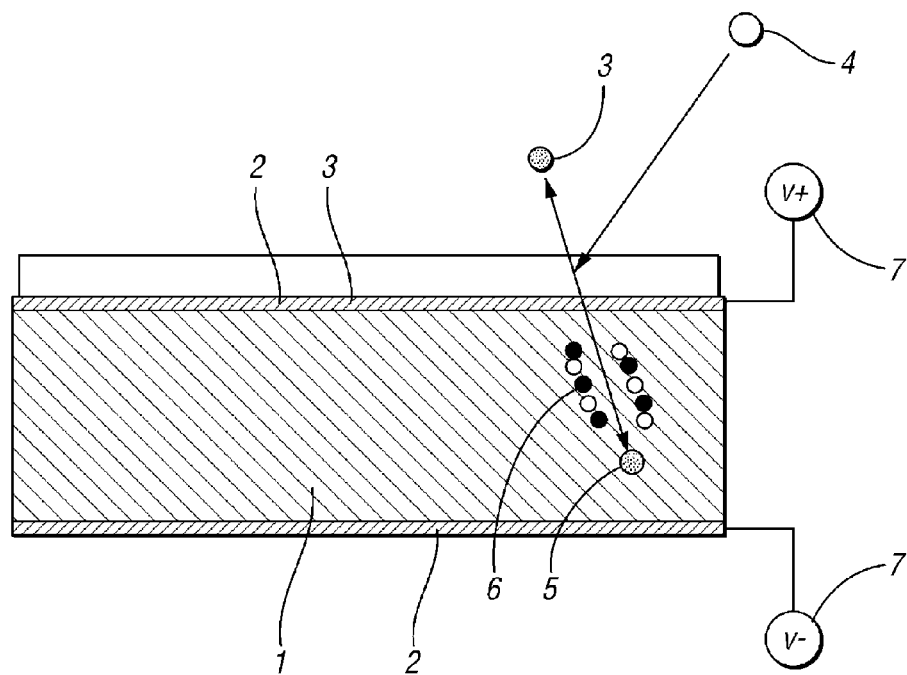
FIG. 1 is a side sectional view which illustrates the basic construction of a coated semiconductor neutron detector from the prior art; neutrons interact in the coating, thereby releasing detectable charged particles; for $^{10}B$ and $^{6}Li$-based films, only one particle from the interaction can enter the detector.
Figure 2:
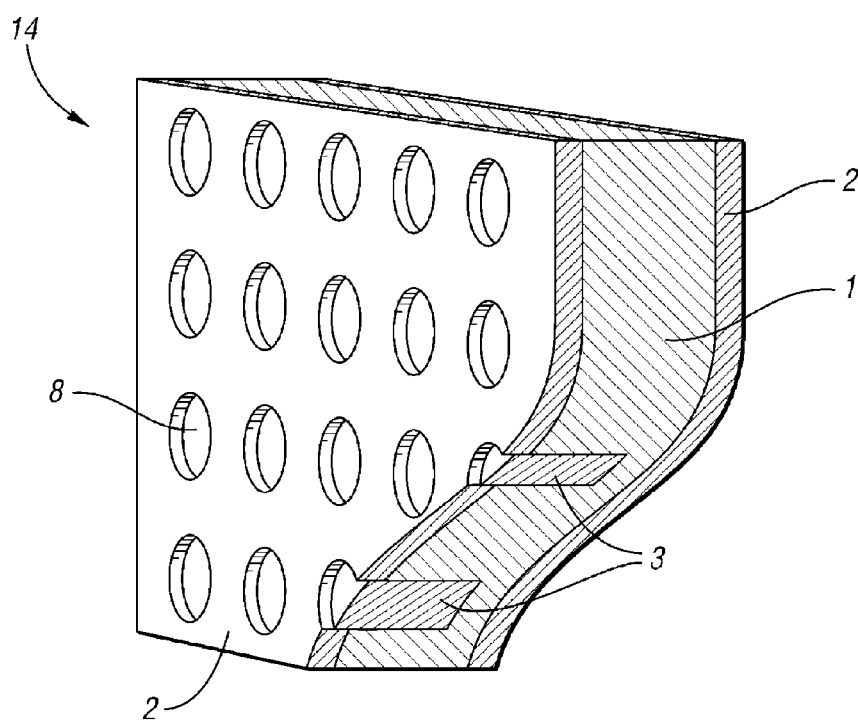
FIG. 2 is a perspective view, partially broken away and in cross-section which illustrates the basic construction of a perforated semiconductor neutron detector from the prior art and shows a device that uses circular holes backfilled with neutron reactive material.
Figure 3:
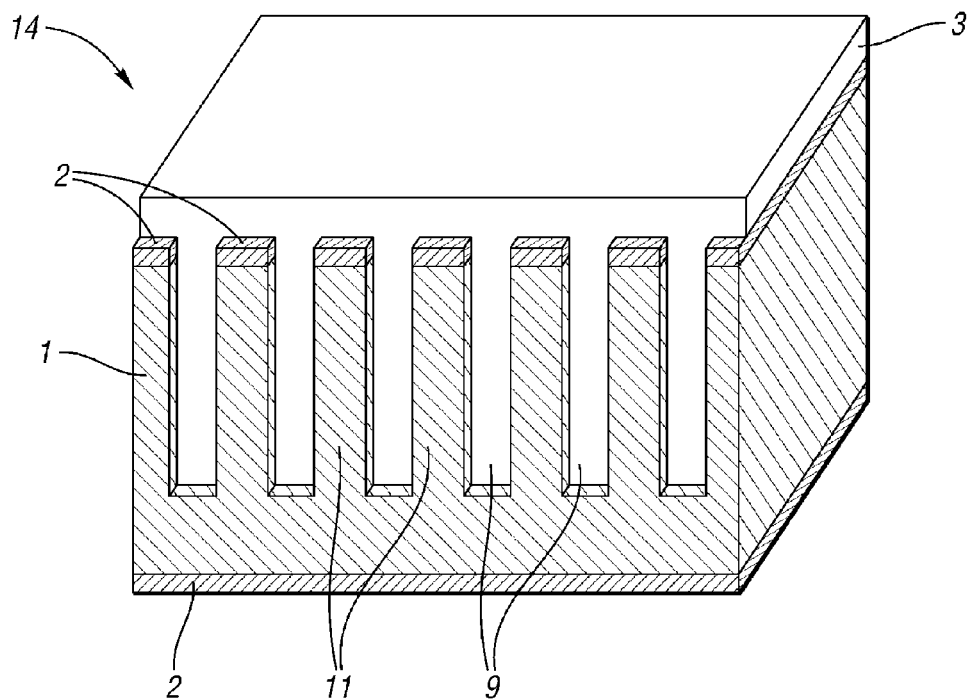
FIG. 3 is a perspective view which illustrates the basic construction of a perforated semiconductor neutron detector from the prior art and shows a device that uses straight channels backfilled with neutron reactive material.
Figure 4:
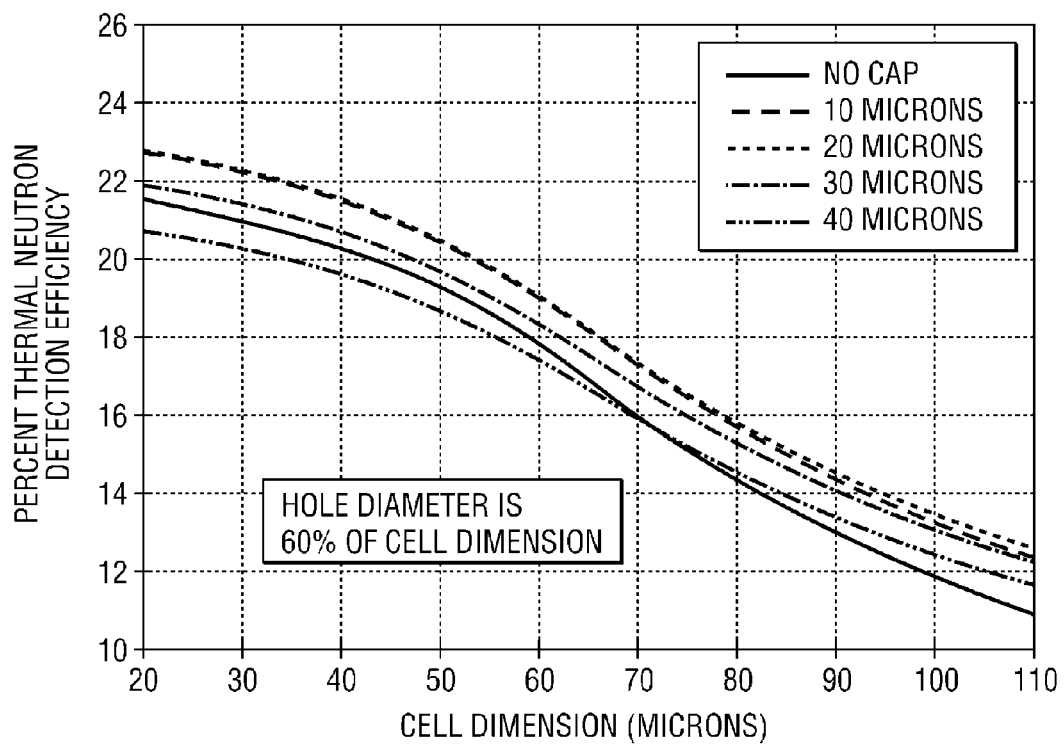
FIG. 4 is a graph which illustrates calculated efficiencies of neutron irradiation perpendicular to a LiF-filled, circular hole perforation designed perforated detector.
Figure 5:
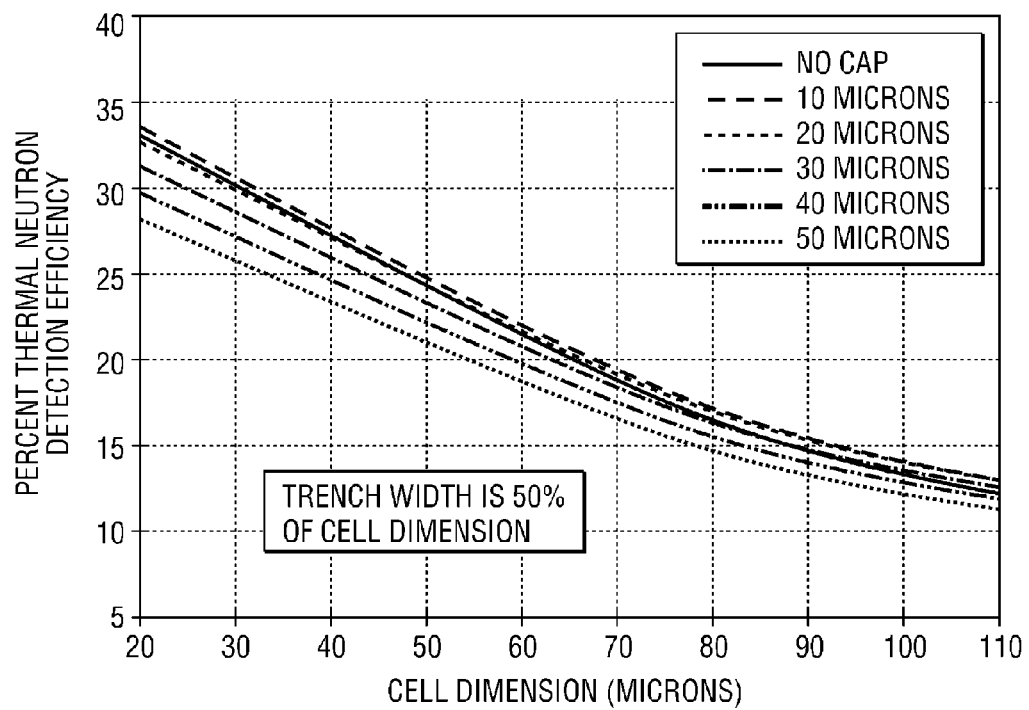
FIG. 5 is a graph which illustrates calculated efficiencies of neutron irradiation perpendicular to a LiF-filled, straight channel perforation designed perforated detector.
Figure 6:
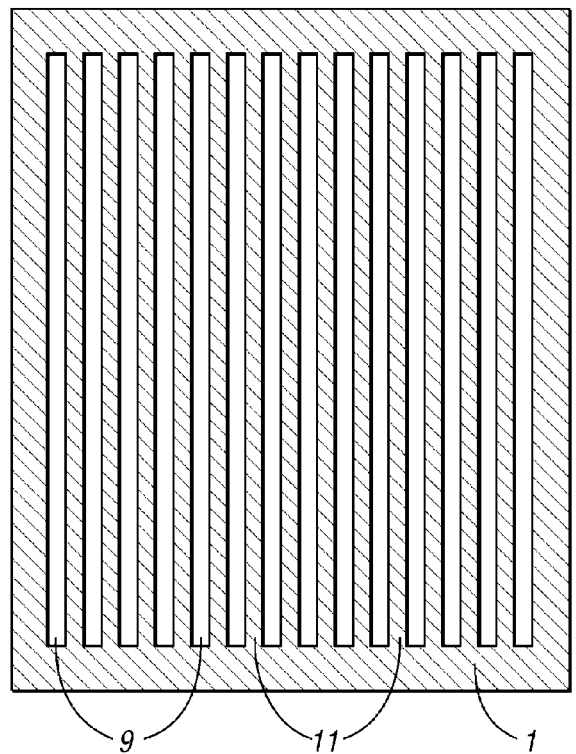
FIG. 6 is a top plan view which illustrates the basic construction of a perforated semiconductor neutron detector from the prior art and shows a device that uses straight channels backfilled with neutron reactive material.
Figure 7:
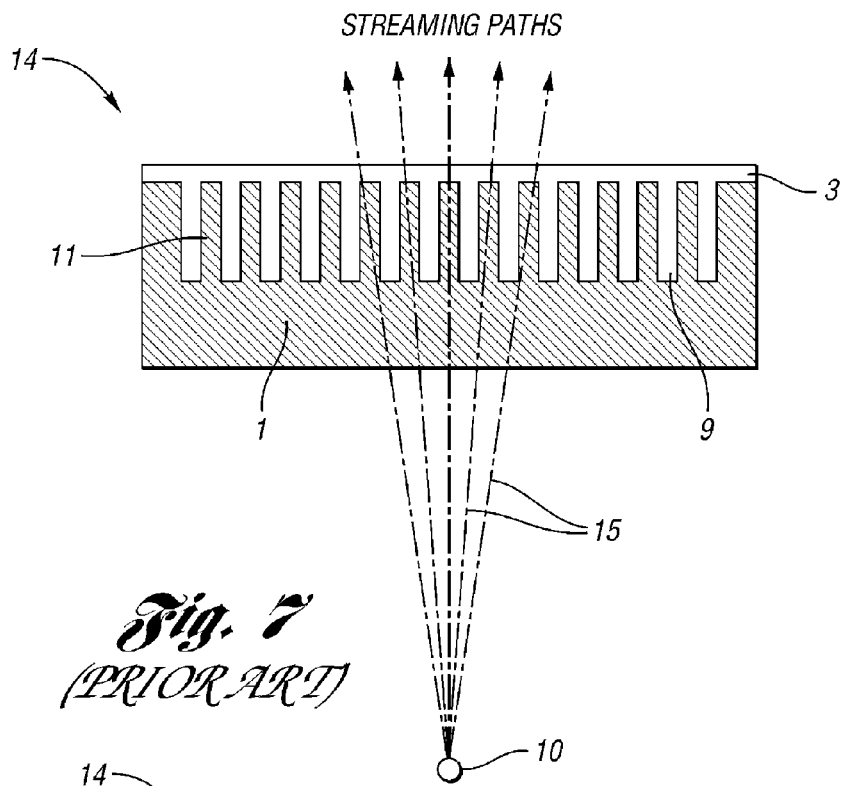
FIG. 7 is a side sectional view which illustrates the basic construction of a perforated semiconductor neutron detector from the prior art and shows a device that uses straight channels backfilled with neutron reactive material; the figure shows several possible neutron streaming paths the neutrons can take to altogether miss the channels filled with the neutron reactive material.
Figure 8:
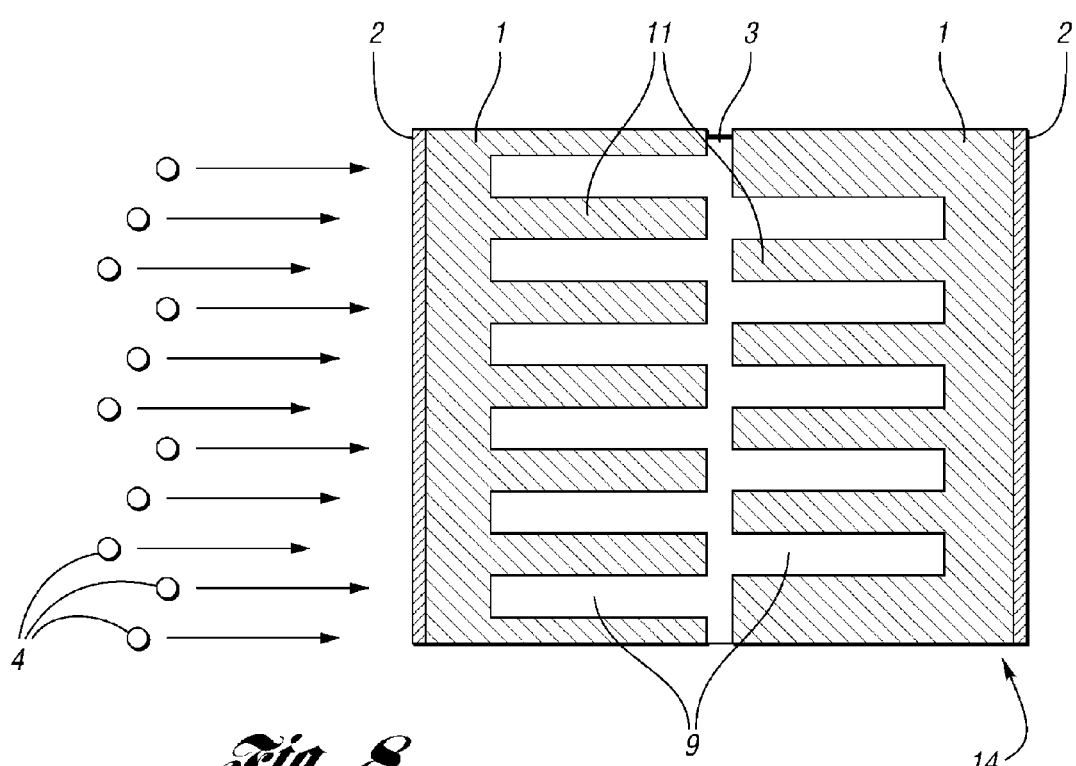
FIG. 8 is a side view of a double-inward facing "sandwich" detector assembly of the prior art, wherein two semiconductor diode detectors of the assembly use straight channels backfilled with neutron reactive material; a single neutron-sensitive film is placed between active regions of the two semiconductor diode detectors.
Figure 9:
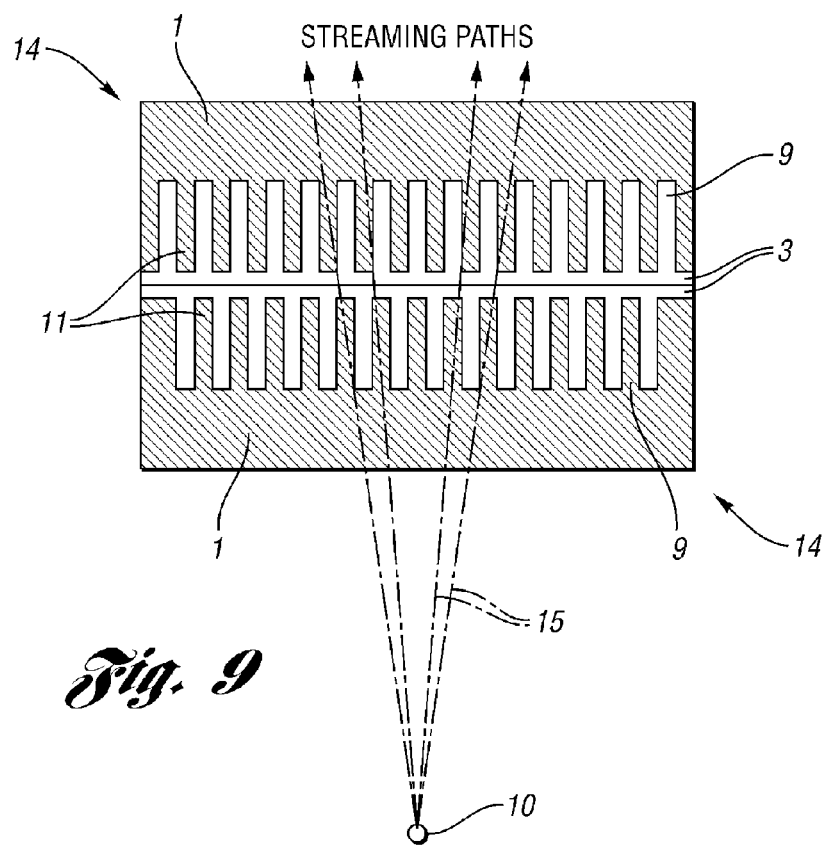
FIG. 9 is a side view of a double-inward facing "sandwich" detector assembly of the prior art, wherein two semiconductor diode detectors of the assembly use straight channels backfilled with neutron reactive material; a single neutron-sensitive film is placed between active regions of the two semiconductor diode detectors; the figure shows several possible neutron streaming paths the neutrons can take to altogether miss the channels filled with neutron reactive material.
Figure 10:
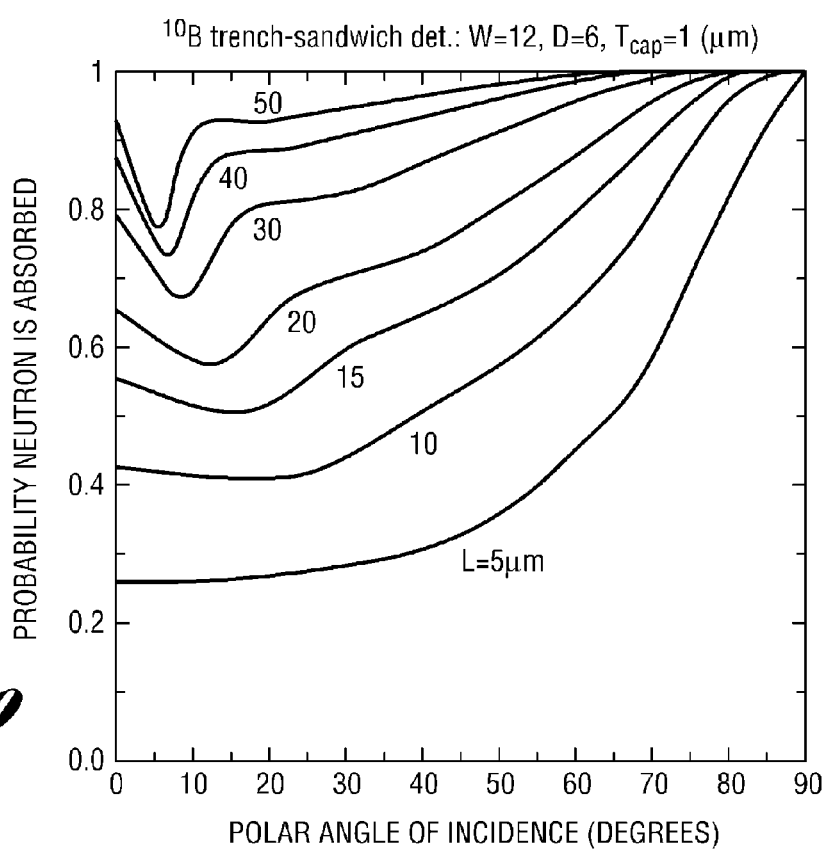
FIG. 10 is a graph which illustrates calculated neutron detection response of a double-inward facing "sandwich" detector assembly of the prior art and which uses straight channels backfilled with neutron reactive material; the channels are filled with $^{10}$B; the channels are 6 microns wide with semiconductor fins 6 microns wide between the channels; the layer between the sandwiched detectors is 1 micron thick; the figure shows the response of channels of various depths, ranging from L=5 microns to L=50 microns.
Figure 11:
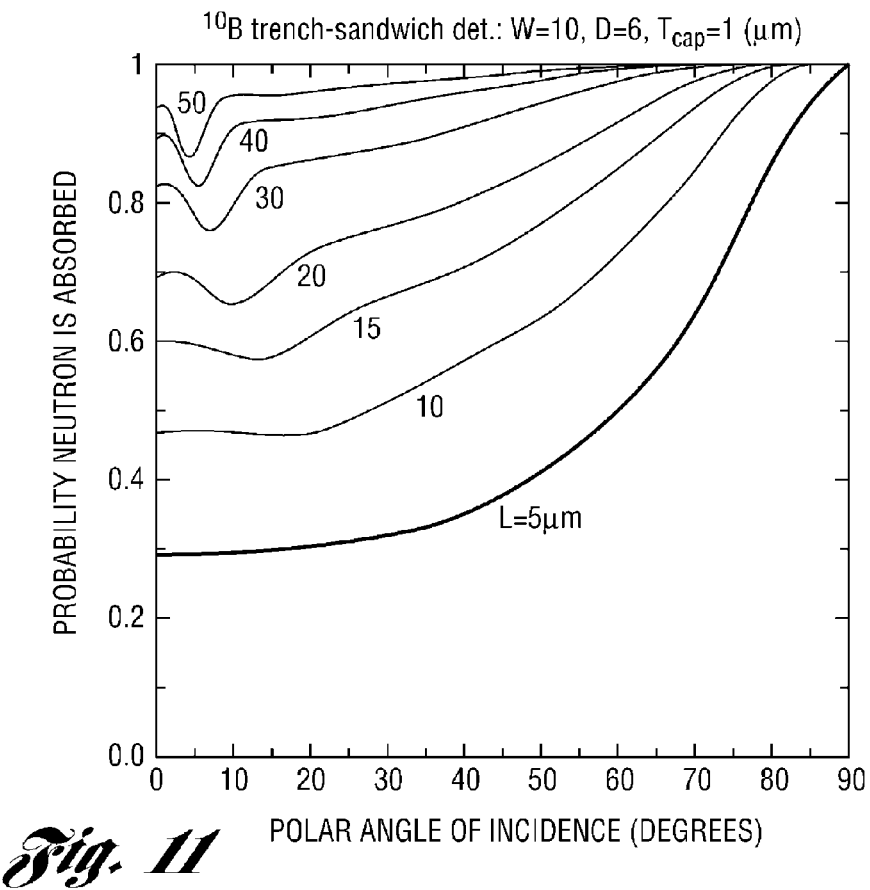
FIG. 11 is a graph which illustrates calculated neutron detection response of a double-inward facing "sandwich" detector assembly of the prior art and which uses straight channels backfilled with neutron reactive material; the channels are filled with $^{10}$B; the channels are 6 microns wide with semiconductor fins 4 microns wide between the channels; the layer between the sandwiched detectors is 1 micron thick; the figure shows the response of channels of various depths, ranging from L=5 microns to L=50 microns.
Figure 12:
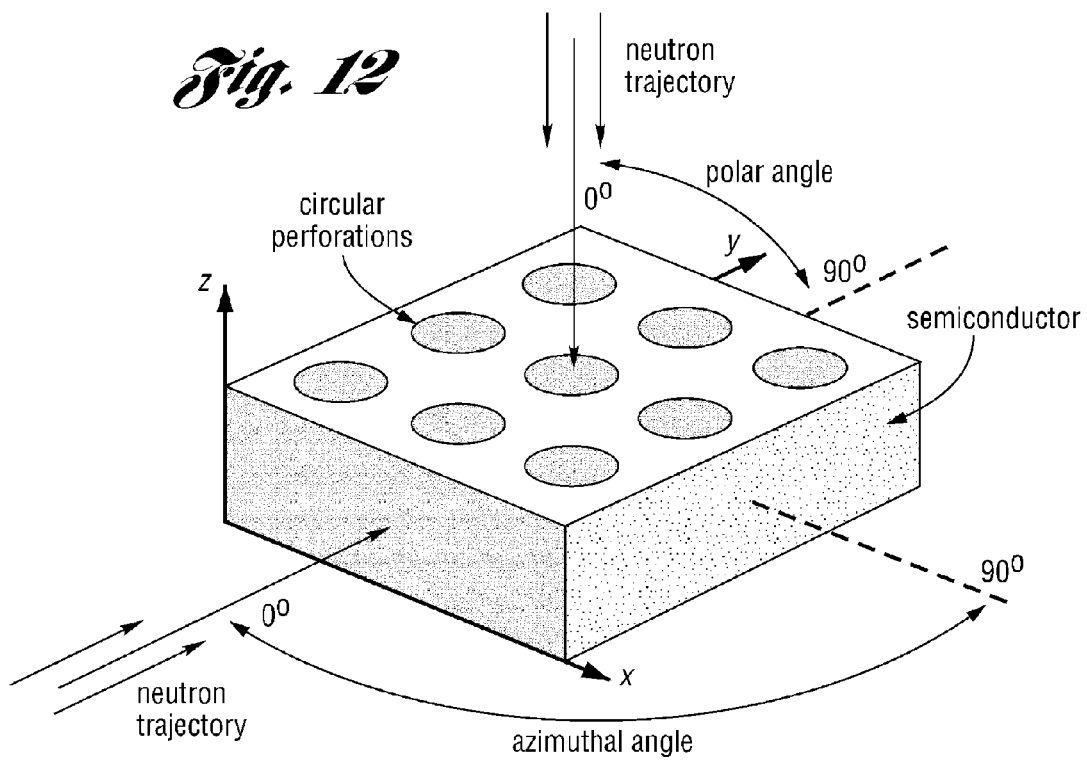
FIG. 12 is a perspective view of a detector and associated coordinate system used for establishing polar angle and azimuthal angle dependence on neutron detection efficiency for perforated detectors, the detector having a circular hole design of the prior art.
Figure 13:
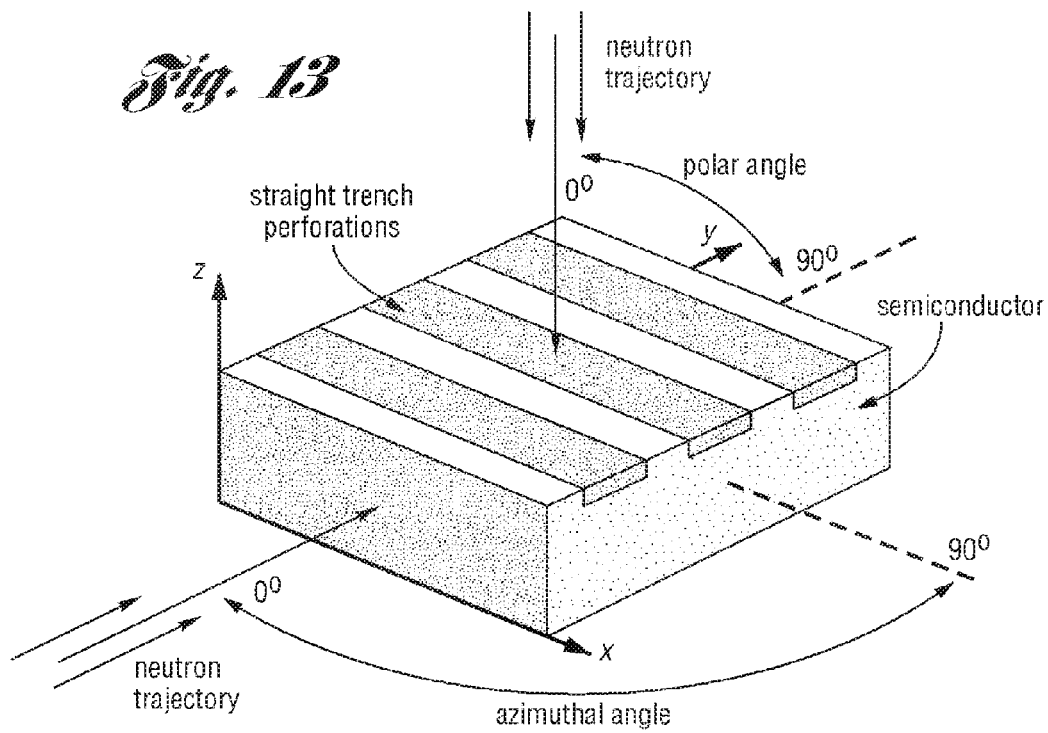
FIG. 13 is a perspective view of a detector and associated coordinate system used for establishing polar angle and azimuthal angle dependence on neutron detection efficiency for perforated detectors, the detector having a straight channel design of the prior art.
Figure 14:
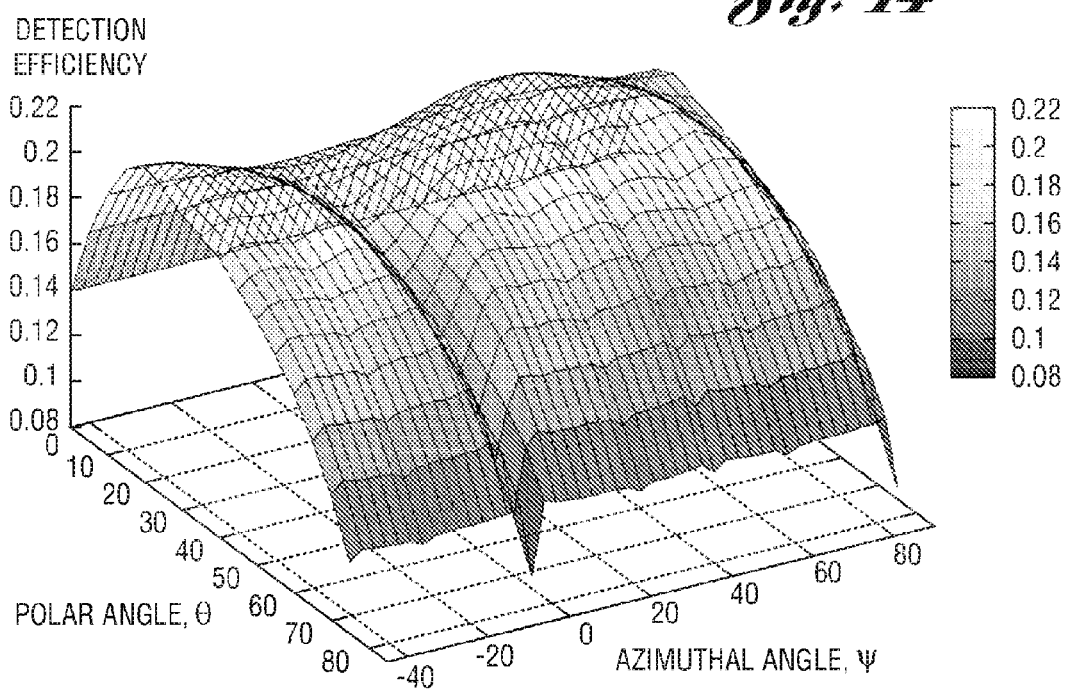
FIG. 14 is a 3-D graph which illustrates detection efficiency response of a circular hole device with rods of $^{10}$B in the holes; the device is simulated as having 6 micron diameter and 30 micron deep holes.
Figure 15:
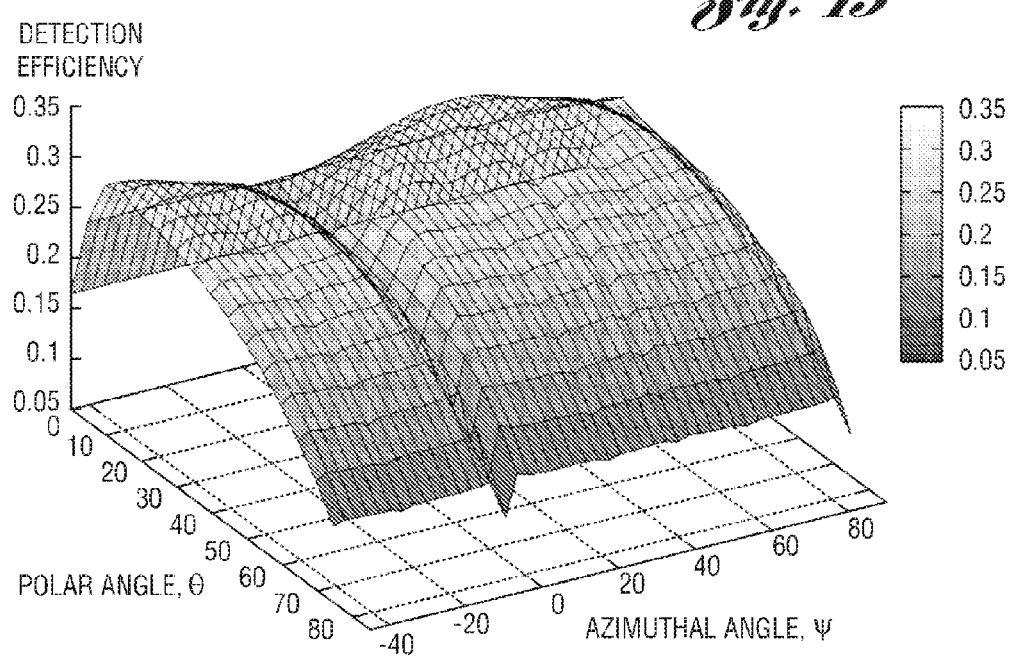
FIG. 15 is a 3-D graph which illustrates detection efficiency response of a circular hole device with rods of $^{10}$B in the holes; the device is simulated as having 6 micron diameter and 50 micron deep holes.
Figure 16:
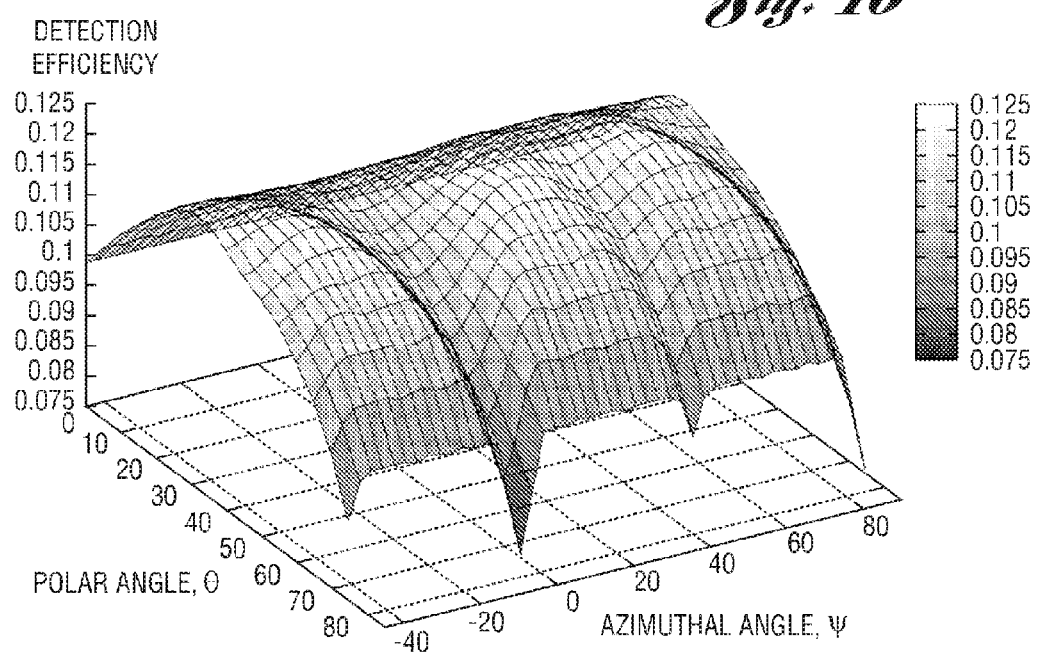
FIG. 16 is a 3-D graph which illustrates detection efficiency response of a circular hole device with rods of $^6$LiF in the holes; the device is simulated as having 30 micron diameter and 100 micron deep holes.
Figure 17:
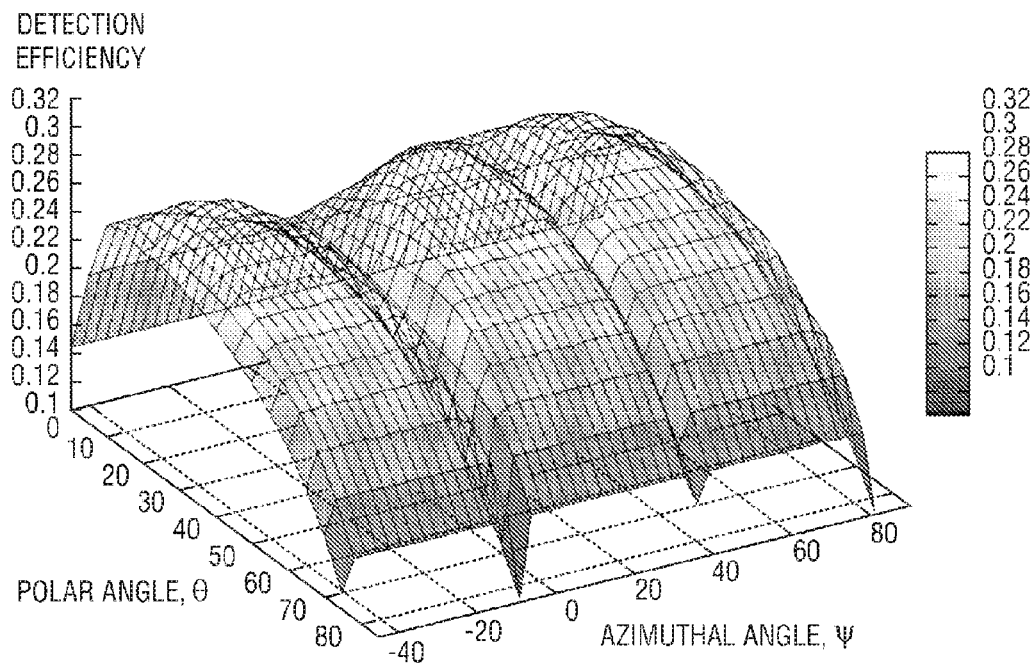
FIG. 17 is a 3-D graph which illustrates detection efficiency response of a circular hole device with rods of $^6$LiF in the holes; the device is simulated as having 30 micron diameter and 300 micron deep holes.
Figure 18:
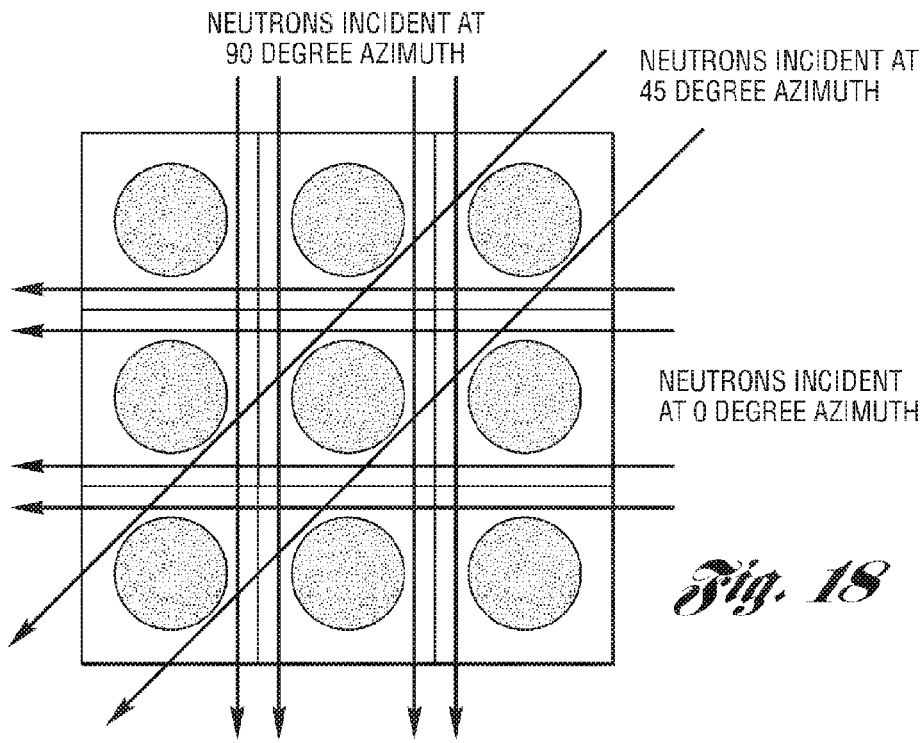
FIG. 18 is a top plan view of a detector with neutrons streaming through the circular hole type perforated neutron detector.
Figure 19:
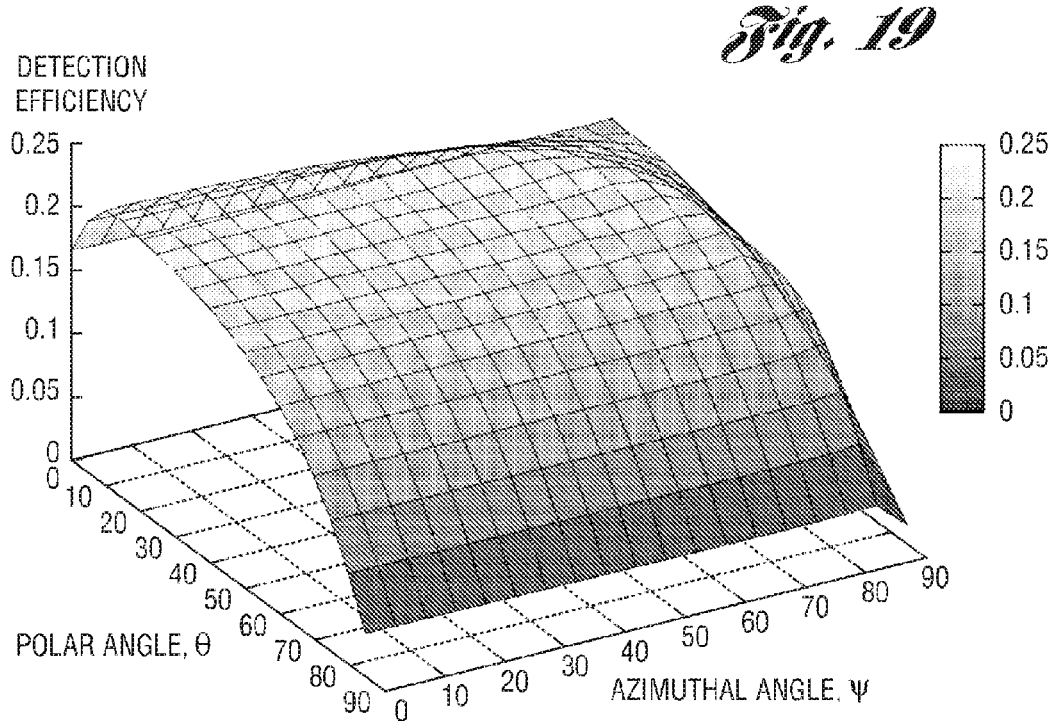
FIG. 19 is a 3-D graph which illustrates detection efficiency response of a straight channel device with channels filled with $^{10}$B; the device is simulated as having 4 micron wide and 30 micron deep channels.
Figure 20:
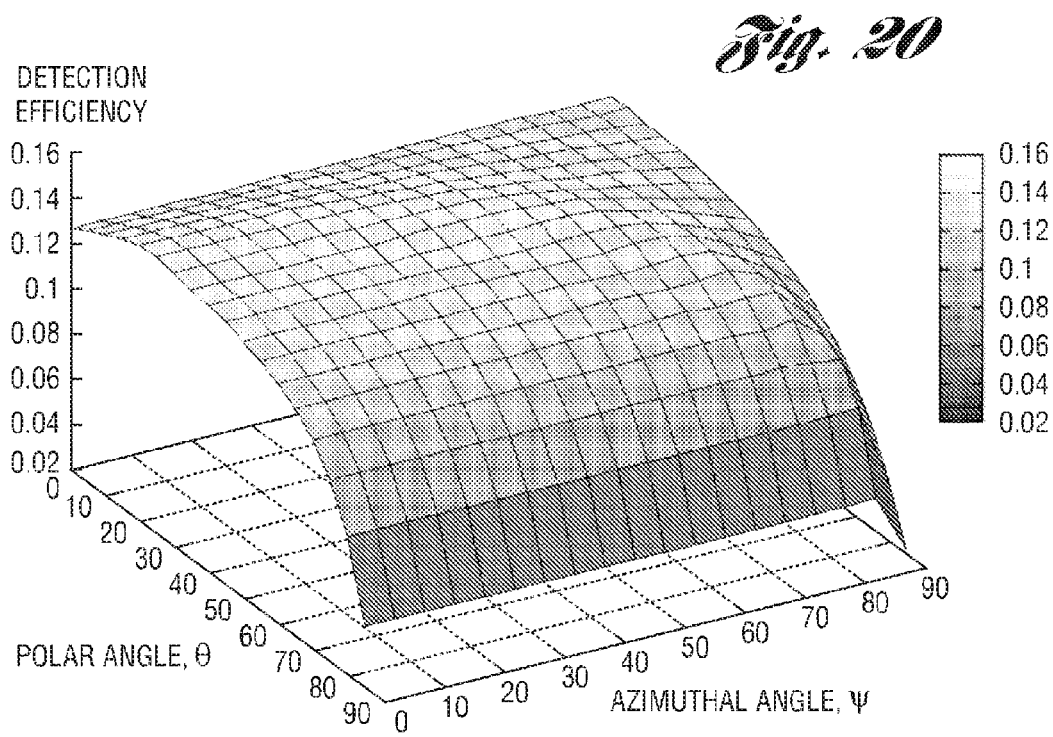
FIG. 20 is a 3-D graph which illustrates detection efficiency response of a straight channel device with channels filled with $^6$LiF; the device is simulated as having 30 micron wide and 100 micron deep channels.
Figure 21:
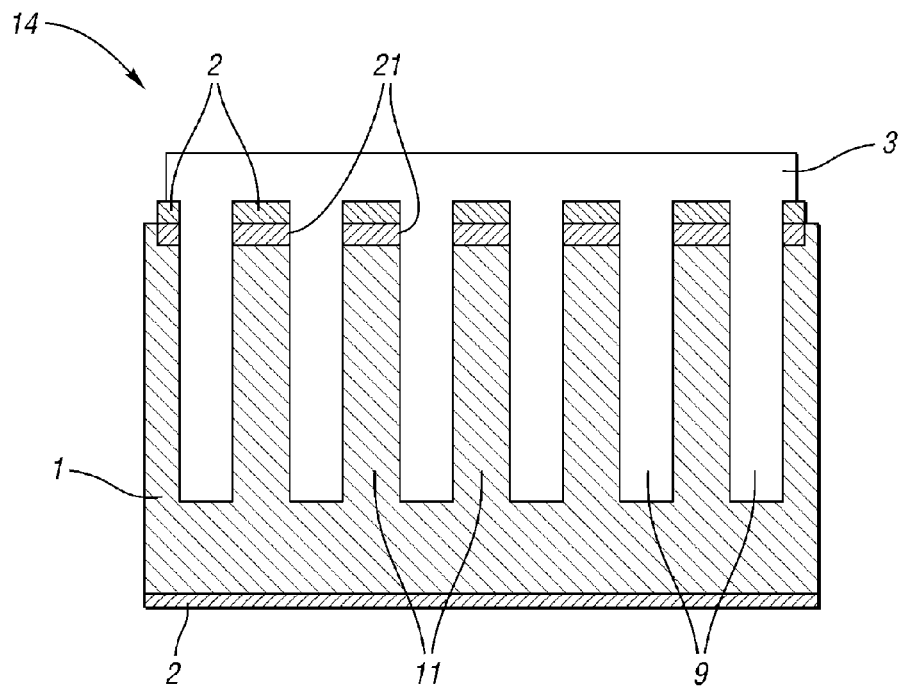
FIG. 21 is a side, cross-sectional view of a perforated detector of the prior art.
Figure 22:
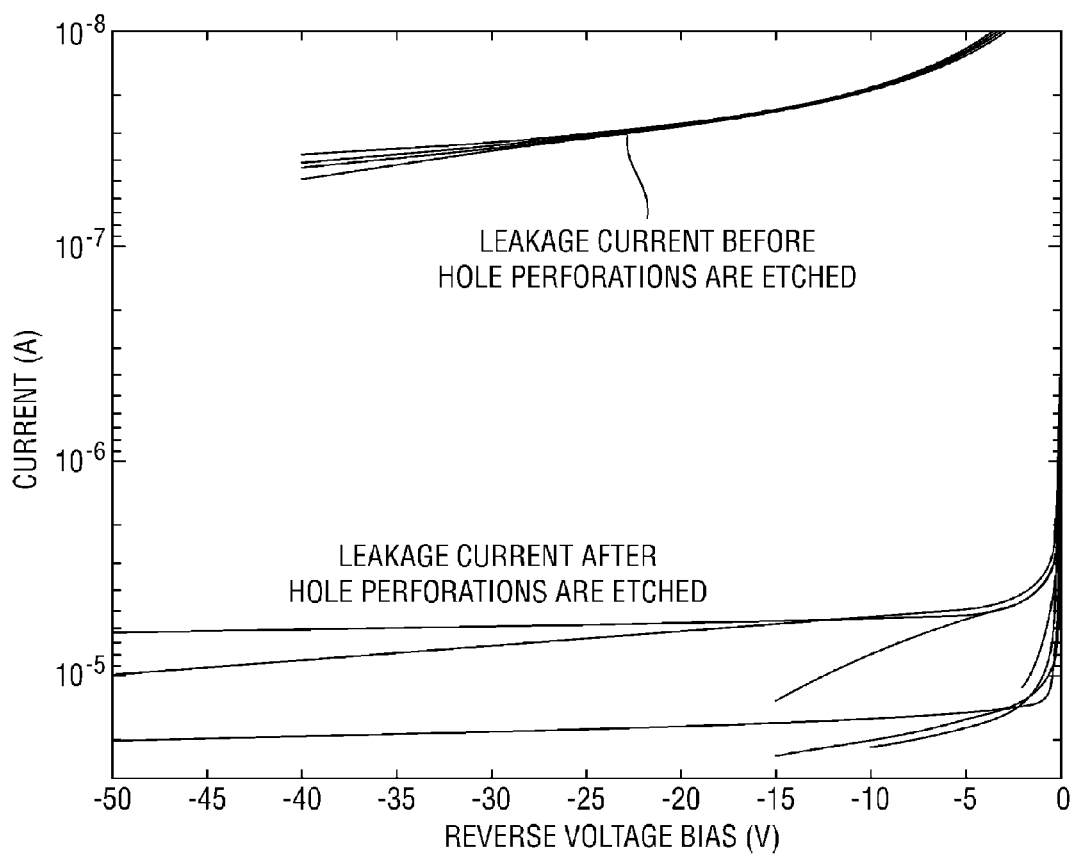
FIG. 22 is a graph which provides a reverse bias leakage current comparison for a basic planar diode before and after perforations have been etched through its pn junction.

There are problems with the device 14 of FIG. 21 which cause inferior performance. Such inferior performance includes excessive diode leakage current and non-uniform neutron detection efficiency. At least one embodiment of the described invention provides solutions to remedy these difficulties. The main problem with the device 14 in FIG. 21 is that the etched holes cut across the boundary of the rectifying junction 21, which causes leakage current to pass by the reverse biased junction. Further, damage to the inside surfaces of the cavities or perforations 9 from the etching process causes the leakage current to increase even more. It has been observed that the reverse leakage currents of these devices such as the device 14 may increase by over 1000 times after the holes or perforations 9 are etched. This problem is resolved with one embodiment of the invention as illustrated in FIG. 31.

Figure 31:
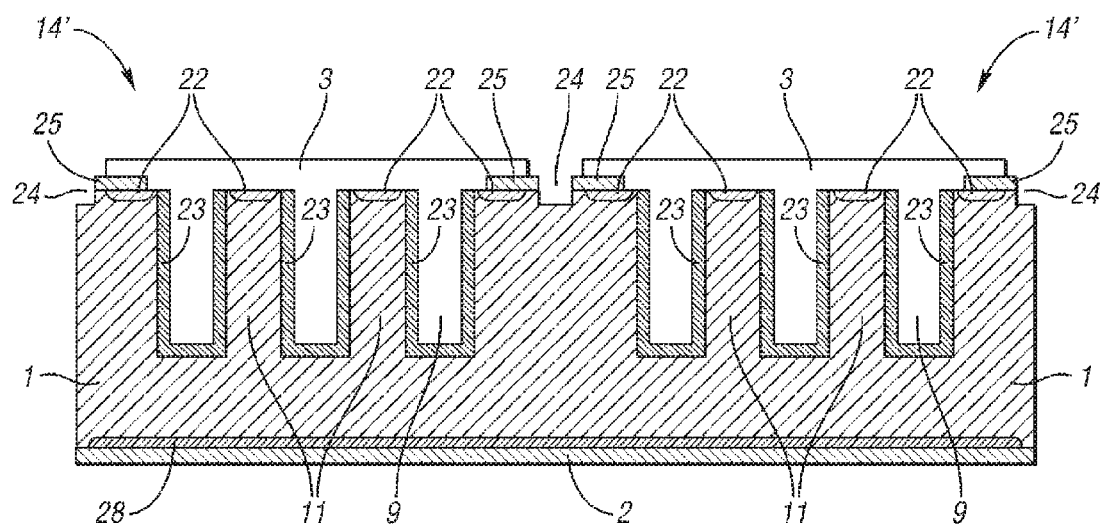
FIG. 31 is a cross-sectional side view of a low leakage current perforated detector constructed in accordance with one embodiment of the present invention.

As shown in FIG. 31, a semiconductor substrate 1 has a back contact 2 applied to it. Individual devices 14' are separated by a mesa etch 24 such that each individual detector 14', where each detector 14' has numerous perforations 9, is not conductively coupled to neighboring device 14'. A rectifying junction is formed by selectively doping regions 22 of substrate 1, around perforation areas such that when the holes 9 are etched into the semiconductor substrate 1 the etched regions are not in contact with the junction. As a result, the rectifying junction is not damaged by the perforation etch.

After the top side doping step is performed, the perforations 9 are etched into the substrate 1 such the boundary of the rectifying junctions is removed from the cavity walls, thereby removing that element of leakage current. A pacifying layer 23 is subsequently formed in the perforations 9, and can be deposited by thermal oxidation, vapor phase deposition, chemical vapor deposition, plasma enhanced chemical vapor deposition, and sputtering. For example, for Si semiconductor detectors, a $SiO_2$ layer can be grown on the cavity surfaces, which acts to first remove the damaged surface area and to second provide a high resistivity coating on the perforation walls, both of which act to reduce the leakage current. The conductive doping regions 22 can be connected over the surface area such that a conductive metal contact 25 need only be applied around the periphery of the diode, as shown in FIG. 31. Finally, the perforations 9 are filled with one or more neutron reactive materials 3, such as B, Li, Gd, U, and Th based compounds. Examples of neutron reactive materials include $^6$LiF and/or enriched $^{10}$B.

Figure 31A:
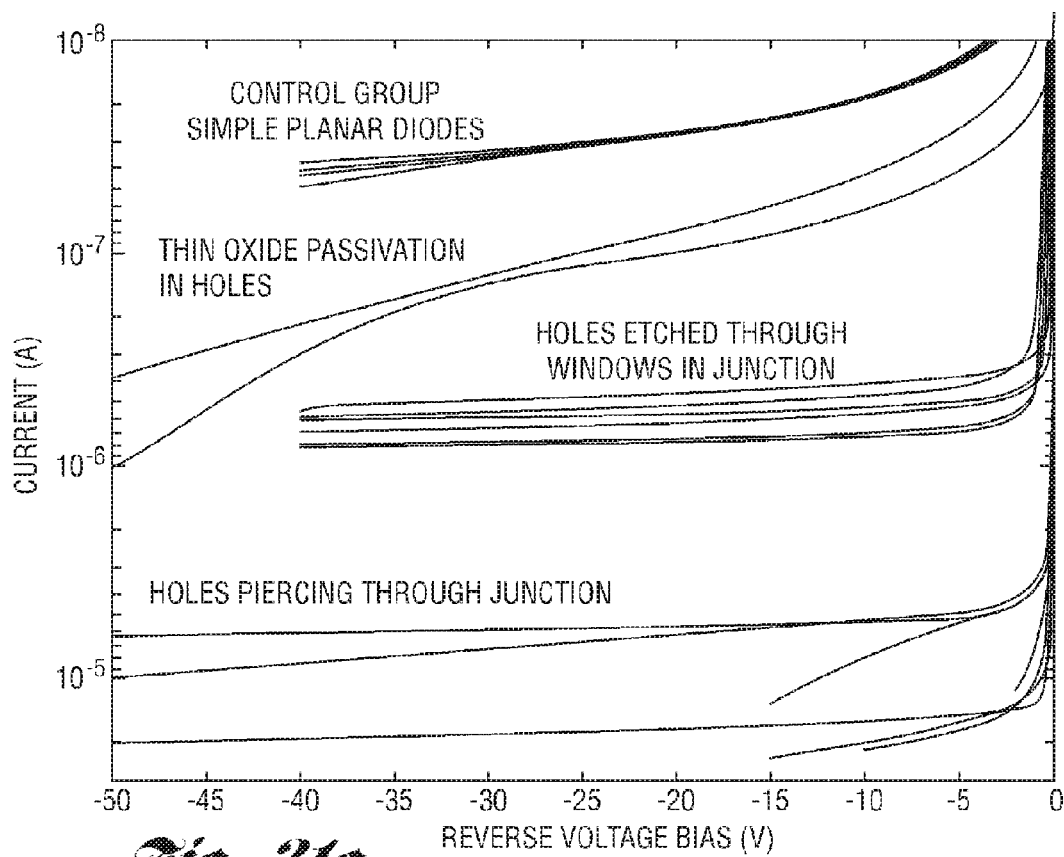
FIG. 31a is a graph which provides a reverse bias leakage current comparison for a basic planar diode before and after perforations have been etched through its pn junction and as compared to the leakage currents from the low leakage current device constructed in accordance with an embodiment of the present invention.

FIG. 31a is a graph with reverse leakage current plots showing the effect that new changes described immediately above have on performance of the resulting detector. First, by doping around the perforated regions such that the perforations 9 do not cut through the pn junction, the leakage current is increased by only a factor of 16, as shown by the "holes etched through the windows in junction" curves. Second, by incorporating the passivation layer 23 along with the selective doping, the leakage current only increased by a factor of 6.

Methods to Backfill the Perforations of the Detectors with Neutron Reactive Material At least one embodiment of the present invention includes a process to fill the perforations completely with LiF with very little void formation. The process includes the steps of evaporating the LiF in a low pressure chamber, introducing a carrier gas and providing a substrate holder, a cooling stage, and a dynamic pumping environment. There are two preferred methods to accomplish the filling process in accordance with an embodiment of the present invention: a static condensation method and a dynamic condensation method. The method of the embodiment is referred to here as a low pressure condensation (LPC) filling method, which differs substantially from the filling methods previously described.

Figure 35:
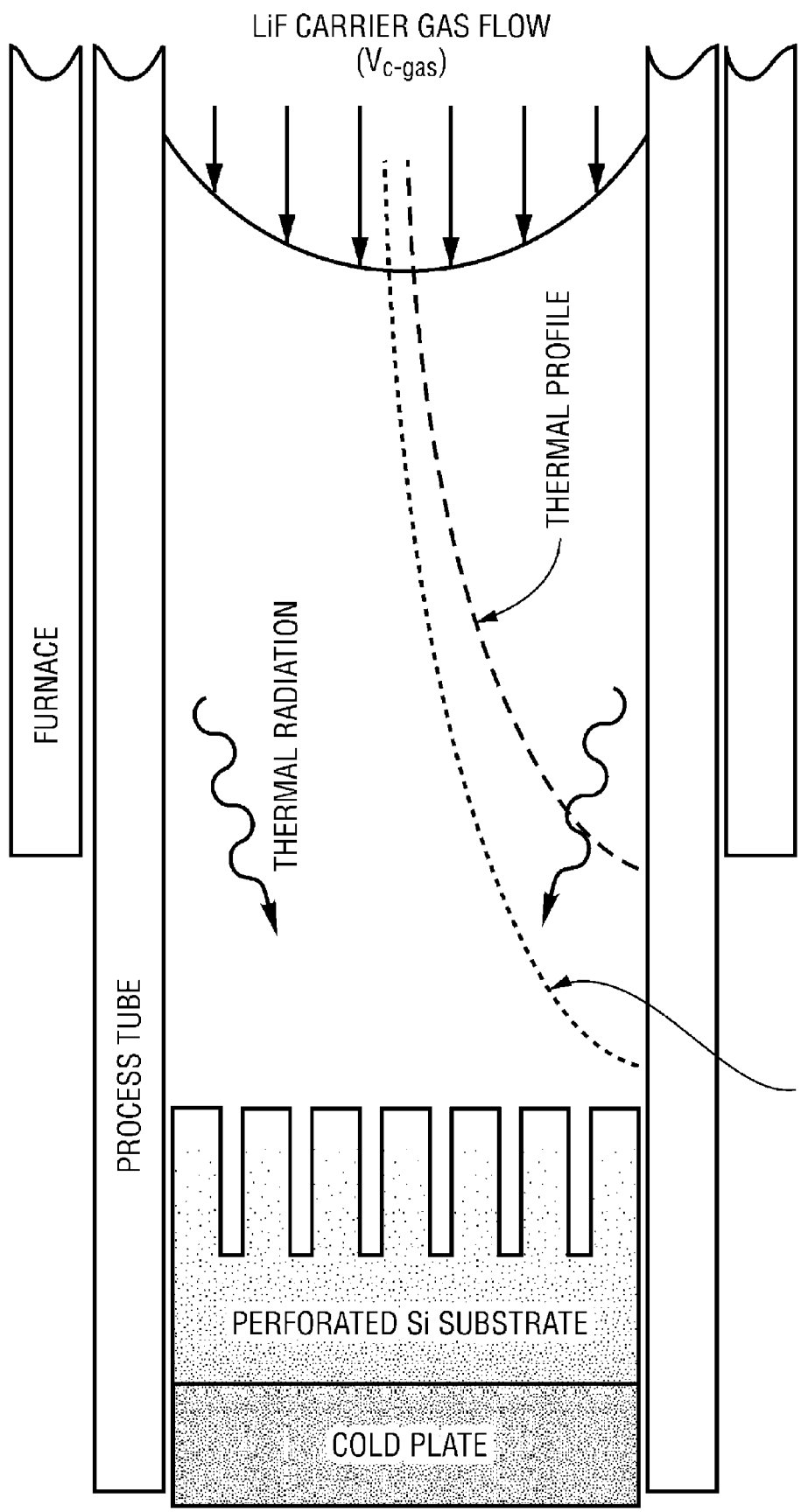
FIG. 35 is a side schematic view of a system, partially broken away, which provides static, low-temperature condensation filling of device perforations in accordance with one embodiment of the present invention.

Referring now to FIG. 35, there is shown a diagram of the low pressure condensation process and subsystem by which the neutron reactive material is transported to the perforated substrate. A flow gas with vaporized neutron reactive material in it is forced through a heated furnace. The perforated substrate is chilled from the back with a cold plate to which it is attached. The heat from the furnace and radiative emissions cause the surface of the perforated substrate to be warmer than the back of the substrate, and consequently, warmer than the bottom of the perforations. As a result, the vaporized neutron reactive material in the carrier gas condenses at the coolest part of the substrate which is the bottom of the holes. The holes therefore fill from the bottom up, unlike other deposition methods tried in the prior art.

Figure 36:
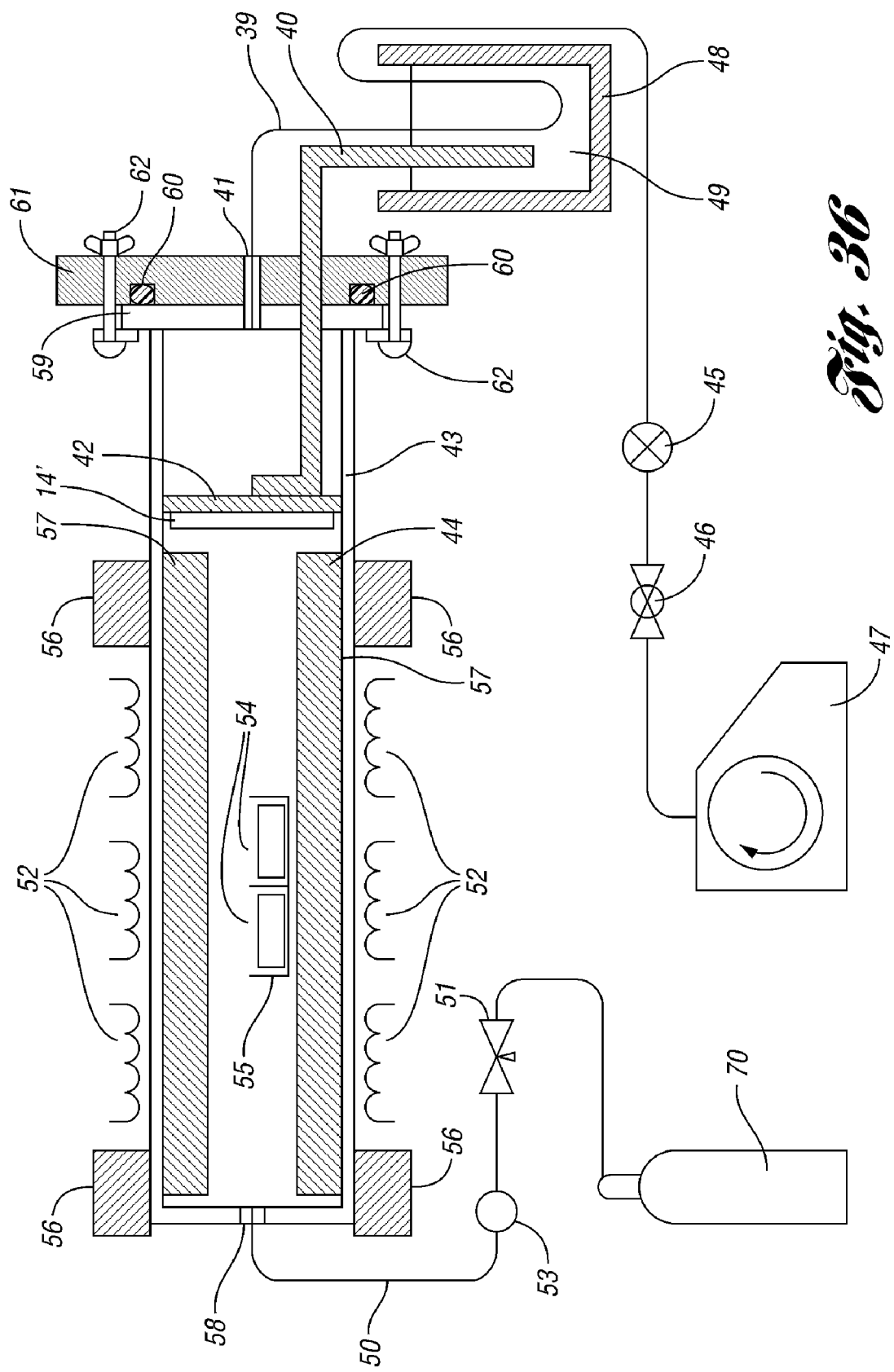
FIG. 36 is a more detailed schematic view of the system of FIG. 35 which is constructed and built for static, low-temperature condensation filling.

Referring now to FIG. 36, there is shown a system to implement the low pressure condensation deposition of neutron reactive materials into the perforations of a perforated semiconductor neutron detector. The system consists of a furnace heated by heating coils 52 inside which has been inserted a furnace tube 43. The furnace coils 52 and assembly can be a commercial unit held together by brackets 56. The furnace tube 43 is composed of a material that can withstand high temperature, such as $SiO_2$ (quartz), SiC, $Al_2O_3$, or Mullite. It is inadvisable to use $SiO_2$ (quartz) for the deposition of LiF since vaporized LiF reacts with quartz and etches it and ultimately destroys the furnace tube 43. However, $SiO_2$ tubes can be used for other neutron reactive materials, such as B and Gd.

A liner 57 can be used to reduce material deposits on the furnace tube 43. The liner 57 is composed of a material that can withstand high temperature, such as graphite, $SiO_2$ (quartz), SiC, $Al_2O_3$, or Mullite. A crucible 55 filled with the neutron reactive material 54 is inserted into the liner 57 and the furnace tube 43. The furnace tube 43 has an inlet 58 through which a carrier gas from a source 70 can be injected. The carrier gas flow is controlled with a valve 51 and monitored with a gauge 53 as it flows through a tube 50 into the furnace tube inlet 58.

The furnace tube 43 is closed off with a cap 61 sealed with an O-ring 60. The cap 61 is closed tight with clamps of screws 62. An exit port 41 in the cap 61 allows for the carrier gas from the source 70 to exit through a gas tube 39. The perforated substrate 14' is attached to a cold plate 42 which is attached to a cold finger 40. The cold finger 40 penetrates through the cap 61 and into a dewar 48 filled with a cryogenic fluid 49 such as liquid nitrogen. The cryogenic fluid may be replaced with a cryogenic refrigerator unit. The carrier gas, which may be nitrogen, argon, helium, forming gas, or any variety of gas capable of transporting vaporized material, is injected into the furnace.

The furnace is heated with the heating coils 52 to vaporize the neutron reactive material 54. The process requires that the cold plate 42 be kept chilled, whatever the method may be. The carrier gas tube 39 also loops through the cryogenic liquid 49 to prevent any gas of the neutron reactive material 54 from reaching a pump 47. The pump 47 is used to remove the carrier gas from the furnace tube 43. By doing so, it is guaranteed that the carrier gas will flow over the neutron reactive material 54 thereby causing the vaporized neutron reactive material 54 to be transported to the cooled perforated substrate 14'. The vacuum pump 47 also lowers the pressure in the furnace tube 43 which reduces the vapor pressure of the neutron reactive material 54. The vacuum pressure is controlled by the gas flow and a vacuum valve 46. The vacuum pressure is monitored with a pressure gauge 45.

When the carrier gas from the source 70 and the vaporized neutron reactive material 54 reaches the perforated substrate 14', the vaporized neutron reactive material 54 condenses in the perforations 9 of the substrate 14' thereby filling them up.

Figure 32:
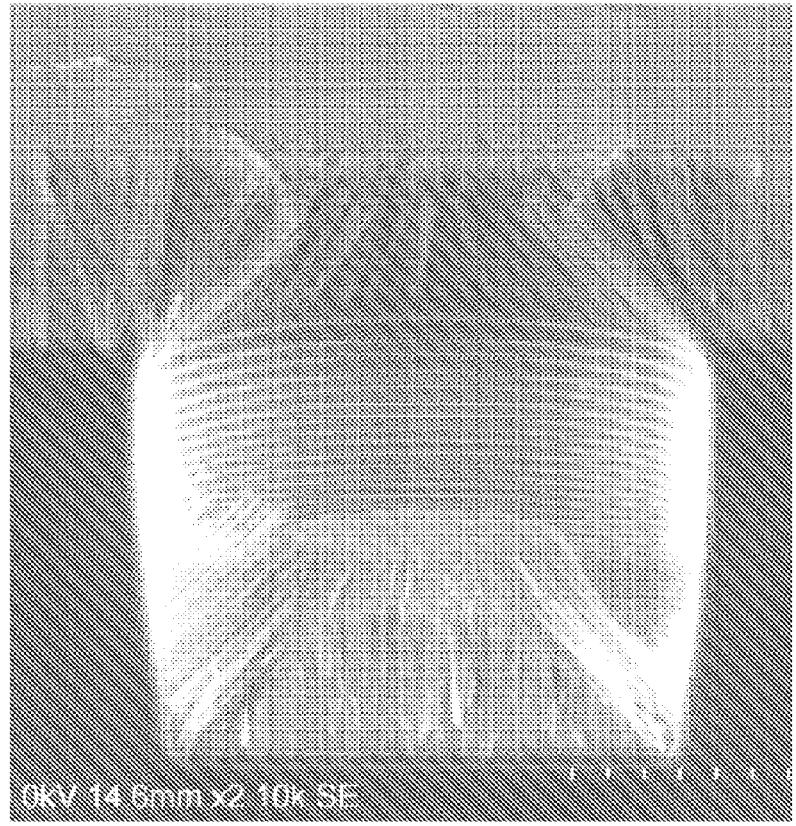
FIG. 32 is a SEM illustrating a circular perforation partially filled with LiF through the process of physical vapor deposition; the hole is slowly closing at the top, thereby preventing the hole from completely filling.
Figure 33:
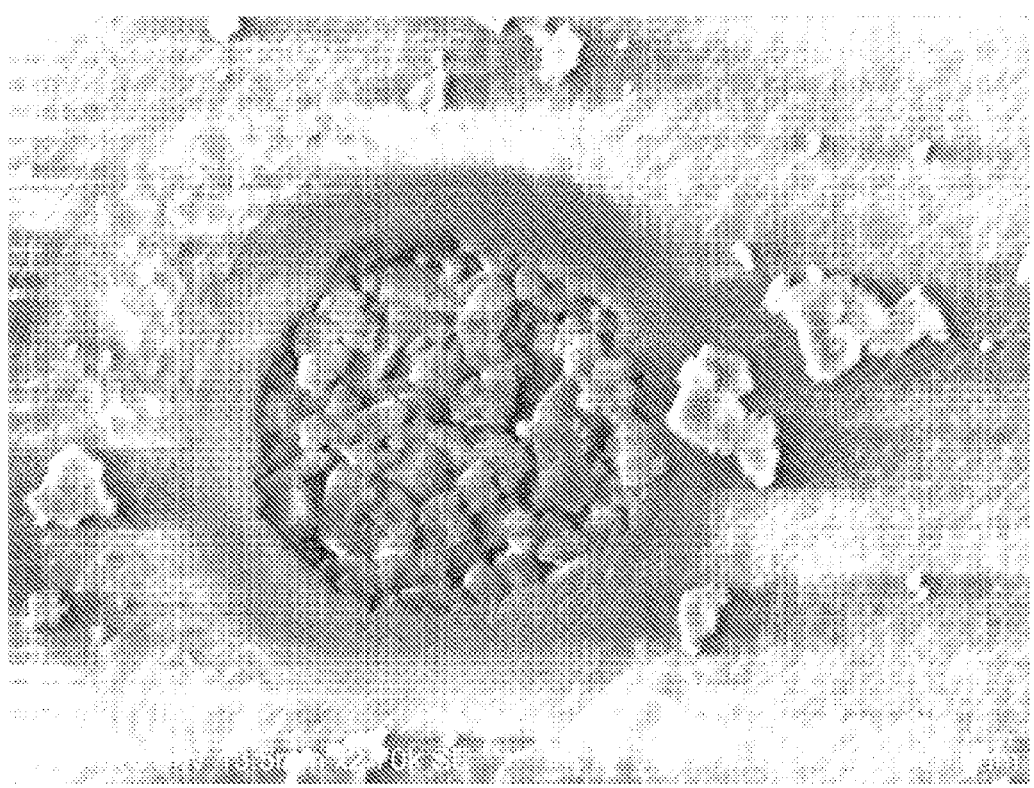
FIG. 33 is a SEM illustrating a circular perforation partially filled with LiF through the process of mechanical powder filling; although filled, the hole has a large fraction of void space.
Figure 34:
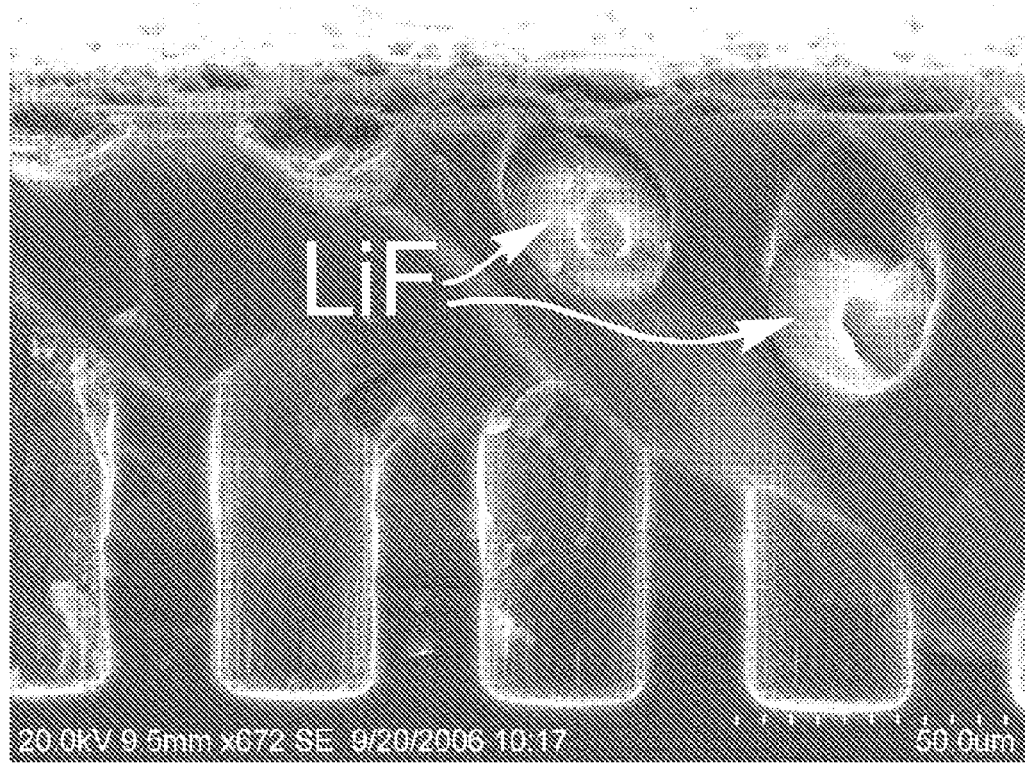
FIG. 34 is a SEM illustrating circular perforations filled with LiF through the process of powder filling and thermal melting; the holes are solidly filled, but the thermal treatment ruins the diode properties.

The above-described process allows for the perforations to be completely filled with neutron reactive materials without prematurely closing the top off, a problematic effect that has been observed with common prior art physical vapor deposition (FIG. 32), and without excessive void space as observed with prior art powder filling (FIG. 33).

Figure 37:
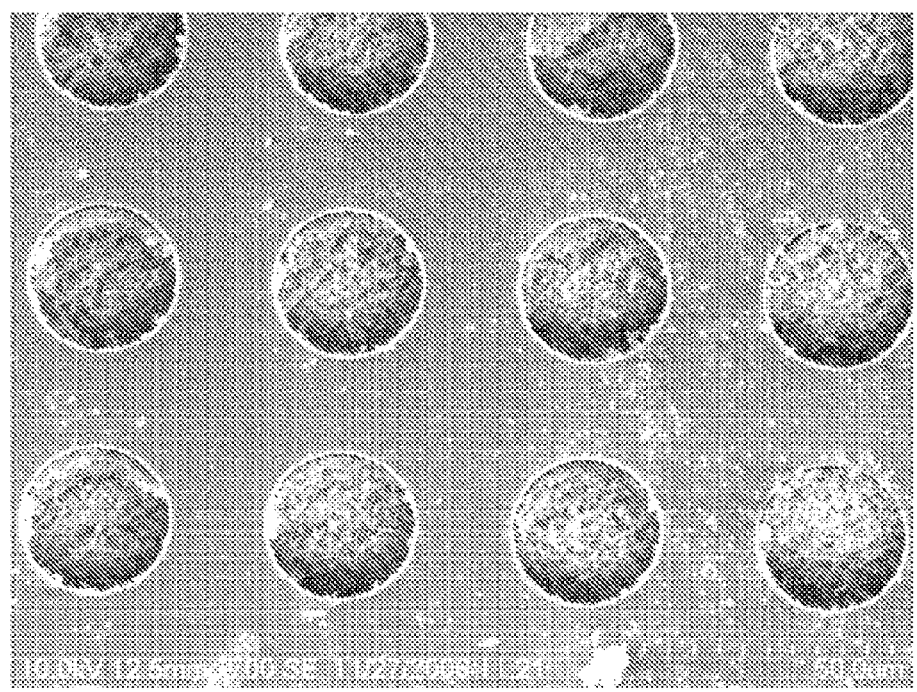
FIG. 37 is a SEM illustrating circular perforations filled with LiF through the process of static, low-temperature condensation filling performed by the system of FIG. 36; the holes are 100 microns deep and are completely filled with LiF.

FIG. 37 shows a top view result from the low pressure condensation system to fill miniature perforations with LiF as described in FIG. 36. The perforated semiconductor as shown in FIG. 36 has 30 micron diameter holes that are 100 microns deep. As seen in FIG. 36, the holes are completely filled up to the top with LiF with a much superior packing fraction (or lower void space) than the powder filling results shown in FIG. 33.

Figure 38A:
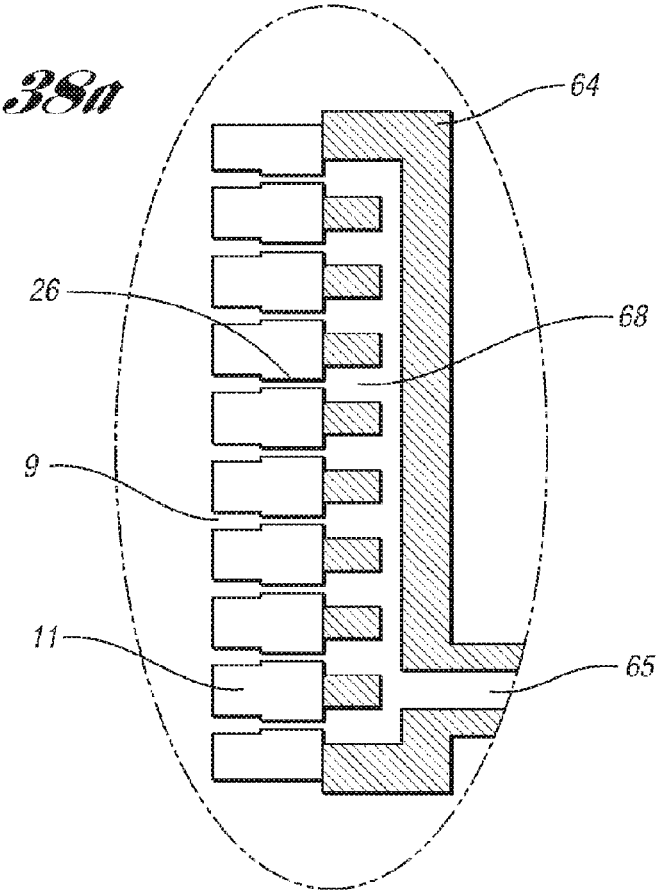
FIG. 38a is an enlarged view of a portion of FIG. 38 showing the device.
Figure 38:
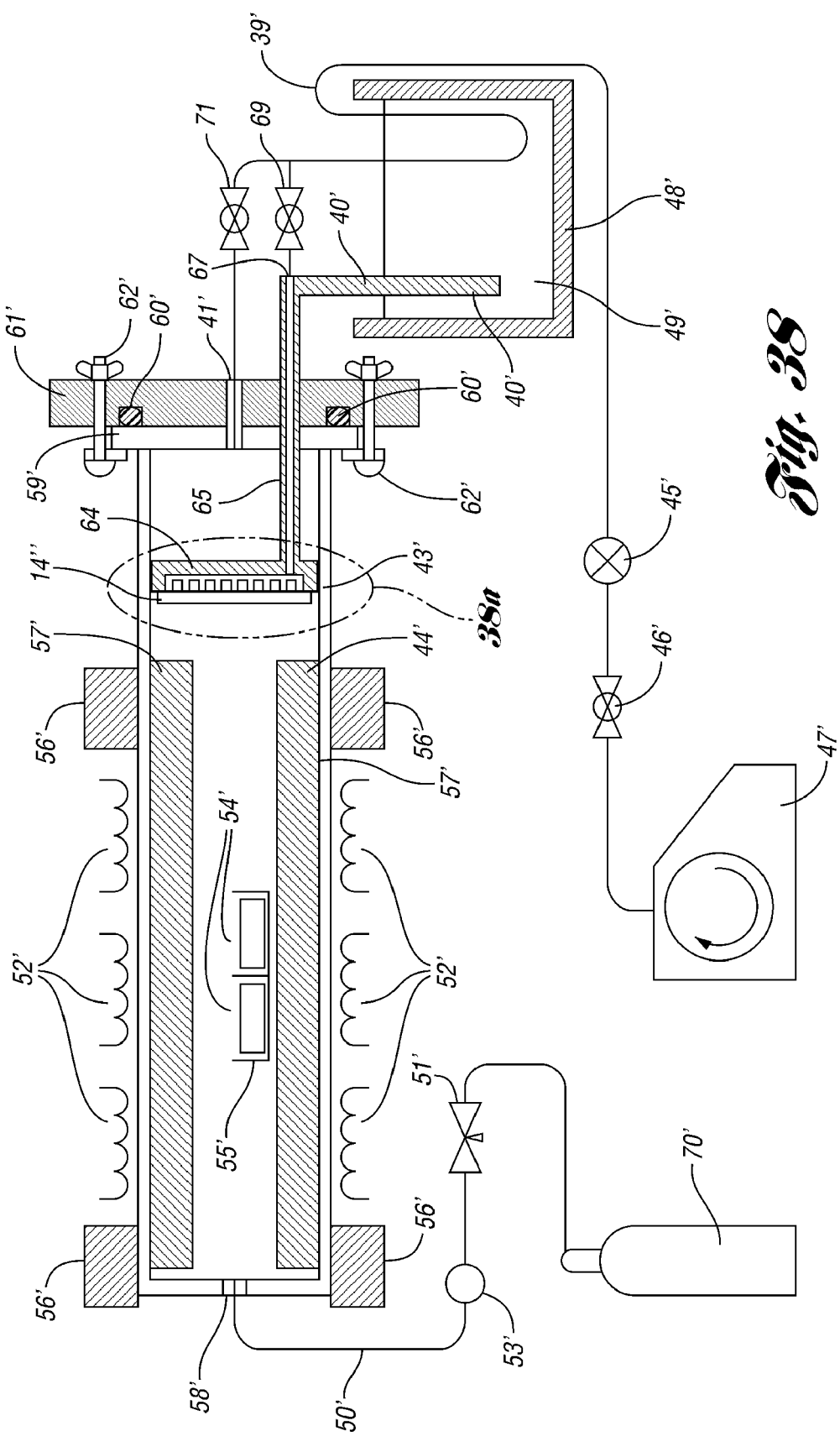
FIG. 38 is a view similar to the view of FIG. 36 and illustrating a system constructed for dynamic, low-temperature condensation filling of a device performed in accordance with another embodiment of the present invention.
Figure 39:
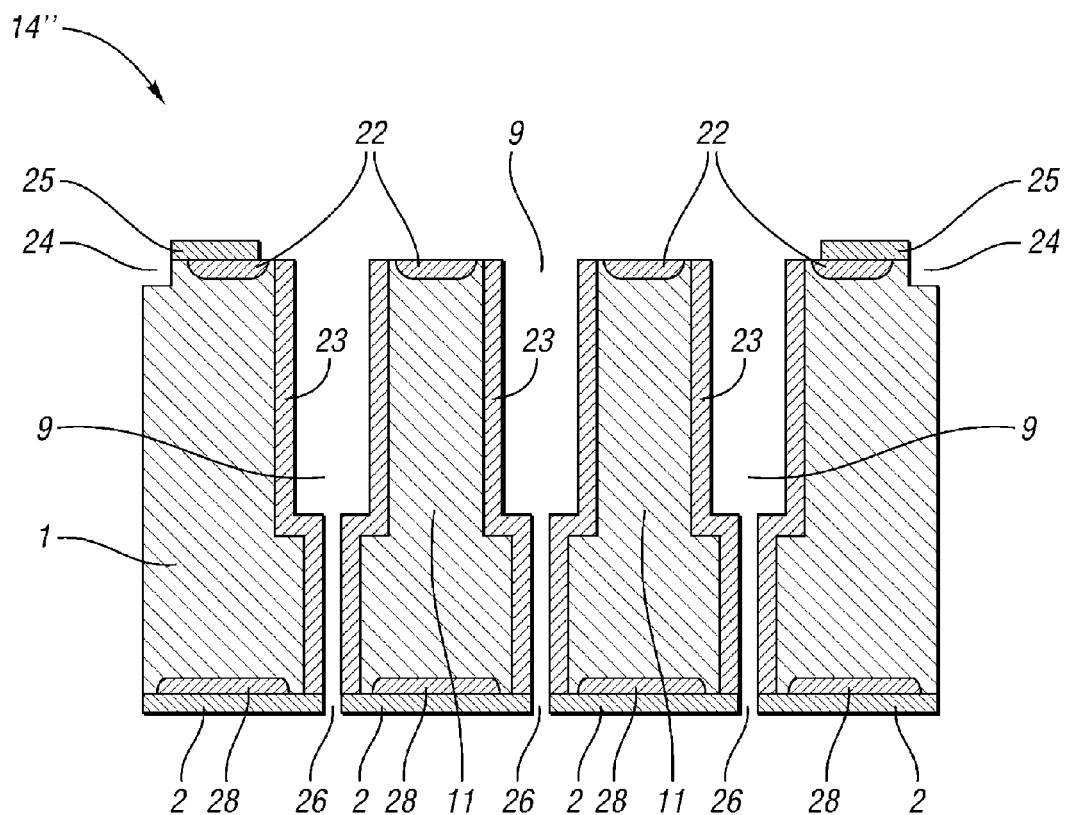
FIG. 39 is a side cross-sectional view of a low leakage current perforated detector constructed in accordance with an embodiment of the present invention and having export ports for use with the dynamic, low-temperature condensation filling method performed by the system of FIG. 38.

Referring now to FIGS. 38a and 39, there is shown a low leakage current perforated detector structure 14" designed to be used with a dynamic low pressure condensation deposition system of FIG. 38. The perforated detector 14" has perforations 9 etched into the semiconductor substrate 1 which has the design specifications of the low leakage current detector of FIG. 31. The detector 14" has additional exit ports 26 etched through the substrate 1 to connect to the perforations 9. It is through these exit ports 26 that a carrier gas which is carrying the vaporized neutron reactive material 54' of FIG. 38 can flow.

FIG. 38 shows a dynamic version of the low pressure condensation filling system constructed in accordance with an embodiment of the present invention. The actual sample perforated diode detector or perforated structure require a slight alteration to allow the carrier gas to flow through its perforations. Such a perforated diode structure is similar to the structure shown in FIG. 31 and is indicated at 14" in FIG. 39 without its perforations 9 filled with neutron reactive material. As shown in FIG. 39 (as well as the enlarged portion of FIG. 38), the detector 14" has the exit ports 26 etched through the semiconductor substrate 1 until they reach through to the perforations 9 from the bottom surface of the substrate 1. The exit ports 26 may be smaller in dimension, the same dimension, or larger in dimension than the perforations 9. FIG. 39 shows the case in which the exit ports 26 are smaller in dimension than the perforations 9.

Still referring to FIG. 38, items or components of the system which are the same or similar in structure or function to the items or components of the system of FIG. 36 have the same reference numeral but a singe prime designation. Like the system of FIG. 36, the system includes a furnace heated by heating coils 52' inside which has been inserted a furnace tube 43'. The furnace coils 52' and assembly can be a commercial unit held together by brackets 56'. The furnace tube 43' is composed of a material that can withstand high temperature, such as $SiO_2$ (quartz), SiC, $Al_2O_3$, or Mullite. It is inadvisable to use $SiO_2$ (quartz) for the deposition of LiF since vaporized LiF reacts with quartz and etches it and ultimately will destroy the furnace tube 43'. However, $SiO_2$ tubes can be used for other neutron reactive materials, such as B and Gd.

A liner 57' can be used to reduce material deposits on the furnace tube 43'. The liner 57' is composed of a material that can withstand high temperature, such as graphite, $SiO_2$ (quartz), SiC, $Al_2O_3$, or Mullite. A crucible 55' filled with the neutron reactive material 54' is inserted into the liner 57' and the furnace tube 43'. The furnace tube 43' has an inlet 58' through which a carrier gas from a source 70' can be injected. The carrier gas flow is controlled with a valve 51' and monitored with a gauge 53' as it flows through a tube 50' into the furnace tube inlet 58'.

The furnace tube 43' is closed off with a cap 61' sealed with an O-ring 60'. The cap 61' is closed tight with clamps of screws 62'. An exit port 41' in the cap 61' allows for the carrier gas to exit through a gas tube 39'. The perforated substrate 14" is attached to a perforated cold plate 64 which is attached to a cold finger 40'. The cold finger 40' penetrates through the cap 61' and into a dewar 48' filled with cryogenic fluid 49' such as liquid nitrogen. The cryogenic fluid may be replaced with a cryogenic refrigerator unit.

As shown in FIG. 38a, the perforated cold plate 64 has channels 68 that can align to the exit ports 26 of the perforated substrate 14". There is an exit channel 65 drilled through the cold finger 40' through which the carrier gas can flow. The carrier gas, which may be nitrogen, argon, helium, forming gas, or any variety of gas capable of transporting vaporized material, is injected into the furnace.

The furnace is heated with the heating coils 52' to vaporize the neutron reactive material 54'. The process requires that the cold plate 64 be kept chilled, whatever the method may be. The carrier gas tube 39' also loops through the cryogenic liquid 49' to prevent any gas of the neutron reactive material 54' from reaching a pump 47'. The pump 47' is used to remove the carrier gas from the furnace tube 43'. By doing so, it is guaranteed that the carrier gas will flow over the neutron reactive material 54' thereby causing the vaporized neutron reactive material 54' to be transported to the cooled perforated substrate 14".

In dynamic low pressure condensation deposition, the carrier gas and vaporized neutron reactive material 54" are forced through the perforations 9 and the exit ports 26 into the perforated cold plate channels 68, out through the cold finger exit channel 65 and out an exit port 67. The ratio of carrier gas and vaporized neutron reactive material 54" that passes through the perforated substrate 14" to that amount that passes around the perforated substrate 14" is controlled with flow control valves 69 and 71.

The vacuum pump 47' also lowers the pressure in the furnace tube 43' which reduces the vapor pressure of the neutron reactive material 54'. The vacuum pressure is controlled by the gas flow and a vacuum valve 46'. The vacuum pressure is monitored with a pressure gauge 45'. When the carrier gas and the vaporized neutron reactive material 54' reaches the perforated substrate 14", the vaporized neutron reactive material 54' that is forced through the perforations 9 and substrate exit ports 26 condenses in the perforations 9 of the substrate 14" thereby filling them up.

The above-described process allows for the perforations to be completely filled with neutron reactive materials without prematurely closing the top off, a problematic effect that has been observed with common prior art physical vapor deposition (FIG. 32), and without excessive void space as observed with prior art powder filling (FIG. 33).

Low-Capacitance, Large-Area, Non-Streaming Detectors

The neutron detectors of the prior art are generally described as planar-type devices. Hence the detectors are basically parallel plate capacitors. The noise, or capacitance, of the devices scales linearly with the surface area of the detectors. As a result, it is difficult to manufacture large area perforated semiconductor neutron detectors. However, using the drift diode design that has been previously established [7], a large area, low noise, drift diode version of a perforated detector diode in accordance with another embodiment of the present invention can be fabricated.

Figure 40:
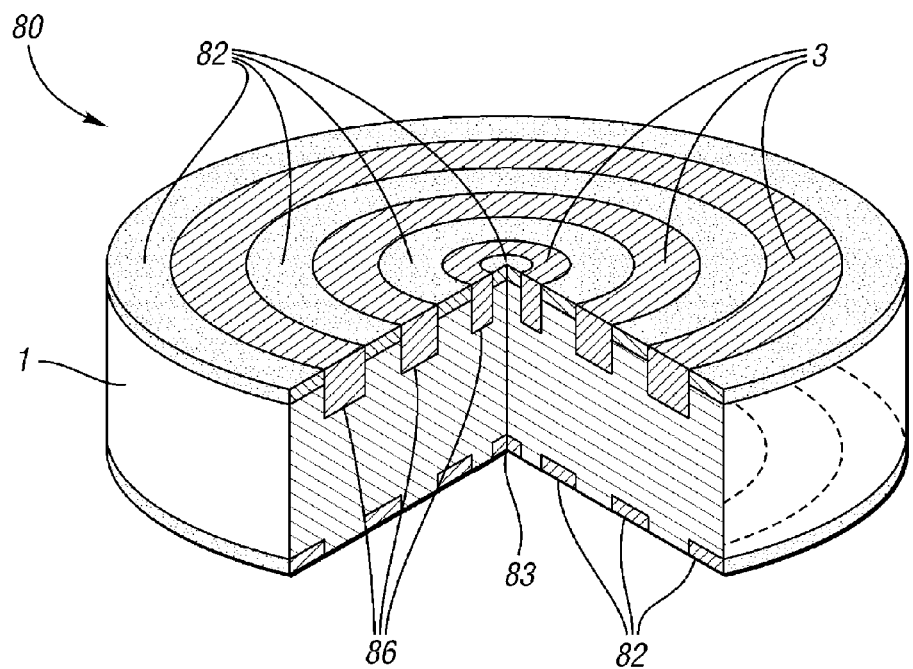
FIG. 40 is a schematic perspective view, partially broken away, in cross-section and partially transparent, and illustrating the basic construction of a drift diode device which includes circular electrodes and circular channels filled with neutron reactive material.

FIG. 40 shows the basic concept structure of a perforated neutron-detecting drift detector diode device, generally indicated at 80. The detector device 80 includes a semiconductor substrate 1 having a set of steering contacts 82 of one type (either n-type or p-type), and a collecting contact 83 of the opposite type (either p-type or n-type), located within the vicinity of the set of steering contacts 82. Perforations 86 of the detector device 80 may have circular, serpentine, of other shapes between the contacts 82. The perforations 86 then are backfilled with one or more neutron reactive materials 3, such as B, LiF or Gd.

Figure 41:
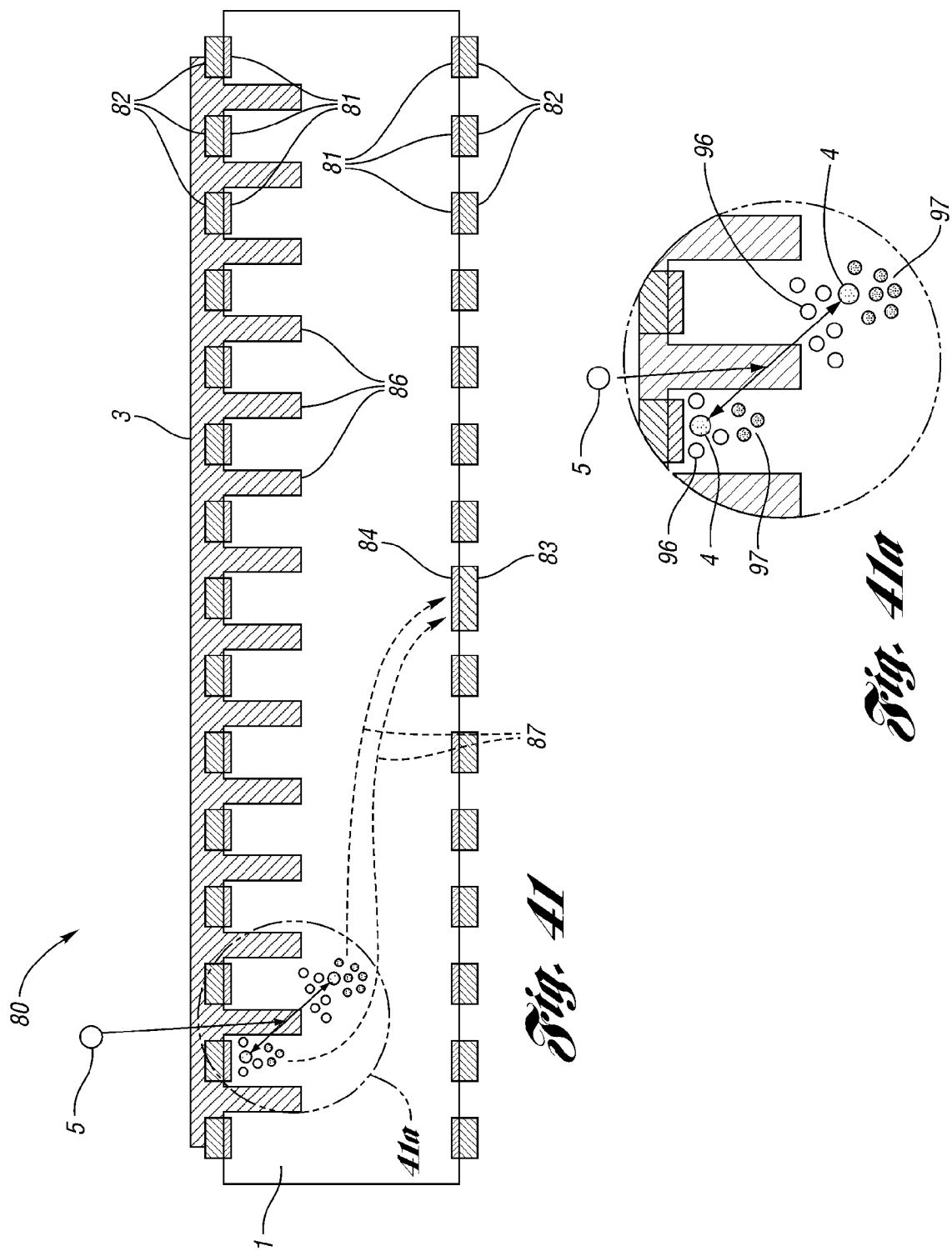
FIG. 41 is a side cross-sectional view of the drift diode device of FIG. 40 and which includes multiple electrodes separated by channels filled with neutron reactive material; the multiple electrodes allow for the applied electric field to be altered so as to steer charge carriers towards specific other electrodes; depicted in the figure is the situation where negative charges (i.e., electrons) are steered to a central anode.

Referring now to FIGS. 41 and 41a, there is shown a cross-sectional view of a perforated drift detector diode device 80 showing the mechanism by which the detector device 80 works. A neutron 5 interacts in the neutron reactive material 3 on the detector device 80 or in the channels 86 and produces reaction products 4. The reaction products 4 excite positive holes 96 and negative electrons 97. A voltage is applied across the electrodes 82 such that the resulting electric field guides the electrons 97 to the contact or anode 83. Example trajectories 87 show how the electrons 97 can be guided to the anode 83. In FIGS. 41 and 41a, the device semiconductor substrate 1 can be intrinsic, n-type or p-type. The steering contacts 82 can be attached to doped semiconductor regions 81. One or more collecting contacts 83 can be attached to a doped semiconductor region 84. The capacitance of the detector device 80 is primarily determined by the size of the collecting contact 83, hence the detector device 80 can be used as a large area device with a small capacitance as determined by the size of the collecting contact or anode 83.

Hand Held and Remote Sensing Platform for the Neutron Detectors

Figures 42, 42A:
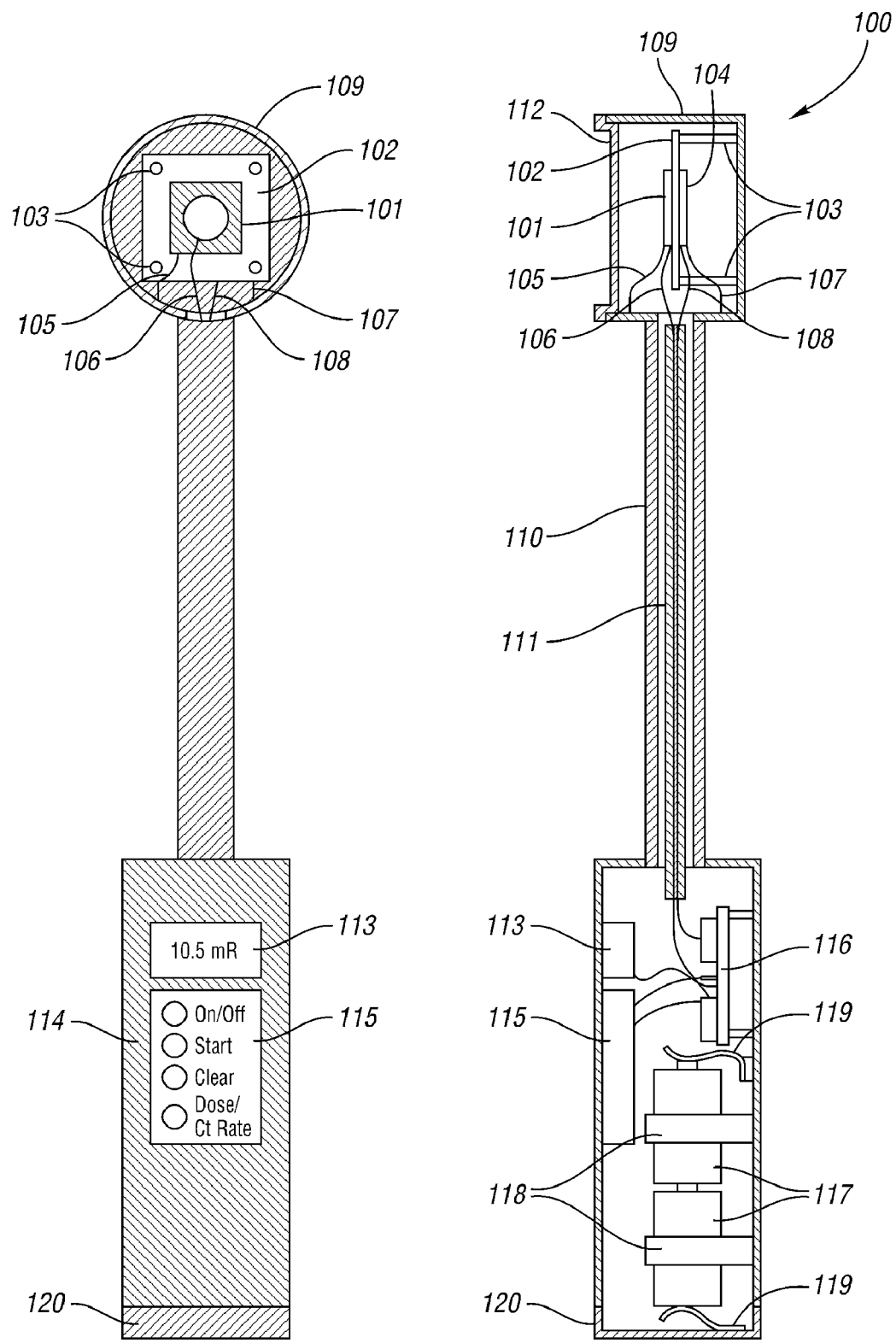
FIGS. 42 and 42a are front and side sectional views, respectively, of a hand-held detection wand unit for stand-off radiation detection measurement, and constructed in accordance with one embodiment of the present invention.

Referring now to FIGS. 42 and 42a, there is shown an embodiment of the invention in which a high efficiency perforated neutron detector is used as a remote neutron sensing device with gamma ray detection and rejection ability. A wand device 100 includes a mount 102 and a neutron detector 101 attached to the mount 102. The neutron detector 101 is centered with standoffs 103. An additional gamma ray detector 104 of the same size can be mounted in line with the neutron detector 101 to measure or subtract gamma ray background. The neutron detector 101 is grounded at 105 to a case 109 and is voltage biased through a lead 106. The gamma ray detector 104 is also grounded at 107 to the case 109 and is voltage biased through a lead 108. The detector case housing 109 is attached through an extension stem 110 inside which there is electrical insulation 111. The extension stem 110 can range from only a few inches long to several feet long. The stem 110 connects to a handle 114 inside which are electrical circuits 116 such as electronic preamplifiers, amplifiers, counters, and discriminators (not shown). The device 100 is powered with batteries 117 held in place with clamps 118 and electrically connected with contacts 119. The batteries 117 are contained in the handle 114 with a handle lid 120. A readout display 113 can be installed in a handle 114. Controls 115 can be installed in the handle 114 of the detector device 100 to operate the device 100.

Figure 43:
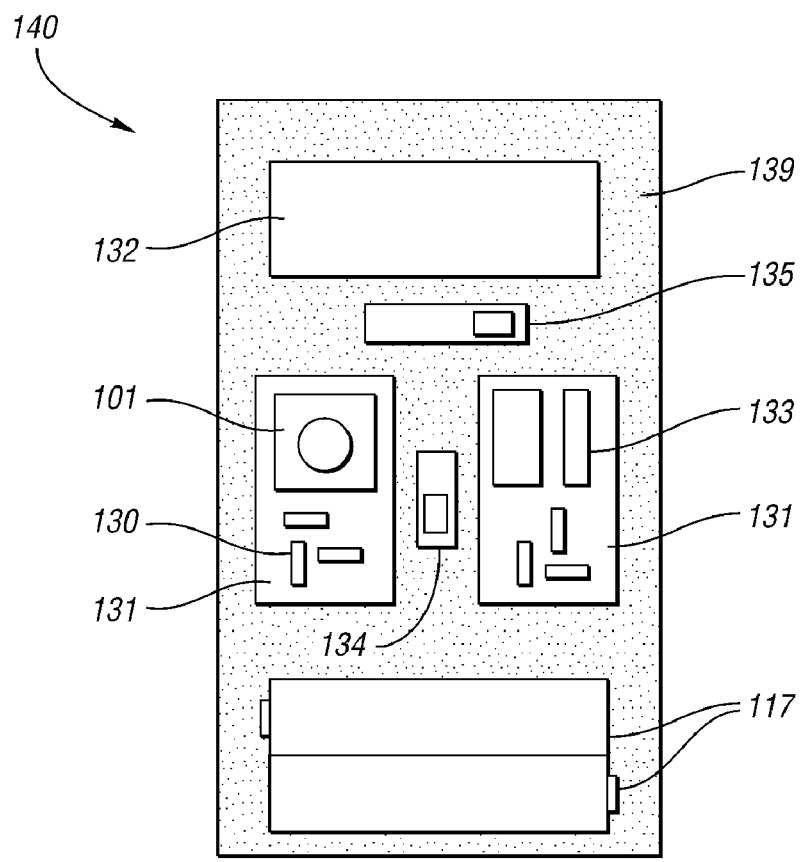
FIG. 43 is a front schematic view of a portable, battery-powered detector module for neuron detection and neutron dosimetry.

Referring now to FIG. 43, there is shown an embodiment of the invention in which a detector module, generally indicated at 140, includes a high efficiency perforated neutron detector 101 (generally of the type previously described) used as a remote neutron sensing device for neutron detection and dosimetry. The module 140 includes a number of basic units including the high efficiency perforated neutron detector 101 coupled to an electronics package 131 having miniaturized preamplifier and amplifier electronics 130, a power supply or charge pump 133 coupled to the electronics package 131, a display 132, an on-off switch 134, and a function selector switch 135. The function selector switch 135 allows the unit to be set to neutron count rate or neutron dose rate, or some other radiation unit of measure. The module 140 is powered by batteries 117. The units are fastened to a mother circuit board 139.

Figure 44:
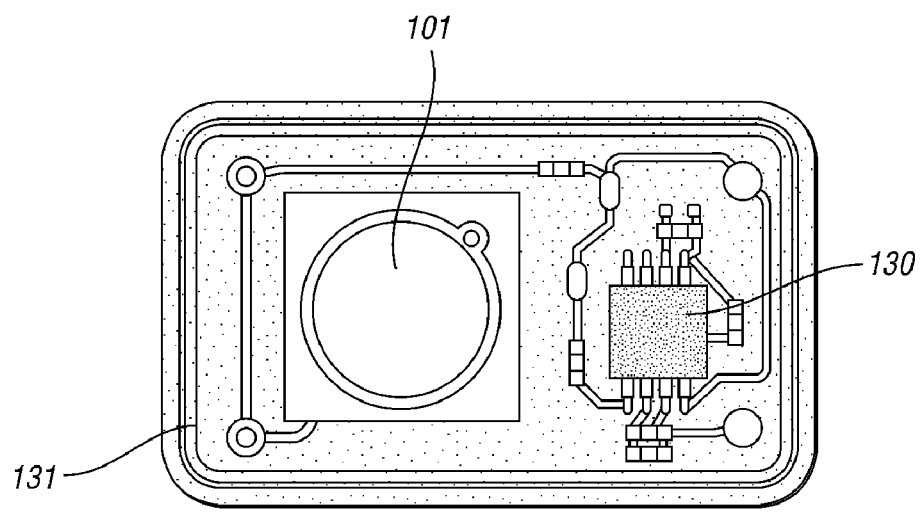
FIG. 44 is a front schematic view of a portion of the detector module of FIG. 43 including a neutron detector packaged with miniaturized preamplifier and amplifier circuits.

Referring now to FIG. 44, there is shown a schematic view of a portion of the module 140 of FIG. 43 in which the high efficiency perforated neutron detector 101 is mounted to the electronics package 131 having the miniaturized preamplifier and amplifier electronics 130.

Figure 45:
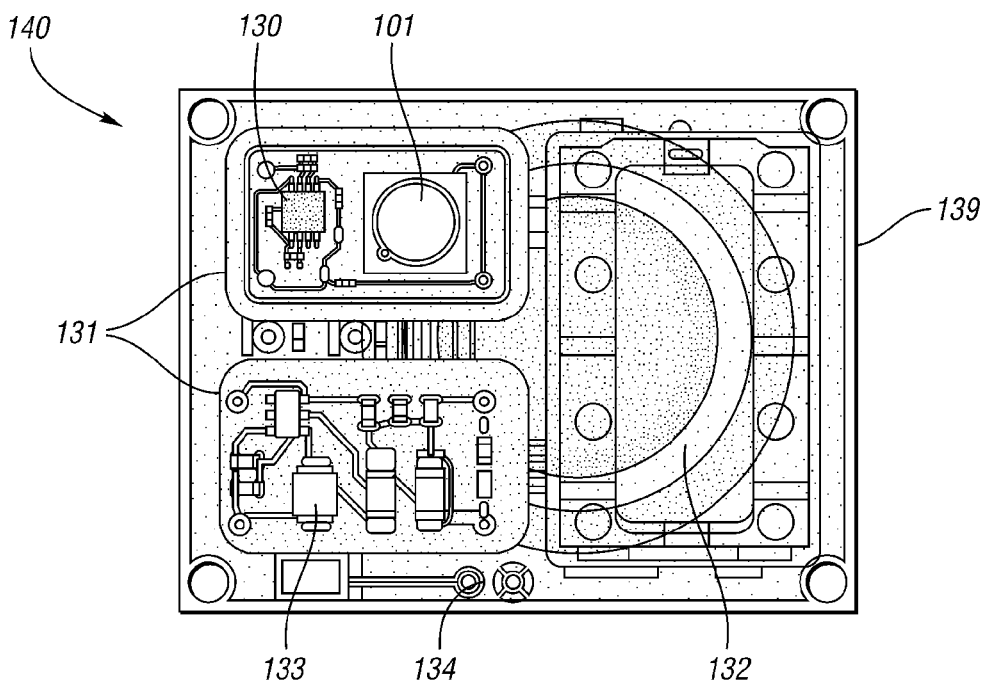
FIG. 45 is a front schematic view of another portion of the detector module of FIG. 43 including the portable, battery-powered module for neutron detection and neutron dosimetry, showing a display, a detector package and a power package.

Referring now to FIG. 45, there is shown a schematic view of another portion of the module 140 of FIG. 43 in which the high efficiency perforated neutron detector 101 is used as a remote neutron sensing device for neutron detection and dosimetry. The module 140 comprises the above-noted basic units including the high efficiency perforated neutron detector 101 mounted to the electronics package 131 with the miniaturized preamplifier and amplifier electronics 130, the power supply or charge pump 133 mounted on the electronics package 131, the display 132, and the on-off switch 134. The module is powered by batteries (not shown). The units are fastened to the mother circuit board 139.

Figure 46:
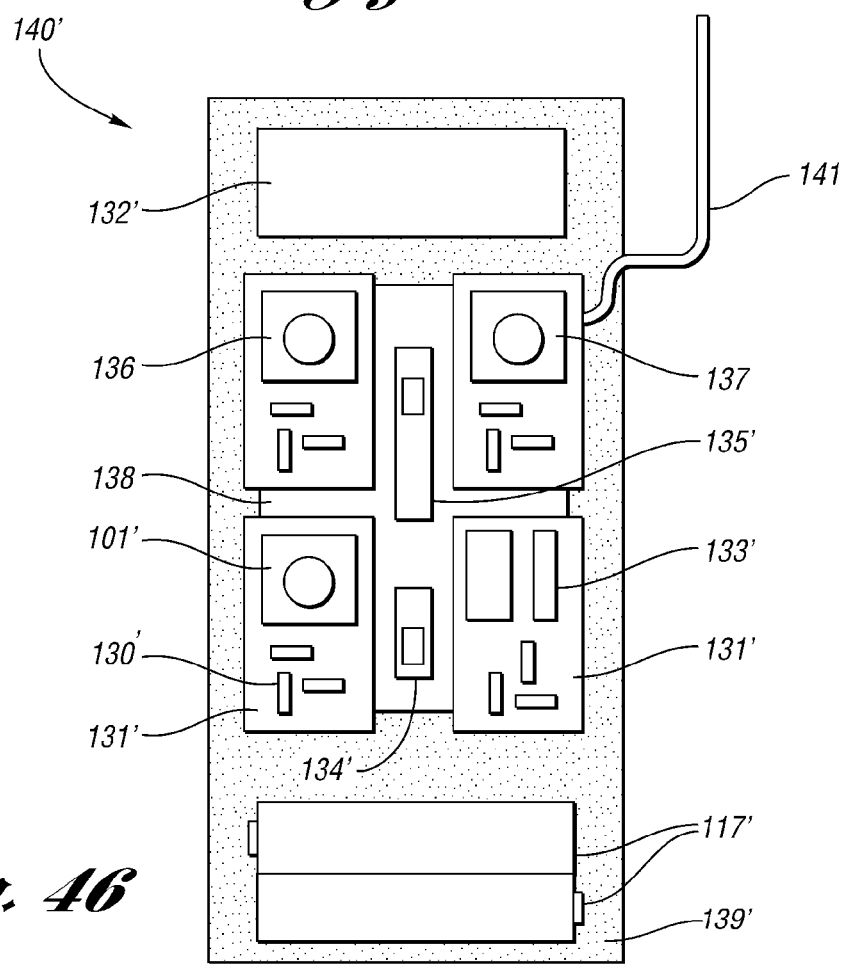
FIG. 46 is a front schematic view of a portable, battery-powered detector module of a second embodiment for neutron detection and neutron dosimetry and which further has radio link capability.

Referring now to FIG. 46, there is shown another embodiment of a detector module 140' of the invention, wherein parts of the module 140' which have the same or similar function to the parts of the module 140 have a single prime designation. A high efficiency perforated neutron detector 101' of the module 140' is generally of the type previously described and is used as a remote neutron sensing device for neutron detection and dosimetry. The module 140' includes a number of basic units including the high efficiency perforated neutron detector 101' mounted to an electronics package 131' having miniaturized preamplifier and amplifier electronics 130', a power supply or charge pump 133' mounted on an electronics package 131', a display 132', an on-off switch 134', and a function selector switch 135'. The function selector switch 135' can allow the unit to be set to neutron count rate or neutron dose rate, or some other radiation unit of measure. The module 140' is powered by batteries 117'. The units are fastened to a mother circuit board 139'.

The module 140' also includes another neutron detector 136 with amplifiers in a package to detect fast neutrons. Various forms of moderators or shielding can be used to assist the detector 136 in distinguishing between fast and thermal neutrons. For instance, a plastic moderator will reduce fast neutron energies to slow, while Cd shielding will block thermal neutrons and allow only fast neutrons to pass into the detector 136.

A gamma ray detector 137 is used to measure the gamma ray field. An algorithm (which may take the form of a programmed computer) is used to take the various gamma ray and neutron radiation measurements and determine the dose for fast and thermal neutrons and gamma rays. A radio transmitter mounted on a board 138 can be added to the module 140' to transmit data back to a central receiver (not shown) through an antennae 141. The module 140' can also be designed to have global positioning system (GPS) capability to provide the exact spatial location of the detector module 140' and the person wearing the dosimeter. Obviously, other systems or subsystems may be included with the dosimeter instead of the GPS to provide spatial location of the dosimeter as one of ordinary skill in the art can appreciate.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for efficiently detecting neutrons, the apparatus comprising:
   a particle-detecting first substrate having top and back surfaces and including an array of sinuous fins spaced apart by a corresponding array of sinuous channels at the top surface, each of the channels having a depth, a width and a length greater than the width wherein each of the channels is sinuous along the length of the channel at the top surface and wherein each of the fins has a fin width and a fin length greater than the fin width and wherein each of the fins is sinuous along the fin length of the fin at the top surface; and
   neutron-responsive material disposed in the array of sinuous channels, the material being responsive to neutrons absorbed thereby for releasing ionizing radiation reaction products wherein the sinuous shape of the fins and channels strengthens the fins and reduces neutron streaming effects whereby the apparatus has a relatively flat and uniform detection efficiency response.

2. The apparatus as claimed in claim 1, wherein the fins and channels are chevron-shaped.

3. The apparatus as claimed in claim 1, wherein the fins and channels are sinusoidal-shaped.

4. The apparatus as claimed in claim 1, wherein the fins and channels are circularly-shaped.

5. The apparatus as claimed in claim 1, further comprising top and back conductive contacts coupled to the first substrate at the top and back surfaces, respectively.

6. The apparatus as claimed in claim 5, wherein the contacts include steering contacts and a collecting contact.

7. The apparatus as claimed in claim 5, wherein the fins have conductive doped regions at the top surface spaced away from the channels and wherein walls which define the channels are coated with an insulating layer to reduce leakage current.

8. The apparatus as claimed in claim 5, wherein the top conductive contacts are Schottky barrier, diffused dopant or metal ohmic contacts.

9. The apparatus as claimed in claim 5, wherein the first substrate has a doped region at the back surface to increase coupling of the back conductive contact to the substrate.

10. The apparatus as claimed in claim 1, wherein the neutron responsive material includes at least one of B or B compounds, Li or Li compounds, Gd or Gd compounds, U or Uranium compounds, Th or Th compounds, and Cd or Cd compounds.

11. The apparatus as claimed in claim 1, further comprising a neutron-responsive layer disposed on the neutron-responsive material disposed in the array of sinuous channels.

12. The apparatus as claimed in claim 1, wherein the first substrate is composed primarily of a semiconductor material.

13. The apparatus as claimed in claim 12, wherein the semiconductor material is silicon, silicon carbide, gallium arsenide, gallium nitride, indium phosphide, cadmium telluride, cadmium-zinc-telluride, gallium phosphide, mercuric iodide, or lead iodide.

14. The apparatus as claimed in claim 1, further comprising a particle-detecting second substrate having neutron-responsive material disposed in cavities of the second substrate and stacked on the first substrate.

15. The apparatus as claimed in claim 14, wherein the neutron-responsive material is also disposed as layers between the substrates.

16. A measuring wand comprising:
   an elongated housing; and
   an apparatus for efficiently detecting neutrons mounted within the housing, the apparatus including:
      a particle-detecting substrate having top and back surfaces and including an array of sinuous fins spaced apart by a corresponding array of sinuous channels at the top surface, each of the channels having a depth, a width and a length greater than the width wherein each of the channels is sinuous along the length of the channel at the top surface and wherein each of the fins has a fin width and a fin length greater than the fin width and wherein each of the fins is sinuous along the fin length of the fin at the top surface; and neutron-responsive material disposed in the array of sinuous channels, the material being responsive to neutrons absorbed thereby for releasing ionizing radiation reaction products wherein the sinuous shape of the fins and channels strengthens the fins and reduces neutron streaming effects whereby the apparatus has a relatively flat and uniform detection efficiency response.

17. The wand as claimed in claim 16, further comprising a source of electrical power disposed within the housing for powering the wand.

18. The wand as claimed in claim 16, further comprising a gamma ray detector mounted within the housing in line with the apparatus to measure or subtract gamma ray background.

19. The wand as claimed in claim 16, further comprising a readout display mounted on the housing to provide a visual indication of measured radiation.

20. The wand as claimed in claim 16, further comprising manual operable controls mounted on the housing to operate the wand.

21. A detector module for remote neutron sensing, the module comprising:

first apparatus for efficiently detecting neutrons, the apparatus including:
a particle-detecting substrate having top and back surfaces and including an array of sinuous fins spaced apart by a corresponding array of sinuous channels at the top surface, each of the channels having a depth, a width and a length greater than the width wherein each of the channels is sinuous along the length of the channel at the top surface and wherein each of the fins has a fin width and a fin length greater than the fin width and wherein each of the fins is sinuous along the fin length of the fin at the top surface; and neutron-responsive material disposed in the array of sinuous channels, the material being responsive to neutrons absorbed thereby for releasing ionizing radiation reaction products wherein the sinuous shape of the fins and channels strengthens the fins and reduces neutron streaming effects whereby the apparatus has a relatively flat and uniform detection efficiency response; and means coupled to the first apparatus for determining a radiation unit of measure detected by the first apparatus.

22. The module as claimed in claim 21, further comprising a source of electrical power for powering the module.

23. The module as claimed in claim 21, further comprising a gamma ray detector to measure or subtract gamma ray background.

24. The module as claimed in claim 23, further comprising second apparatus for detecting fast neutrons and at least one of a moderator and shielding to assist the second apparatus in distinguishing between fast and thermal neutrons.

25. The module as claimed in claim 24, wherein the means for determining is also coupled to the second apparatus and the gamma ray detector for determining a dose of fast and thermal neutrons and gamma rays.

26. The module as claimed in claim 25, further comprising a transmitter coupled to the means for determining for transmitting data based on the dose.

27. The module as claimed in claim 25, further comprising a transmitter to transmit data based on the detected neutrons and at least one of spectral energy information and detected gamma rays.

28. The module as claimed in claim 21, further comprising a readout display to provide a visual indication of measured radiation.

29. The module as claimed in claim 21, further comprising manual operable controls to operate the module.

30. The module as claimed in claim 21, further comprising a transmitter coupled to the first apparatus to transmit data based on the detected neutrons.

31. The module as claimed in claim 21, further comprising means for determining spatial location of the module.

* * * * *